United States Patent
Wehrman et al.

(10) Patent No.: US 12,026,362 B2
(45) Date of Patent: Jul. 2, 2024

(54) VIDEO EDITING APPLICATION FOR MOBILE DEVICES

(71) Applicant: Snap Inc., Santa Monica, CA (US)

(72) Inventors: Ian Anthony Wehrman, Venice, CA (US); Devin Doty, Brooklyn, NY (US); Richard Andrew Leatham, London (GB)

(73) Assignee: Snap Inc., Santa Monica, CA (US)

( * ) Notice: Subject to any disclaimer, the term of this patent is extended or adjusted under 35 U.S.C. 154(b) by 0 days.

(21) Appl. No.: 17/748,496

(22) Filed: May 19, 2022

(65) Prior Publication Data
US 2022/0374139 A1    Nov. 24, 2022

Related U.S. Application Data

(60) Provisional application No. 63/261,284, filed on Sep. 16, 2021, provisional application No. 63/260,979, (Continued)

(51) Int. Cl.
*G06F 3/04847* (2022.01)
*G11B 27/031* (2006.01)

(52) U.S. Cl.
CPC ........ *G06F 3/04847* (2013.01); *G11B 27/031* (2013.01)

(58) Field of Classification Search
CPC .... G06F 3/04847; G11B 27/031; G11B 27/34
See application file for complete search history.

(56) References Cited

U.S. PATENT DOCUMENTS

| 666,223 A | 1/1901 | Shedlock |
| 4,581,634 A | 4/1986 | Williams |

(Continued)

FOREIGN PATENT DOCUMENTS

| CA | 2887596 A1 | 7/2015 |
| EP | 2051480 A1 | 4/2009 |

(Continued)

OTHER PUBLICATIONS

"15 Best Video Editing Apps for iPhone You Can Use", beebom.com, [Online] Retrieved from the Internet: <URL: https://beebom.com/best-video-editing-apps-iphone/>, (Jan. 13, 2017), 19 pgs.

(Continued)

*Primary Examiner* — Jennifer N Welch
*Assistant Examiner* — Ashley M Fortino
(74) *Attorney, Agent, or Firm* — Schwegman Lundberg & Woessner, P.A.

(57) ABSTRACT

A method, to navigate a video editing project within a video editing application, includes storing a project timeline comprising a plurality of media content items arranged in a chronological sequence, the project timeline having a start time and an end time; causing presentation of a first tool interface, the first tool interface comprising: a video editing canvas for playback of the project timeline; a plurality of tools to enable respective video editing functions; and a plurality of indicia representing the respective plurality of media content items; detecting activation of a first indicium associated with a first media content item of the plurality of media content items; and advancing the playback of the project timeline to a chronological location corresponding to the location of the first media content item within the project timeline.

18 Claims, 26 Drawing Sheets

Related U.S. Application Data filed on Sep. 8, 2021, provisional application No. 63/201,942, filed on May 19, 2021.

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin et al. |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler et al. |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi et al. |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 7,890,867 B1 | 2/2011 | Margulis |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen et al. |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |

(56) References Cited

U.S. PATENT DOCUMENTS

| | | |
|---|---|---|
| 8,744,523 B2 | 6/2014 | Fan et al. |
| 8,745,132 B2 | 6/2014 | Obradovich |
| 8,745,500 B1 | 6/2014 | Kostello et al. |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,401,177 B2 | 7/2016 | Cho |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,716,909 B2 | 7/2017 | Hill |
| 9,854,219 B2 | 12/2017 | Sehn |
| 10,674,311 B1 | 6/2020 | Bouba et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0231512 A1* | 10/2005 | Niles ............... G06T 13/20 345/473 |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Nguyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschwieler et al. |

(56) References Cited

U.S. PATENT DOCUMENTS

| | | |
|---|---|---|
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay et al. |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collison |
| 2009/0199242 A1 | 8/2009 | Johnson et al. |
| 2009/0210779 A1* | 8/2009 | Badoiu ............... G11B 27/105 715/230 |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Lansing |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0278504 A1* | 11/2010 | Lyons ............... H04N 21/854 715/202 |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0017152 A1* | 1/2012 | Matsuda ............... G11B 27/34 715/723 |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0042251 A1* | 2/2012 | Rodriguez ........... G11B 27/034 715/723 |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |

(56) References Cited

U.S. PATENT DOCUMENTS

| | | |
|---|---|---|
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0216871 A1 | 7/2016 | Stamatiou |
| 2016/0239248 A1 | 8/2016 | Sehn |

(56) References Cited

U.S. PATENT DOCUMENTS

| | | | |
|---|---|---|---|
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0287006 A1 | 10/2017 | Azmoodeh et al. |
| 2020/0314586 A1 | 10/2020 | Bouba et al. |
| 2020/0382912 A1 | 12/2020 | Dancie et al. |
| 2020/0401225 A1 | 12/2020 | Jaureguiberry et al. |
| 2021/0011612 A1 | 1/2021 | Dancie et al. |
| 2021/0152979 A1 | 5/2021 | Berardino et al. |
| 2021/0266704 A1 | 8/2021 | Dancie et al. |
| 2021/0377693 A1 | 12/2021 | Bouba et al. |
| 2021/0409904 A1 | 12/2021 | Baylin et al. |
| 2022/0174455 A1 | 6/2022 | Guillaume |
| 2022/0269345 A1 | 8/2022 | Jaureguiberry et al. |

FOREIGN PATENT DOCUMENTS

| | | | |
|---|---|---|---|
| EP | 2151797 A1 | 2/2010 |
| GB | 2399928 A | 9/2004 |
| KR | 19990073076 A | 10/1999 |
| KR | 20010078417 A | 8/2001 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2006118755 A2 | 11/2006 |
| WO | WO-2007092668 A2 | 8/2007 |
| WO | WO-2009043020 A2 | 4/2009 |
| WO | WO-2011040821 A1 | 4/2011 |
| WO | WO-2011119407 A1 | 9/2011 |
| WO | WO-2013008238 A1 | 1/2013 |
| WO | WO-2013045753 A1 | 4/2013 |
| WO | WO-2014006129 A1 | 1/2014 |
| WO | WO-2014068573 A1 | 5/2014 |
| WO | WO-2014115136 A1 | 7/2014 |
| WO | WO-2014194262 A2 | 12/2014 |
| WO | 2015020496 | 2/2015 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |

OTHER PUBLICATIONS

"Top 10 Best Video Editing Apps for iPhone and iPad in 2021", [Online] Retrieved from the Internet: <URL: https://gadgetliv.com/best-video-editor-apps-iphone/>, (Dec. 12, 2020), 14 pgs.

May, Tom, "The best video editing apps in 2021", [Online] Retrieved from the Internet: <URL: https://www.creativebloq.com/features/6-great-video-editing-apps-for-mobile>, (Jul. 13, 2021), 14 pgs.

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"BlogStomp", StompSoftware, [Online] Retrieved from the Internet: <URL: http:/stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (IOS/Android): Give Pictures a Sense of Place", TechPP, [Online] Retrieved from the Internet: <URL: http://techpp.com/2013/02/15/instaplace-app-review>, (2013), 13 pgs.

"InstaPlace Photo App Tell the Whole Story", [Online] Retrieved from the Internet: <URL: youtu.be/uF_gFkg1hBM>, (Nov. 8, 2013), 113 pgs., 1:02 min.

"International Application Serial No. PCT/US2015/037251, International Search Report dated Sep. 29, 2015", 2 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RG0w>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide to the New Snapchat Filters and Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function and for Whatever Reason, Time, Temperature and Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP and Save File on Server", [Online] Retrieved from the Internet: <URL: http://code.rohitink.com/2012/12/28/watermark-images-in-php-and-save-file-on-server>, (Dec. 28, 2012), 4 pgs.

\* cited by examiner

CREATE SOUND USER INTERFACE

VIDEO EDITING APPLICATION FOR MOBILE DEVICES

CLAIM OF PRIORITY

This application claims the benefit of priority to U.S. Provisional Application Ser. No. 63/201,942, filed May 19, 2021; U.S. Provisional Application Ser. No. 63/260,979, filed Sep. 8, 2021; and U.S. Provisional Application Ser. No. 63/261,284, filed Sep. 16, 2021. Each of the above applications are incorporated here in by reference in their entireties.

TECHNICAL BACKGROUND

With the explosion of the user-generated video content on various platforms on the Internet, the functionality and features of many existing video editing applications as been found to be either too complicated for non-professional video editors, or too cumbersome for the quick editing of videos in the field, and ill-suited for small screen devices, such as smartphones or the like. The user interface paradigms of current video editing solutions are better suited to large display screens and professional video editors. Thus, several technical challenges are presented by the current user interfaces and video editing functionality of existing video editing applications and programs.

Additionally, a number of technical challenges are presented by the considerable number of content items that users are seeking to manipulate within a single video editing project and combine into a single video output. The presentation of such multiple content items, the individual editing, and modification of these content items, and the combination thereof into a single project output (e.g., a video) presents several technical challenges to existing video editing applications that have yet to be addressed.

There is also increasing demand on video editors to create current, trending, and visually compelling content to differentiate their videos from the substantial number of videos that are being user-generated and published on popular platforms.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

DETAILED DESCRIPTION

An example video editing application seeks to help passionate creators make engaging and successful videos for viewers (e.g., "fans") on content publishing platforms. The video editing application combines powerful mobile video editing functionality with insights into trends on one or more video publishing platforms. For example, creators can learn about the #topics, songs, and augmentations (e.g., filters and lenses) that are trending on one or more video publishing platforms, view examples of user-generated media for inspiration, and then conveniently apply such inspirations to their own video projects. The video editing application, in some examples, enables mobile video editing using a collection of tools that are simple to use; powerful, and precise; and may be tailored to a specific video publishing platform Example Features Include Frame-precise trimming, slicing, cutting, layering, and audio editing—as well as frame-precise placement of creative elements like captions, stickers, sound effects, and other media layers.

High-quality, post-capture visual effects and cross-clip transitions are provided by video augmentations.

Discover a video editing canvas for playback of the project timeline;

Log in with a messaging or social media application (e.g., interaction client 2402)

Capture high-quality video footage with an embedded software camera of a messaging application (e.g., interaction client 2402)

Publish a finished video to a social or messaging platform or download (e.g., with a watermark) to a camera roll of a mobile device camera.

Work on multiple projects concurrently with re-editable drafts

By leveraging data generated by a media content and a messaging platform regarding trending topics, music, and augmentations (e.g., filters, lenses, stickers, captions, etc.), example video editing applications help creators tap into current trends, and address the problem of "blank canvas paralysis."

Figure 1:
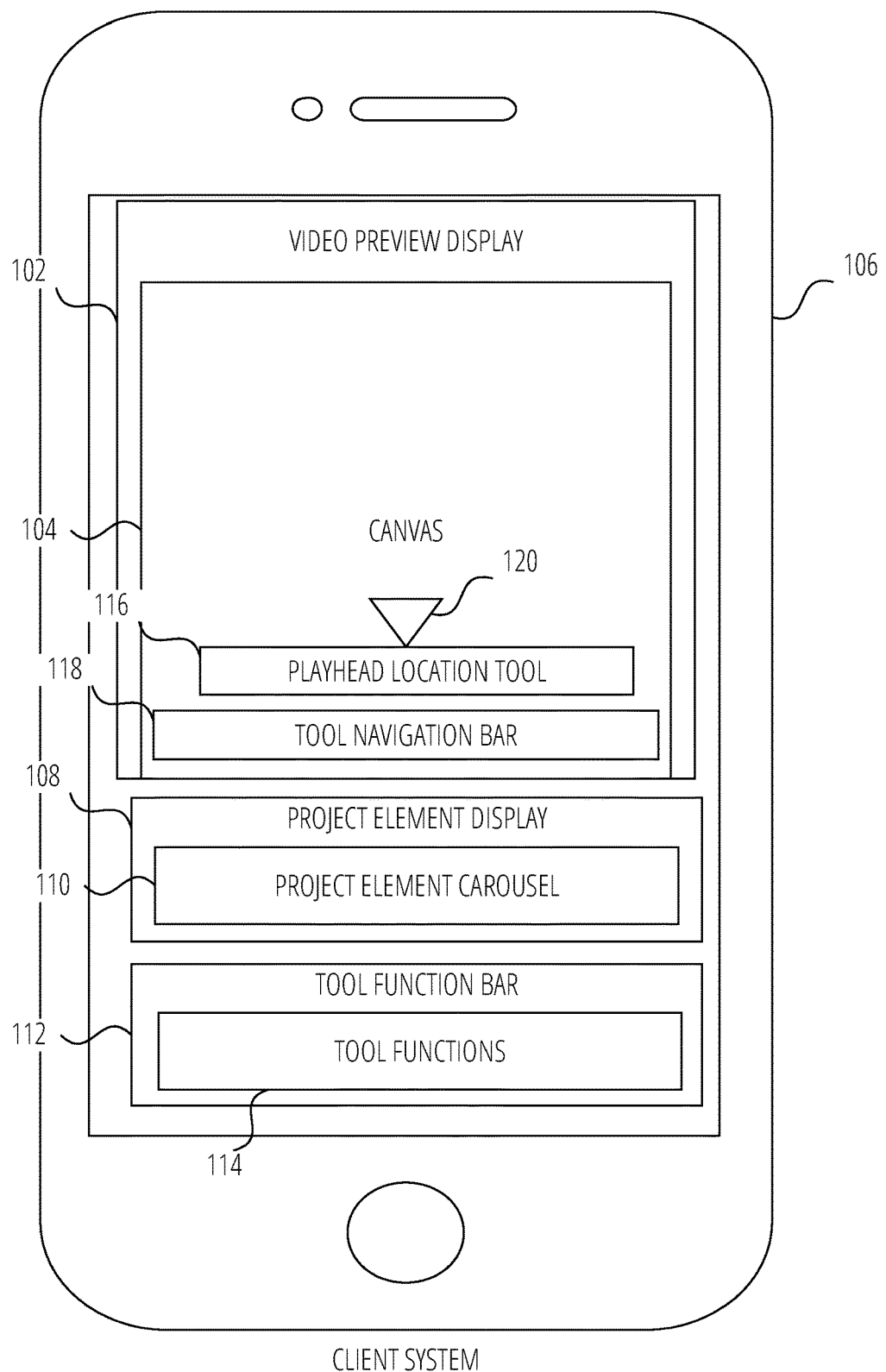
FIG. 1 is a user interface diagram showing a video editing user interface layout as generated by a video editing application, according to some examples

FIG. 1 is a user interface diagram showing a video editing user interface as generated by a video editing application 206, according to some examples. The video editing application 206 accesses the display of a client system 106 and causes display of example video editing user interfaces that include a number of display sections or portions, depending on the mode of the video editing application 206. For example, a user interface of the video editing application 206 may include:

A video preview display 102 includes a video editing canvas 104 on which is superimposed a playhead location tool 116 (e.g., a "scrubber 504") and tool navigation bar 118.

A project element display 108 presents a project element carousel 110 composed of project element indicia associated with respective projects elements (e.g., images, video clips, audio clips, captions, or other image augmentations).

A tool function bar 112 presents a tool functions 114 by displaying user-selectable indicia specific to a main tool selected from within the tool navigation bar 118.

These sections or displays may be arranged in different configurations or even split across multiple video editing interfaces. For example, the tool function bar 112 may, in some examples, be positioned above the project element carousel 110, and a tool navigation bar 118 may be positioned below the project element carousel 110. Further examples of user interface layouts are discussed below with reference to subsequent figures.

Figure 2:
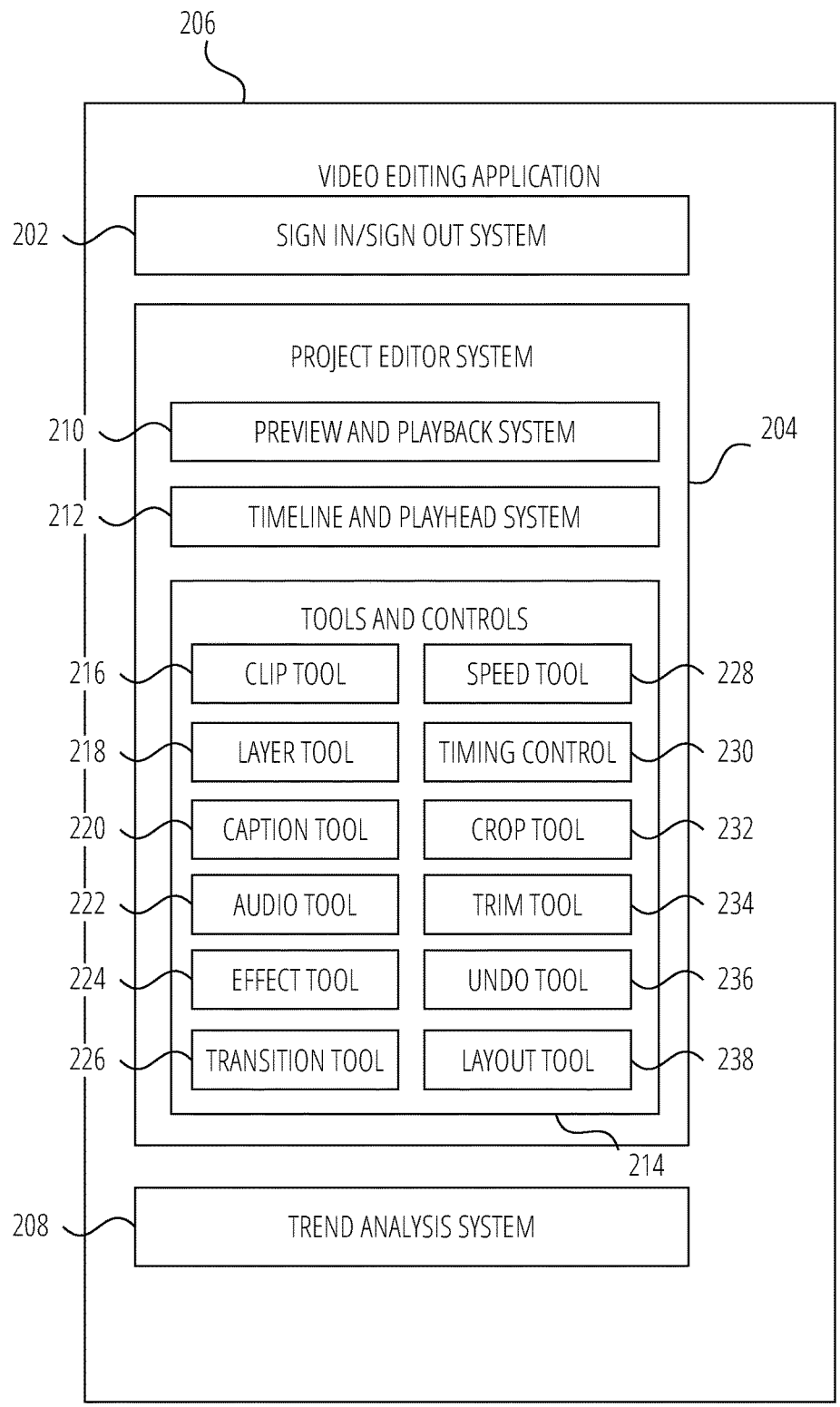
FIG. 2 is an architectural block diagram of the video editing application, according to some examples

Each of these display sections may be controlled and populated by a component of a project editor system 204, examples of which are shown in FIG. 2. Functionality provided by the video preview display 102, the project element display 108 and the tool function bar 112, and content presented in the canvas 104, the project element carousel 110, and the tool functions 114 are also described below with reference to subsequent figures.

FIG. 2 is an architectural block diagram of a video editing application 206, according to some examples.

The video editing application 206 includes a sign in/sign out system 202, a project editor system 204, and a trend analysis system 208. When launching the video editing application 206 for the first time, the user may be prompted by the sign in/sign out system 202 to log in with the interaction client 2402, which presents a privacy policy and terms of service for the interaction server system 2404.

Upon activation of the video editing application 206, a home screen (not shown) is presented to a user. The home screen presents a full-screen carousel of projects that the user has worked on in the past within a project listing interface component. The user has the option to swipe horizontally to look through past projects, delete or duplicate the active projects, or tap 'View all' to see all projects in a more compact grid view. Tapping a Create button on the home screen creates a new, empty project in the media content items 304.

The video editing application 206 provides a variety of tools for creating and editing video projects. The video editing application 206 automatically saves projects as they are worked on by a user.

After creating a new project, a user is automatically prompted to add project elements (e.g., videos or images from a camera roll, for example, of a mobile device hosting the video editing application or from cloud storage) to a main project timeline. Added video and images are previewed in a canvas 104 as described with reference to FIG. 1, and various tool functions 114 are presented below the canvas 104 in a tool navigation bar that scrolls horizontally.

Various tools within the tool navigation bar 118 (e.g., a main tool bar 118 may be used to add layers, captions, lenses, and other project elements to a video editing project.

A user can tap on the canvas 104 to start playback and preview an active project. When playback starts, on-canvas interface elements (e.g., the project element carousel 110, the tool navigation bar 118, the tool function bar 112, and various buttons) are temporarily hidden so that the user can preview video in a full-screen mode of a client system 106, unobstructed by user interface elements and as it will be outputted from the video edit project. A subsequent and further tap on the canvas 104 pauses the preview playback and again reveals the temporarily hidden interface elements.

When the preview video is paused, an on-screen navigation tool, in the form of a scrubber, appears in the canvas 104, above the project element carousel 110, and the tool function bar 112. A user can horizontally drag the scrubber on the canvas 104 above the toolbar to navigate forwards and backwards in a video editing project. As the user drags the scrubber, a playhead and time code are displayed to show what part of the video editing project is previewed in the canvas 104. While playback is active, a user can also press-and-hold to pause playback temporarily and reveal the scrubber.

Each tool in the tool functions 114 is used to add different project elements to a video editing project. A user taps on a respective tool icon in the tool functions 114 to activate the corresponding tool.

Examples of the various tools and functions provided by the video editing application 206 include:
A clip tool 216
A layer tool 218
A caption tool 220
An audio tool 222
An effect tool 224
A transition tool 226
A speed tool 228
A timing control 230
A crop tool 232
A trim tool 234

An undo tool 236

A layout tool 238

A number of these tools are discussed in further detail below.

Video Project Data Structures

Figure 3:
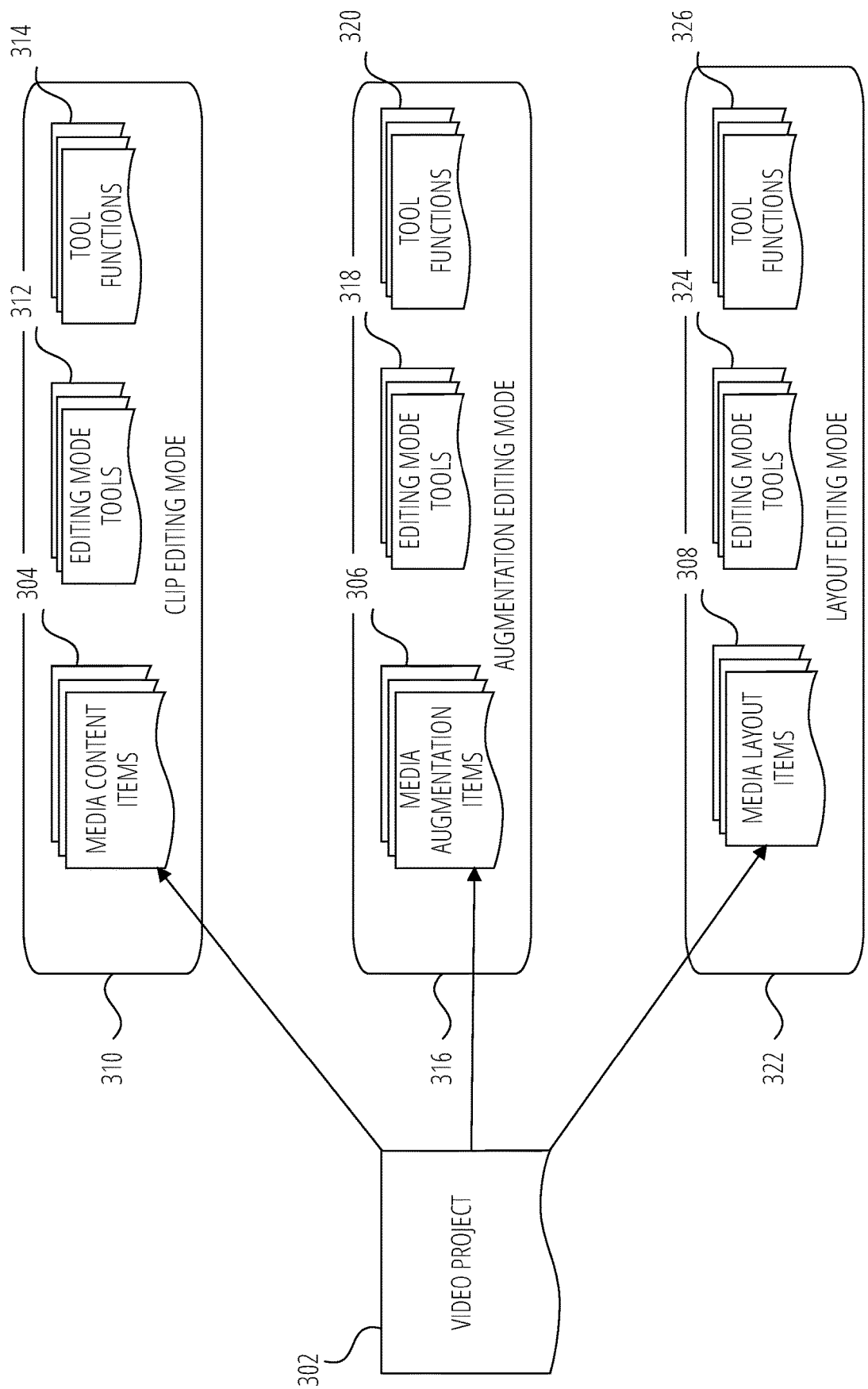
FIG. 3 is a diagrammatic representation of a data structure of a video editing project, according to some examples.

FIG. 3 is a diagrammatic representation of a data structure of a video project 302, according to some examples, that may be created by a user of the video editing application 206. At a high-level, a video project 302 comprises a number of project elements that are organized into project element sets, according to a project element category. For example, project elements of a main timeline 402 may constitute a first project element set, project elements of a layer timeline 412 may constitute a second project element set, and project elements of an audio timeline may constitute a third project element set.

A project element set may correspond to a project element type, but may also include project elements of multiple types. For example, a project element category "clips" may correspond to a clip layer, which includes both video and still image media content items.

Each project element set of a video project 302 further may have an associated timeline with timing information (e.g., defining start and end times for presentation of each of the project elements) within the context of a full project duration determined by a main project timeline. To this end, each project element set may be regarded as including a timeline, which determines an ordering of project elements within the project element set and also the start and end of presentation or application of a particular project element within the context of that project element set and the overall project duration.

A video project 302 is shown in FIG. 3 to include a number of project element sets, for example, including media content items 304, media augmentation items 306, and media layout items 308. The media content items 304 include still image, video, audio, sticker, caption, transition, and other media content that may be combined into a single project video outputted by example video editing applications 206.

Some sets of media content items 304 may further be organized into layers, and others according to content type (e.g., an audio layer of audio content items and a caption layer of caption content types).

Sets of media augmentation items 306 include filters, lenses, effects, captions, speed adjustments, and other augmentations that may be applied to any one of the media content items 304 to augment and modify these content items.

Media layout items 308 include several media content item layouts that may be applied to media content items 304 within the canvas 104 at playback.

Only a few examples of media items are shown in FIG. 3, and other types of media items can be included in a video project 302.

Further, the video editing application 206 may enable a dedicated and specialized editing mode for each of a number of project element categories (e.g., for each of a number of project element sets). As an example, FIG. 3 shows a clip editing mode 310, an augmentation editing mode 316, and a layout editing mode 322. As will become apparent from the further examples discussed herein, a wide variety of project element categories may be implemented in different examples, each of these particular categories being supported by a respective and specialized editing mode.

Each of these specialized editing modes includes and presents a selection of editing mode tools (e.g., 312, 318, 324) and tool functions (e.g., 314, 320, 326) that are appropriate to the relevant project element sets. Certain editing mode tools and tool functions may be shared and common across different editing modes as appropriate.

Figure 4:
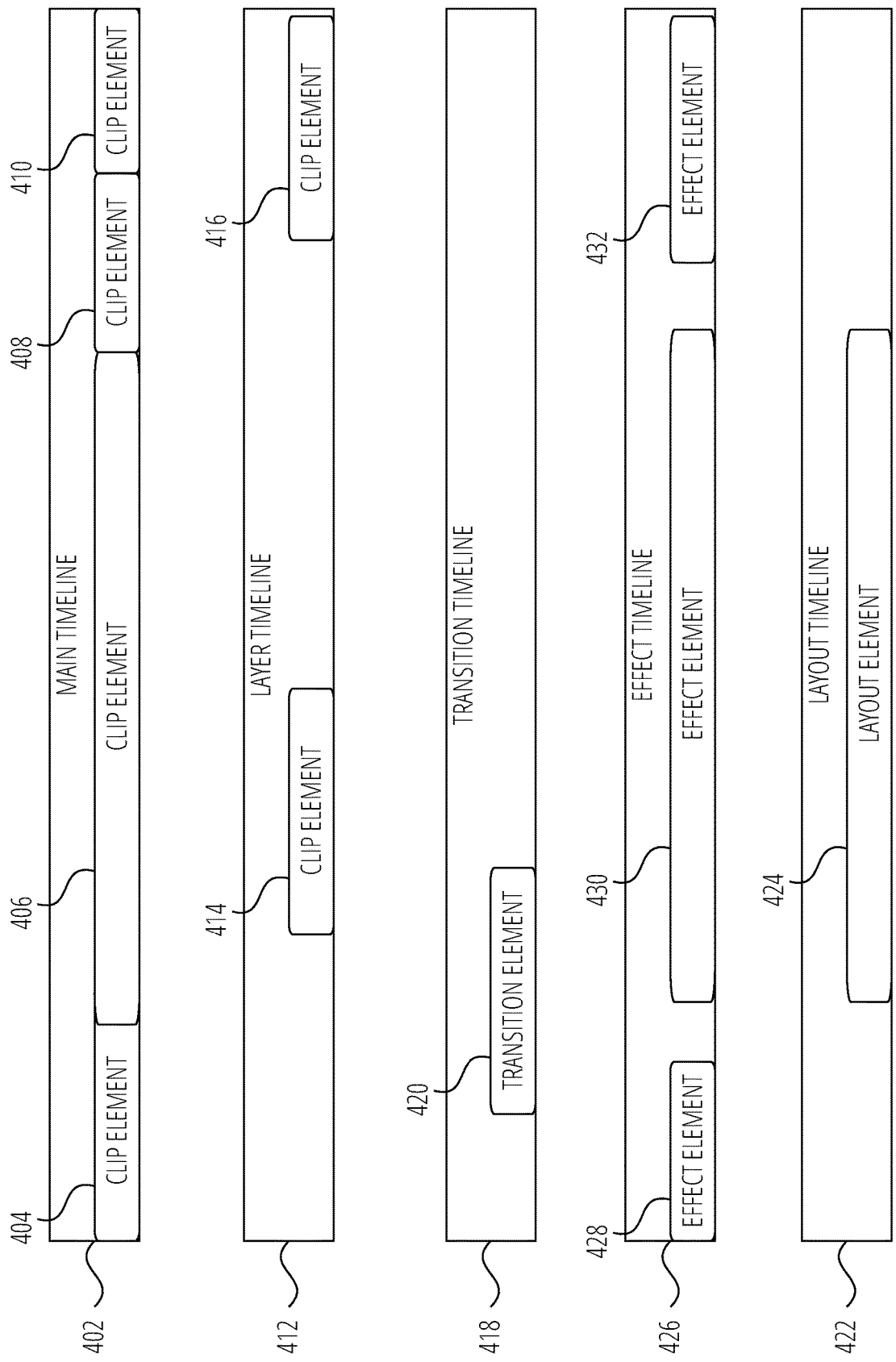
FIG. 4 is a further diagrammatic representation of a data structures of a video editing application, according to some examples, that supports the "layering" of multiple project element sets.

FIG. 4 is a further diagrammatic representation of a data structures of a video editing application 206, according to some examples, that supports the "layering" of multiple project element sets. The data structures in FIG. 4 include timelines for a number of project element sets, namely a main timeline 402, a layer timeline 412, a transition timeline 418, a layout timeline 422, and an effect timeline 426.

Each timeline is associated with a project element set (e.g., of a particular project element category, or a layer). The timeline includes timing and sequence information for each of relevant project elements of the project element set. This timing information may include the start and end times for presentation or activation of a particular project element within the context of the relevant timeline, and/or sequence and duration information for each of the project elements. The timing information maintained within a particular timeline is further relative to a designated "main" project timeline, and/or an overall project duration.

Considering the main timeline 402 as an example, a timeline is associated with a project element set including four project elements in the form of clip elements 404, 406, 408, and 410. These project elements span the duration of a video project 302 (e.g., the playback duration of a video outputted by the video project 302).

The sequencing of the clip elements 404, 406, 408, and 410 is also maintained within the context of the main timeline 402, as well as the start and end times (or duration) of each of these clip elements. Similarly, the layer timeline 412 includes clip element 414 and clip element 416. It will be noted that these project elements do not span the entire duration of the project timeline, as defined by the main timeline 402.

A transition timeline 418 includes a single transition element 420, which may be applied to modify the transition between the clip element 404 and the clip element 406 within the main timeline 402.

The layout timeline 422 includes a single layout element 424, according to which clip elements in multiple project element sets (e.g., project elements of the main timeline 402, and auxiliary or supplemental project elements of the layer timeline 412) may be combined in an overlaid or split-screen fashion).

The effect timeline 426 includes three effect elements 428, effect element 430, effect element 432, which may apply one or more effects (or other augmentations) to project elements within the other timelines.

Main Video Editing User Interface 502

Figure 5:
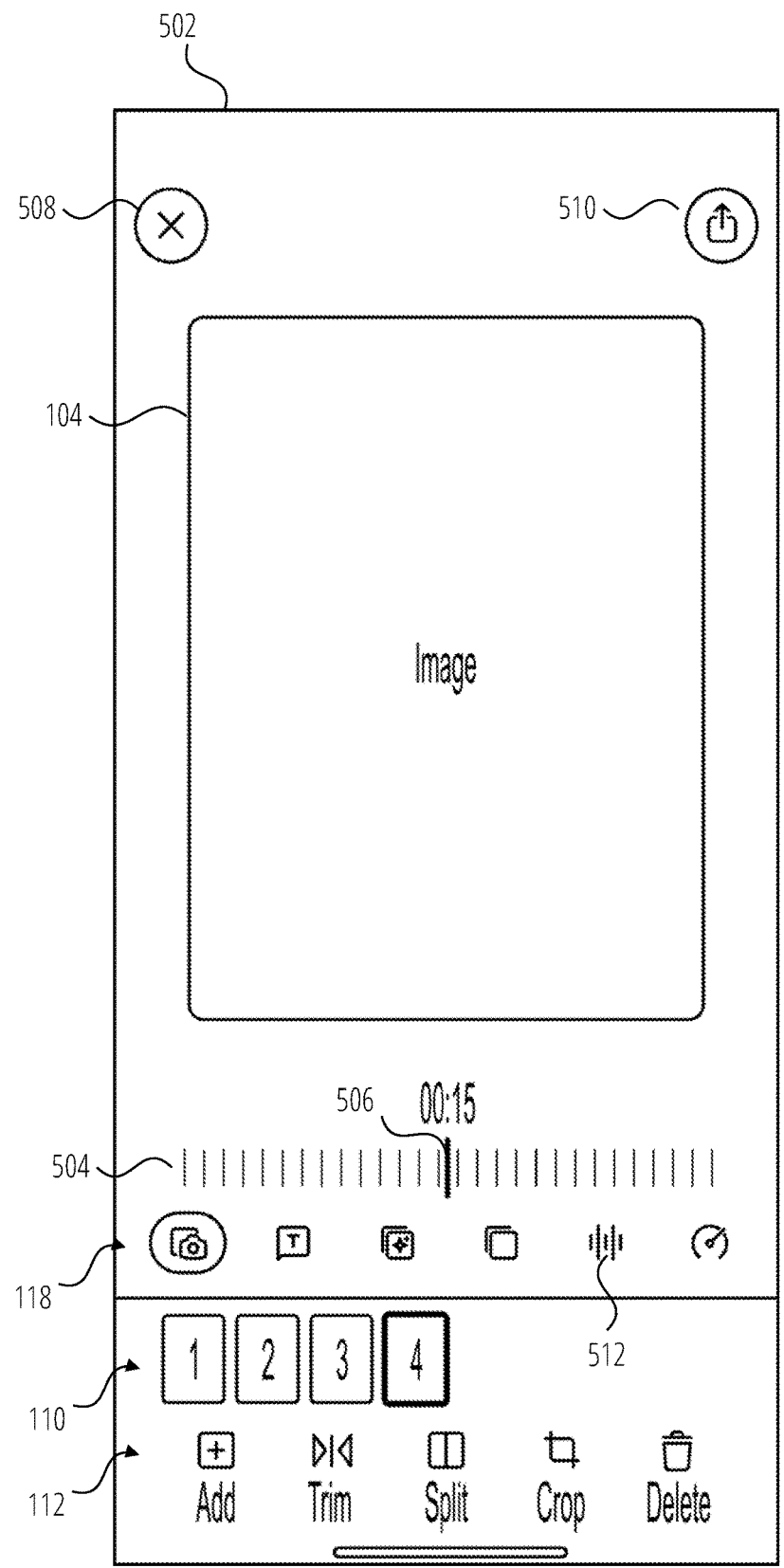
FIG. 5 is a user interface diagram illustrating a video editing user interface 502, according to some examples, which may be a specific implementation of the interface described with reference to FIG. 1.

FIG. 5 is a user interface diagram illustrating a main video editing user interface 502, according to some examples, which may be a specific implementation of the interface described with reference to FIG. 1.

The video editing user interface 502 includes the following elements:

A close button 508: the close button, when user selected, ensures that a particular video editing project is saved, dismisses the video editing user interface 502, and returns to a home/project listing screen.

The share button 510: the share button 510, when user selected, operates to save a particular video editing project and, if the project is not empty and exportable, transitions the project to a share screen (e.g., presented by an interaction client 2402 to enable sharing of a video editing project via an interaction system 2400).

A canvas 104: when playback of content within the canvas 104 is active, no visible user interface elements are presented within the canvas 104. When playback is paused, a playhead location tool, in the example form of a scrubber 504, is presented above the main tool bar 118. Further, a label (e.g., "tap to play") may be presented in conjunction with the canvas 104 to indicate a user interaction to resume playback on a project elements (e.g., a video clip) on the canvas 104. Accordingly, when playback is paused, the user may restart playback by interacting (e.g., tapping), on the canvas 104.

A main tool bar 118, project element carousel 110, and tool function bar 112: the tool navigation bar 118 is positioned between the canvas 104 and a project element carousel 110, and includes a horizontally scrollable list of tool icons, associated with a collection of video editing tools (e.g., those described above as being supported by the video editing application). User input (e.g., tapping) related to a particular tool icon operationally activates the corresponding video editing tool, and also causes display of a background to the relevant tool icon, thus providing a visual indication of which of the tools is currently selected and active. Activation of the relevant tool also updates the project element carousel 110 and the tool function bar 112 accordingly. For example, the project element carousel 110 may be updated to include project elements (e.g., media content) that are specific to the tool. Further examples of tool-specific project elements are described below. The updating of the tool function bar 112 also updates the collection of tool functions to show icons or other indicia representative of functions supported by the selected tool.

It should be noted that selecting a particular tool icon within the main tool bar 118 does not change the current playback state (e.g., play/pause). Further, during the playback of content within the canvas 104, the main tool bar 118 may be hidden.

A discussion of various example video editing user interface video editing user interfaces 502 that may be presented responsive to selection of different tools within the main tool bar 118 will not be provided.

Clip Tool 216

Figure 6:
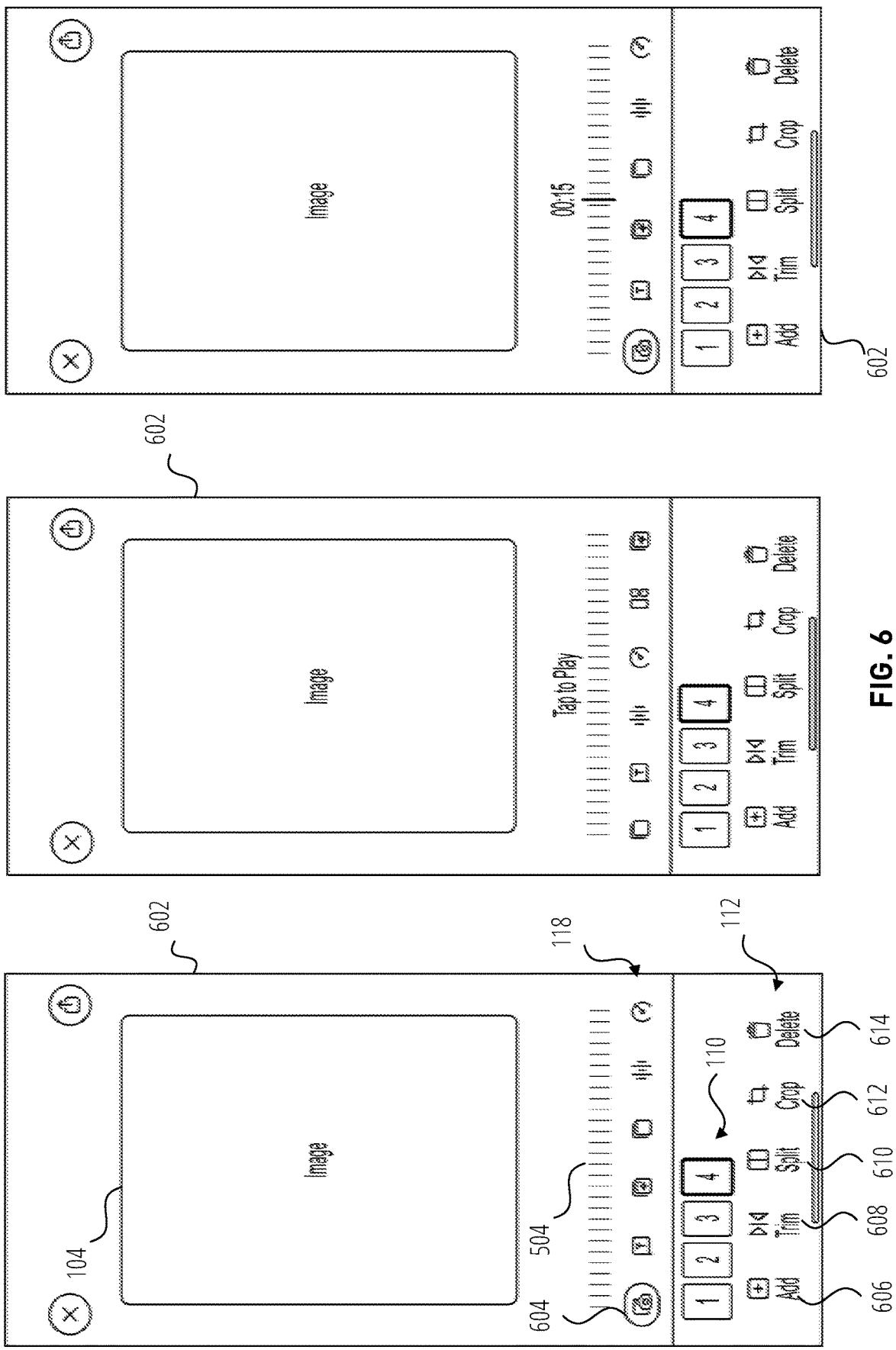
FIG. 6 is a user interface diagram showing a clip tool user interface, according to some examples.

FIG. 6 is a user interface diagram showing a clip tool user interface 602, according to some examples, presented by the video editing application 206 to allow use of the clip tool 216.

Referring back to FIG. 4, a main timeline 402 timeline is the main sequence of project elements (e.g., media elements or clip elements 404, such as videos and images) in a video project 302. The clip tool 216 allows users to add, delete, reorder, and edit the project elements in a main timeline 402 or lowest z-indexed layers in the video project 302. The project elements already in the main timeline 402 are visualized by a sequence of graphical elements such icons, or indicia (e.g., thumbnails) in a project element carousel 110. Tapping a thumbnail selects and activates the associated media element, and scrubs a playhead on the preview video, shown in the canvas 104, to the beginning of that image or video in the main timeline.

A tool function bar 112 presents a number of tool functions including:

An add button 606 that opens a media picker that allows using to select one or more images or videos from a device camera roll or from cloud storage. The selected media items are then appended to the main timeline. The user may further press-and-hold a thumbnail of a media element in the main timeline to change the chronological ordering (or playback ordering) of the project element within the context of the main timeline A trim button 608 that allows a user to set a later start point or early end point for the selected project element.

A split button 610 allows the user to split the selected project element into two at a specified time.

A crop button 612 that allows the user to scale and position the selected project element. This is useful when the images or videos in the man timeline are not already in a desired (e.g., 9×16 vertical) aspect ratio.

A delete button 614 that removes the selected element from the main timeline.

Figure 7:
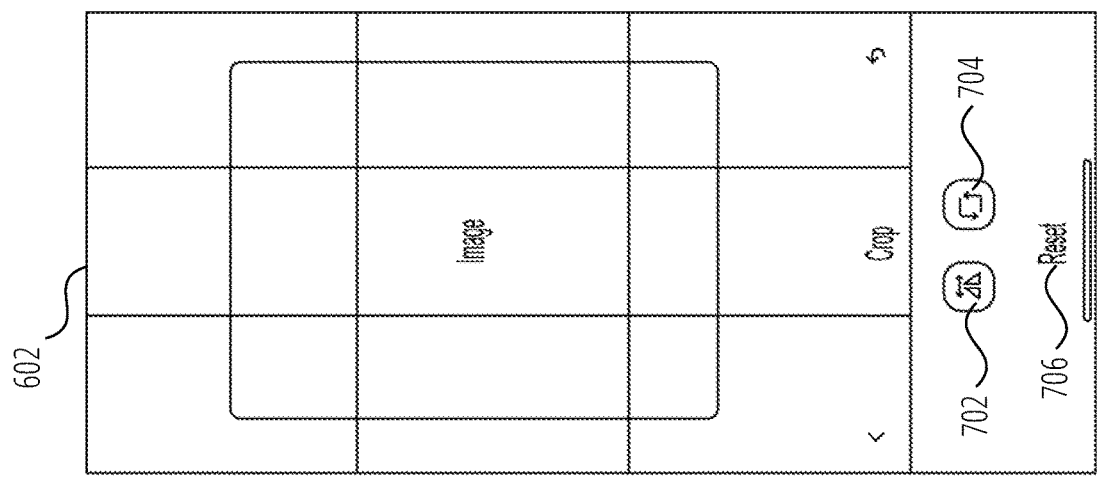
FIG. 7 is a user interface diagram illustrating various presentations of the clip tool user interface, according to some examples.
Figure 7:
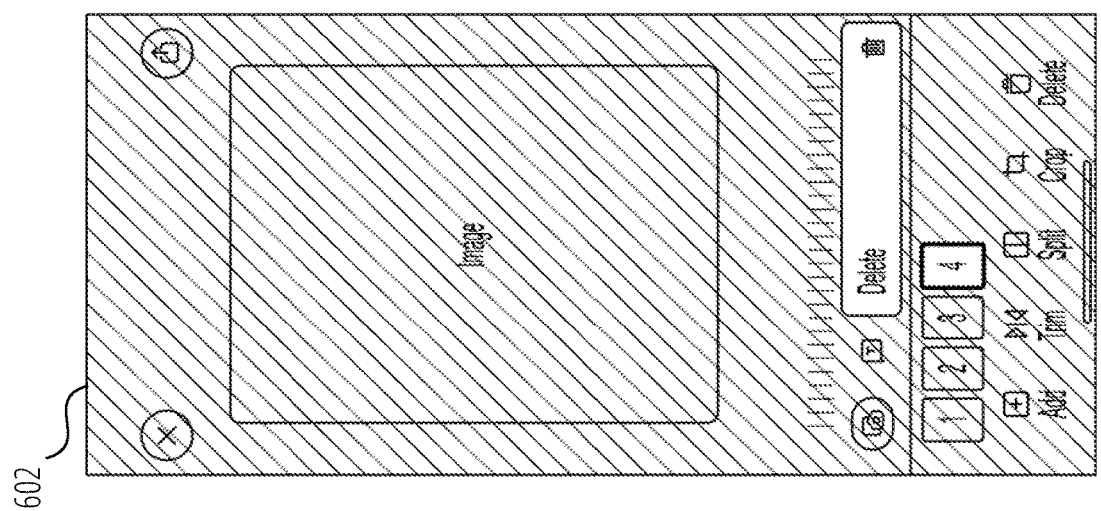
Figure 7:
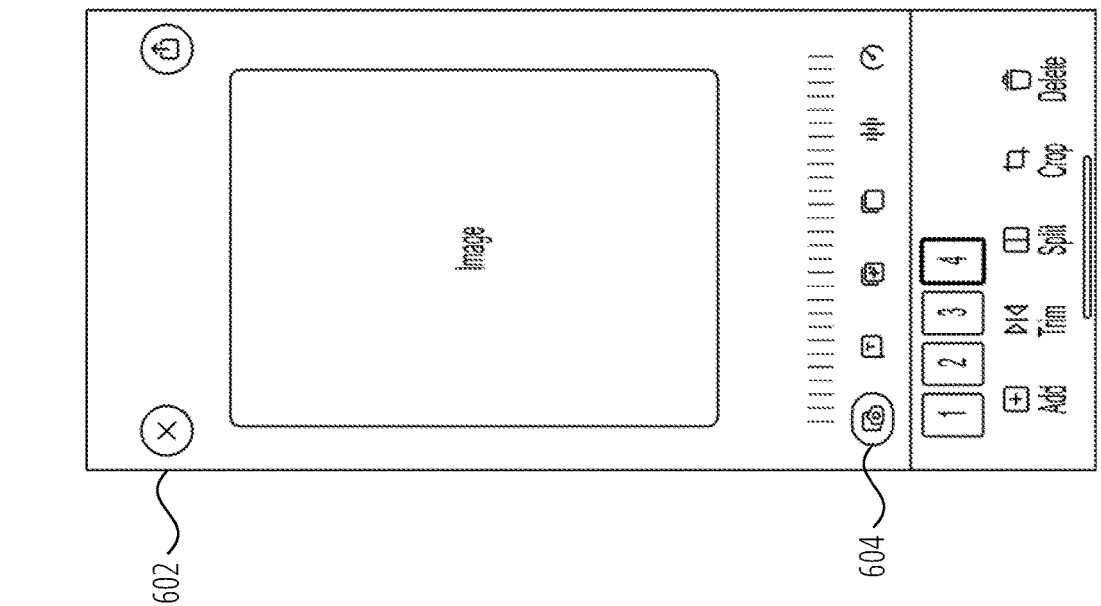

FIG. 7 is a user interface diagram illustrating various presentations of the clip tool user interface 602, according to some examples.

In order to activate the clip tool 216, the user selects (e.g., taps) a clip tool button 604 within the main tool bar 118. The clip tool 216, in some examples, allows a user to manage and manipulate project elements, in the form of timeline media (e.g., a sequence of videos and images that comprise lowest Z-index layers in a video editing project).

Within the clip tool user interface 602, below the canvas 104, are presented a project element carousel 110, and the tool function bar 112. The project element carousel 110 presents in indicia (e.g., clip indicia) representing a sequence of project elements (e.g., clips presented in the current, active project). Within the project element carousel 110, a sequence of clip indicia can be scrolled horizontally. Specifically, clip indicia are presented within the project element carousel 110 in an order in which the corresponding clips appear within the main timeline of the video editing project, when the relevant project is previewed (e.g., within the canvas 104), or rendered as a video project output.

Each in indicium associated with the clip in the project element carousel 110 may be a thumbnail based on a determined frame within the clip (e.g., the 45th frame within a video clip). For the various clips represented within the project element carousel 110, one is active at any particular time, as determined by a current position of the playhead 120. An active clip indicium may be visually distinguished from non-active clip indicium (e.g., with a red border or with some other visualization) within the project element carousel 110.

A position of the playhead 120 may be visualized within the scrubber 504 by shading an area of the scrubber 504 that is proportionate to the right of an offset within the clip, with a black 50% capacity overlay. Further, the clips to the right of an active clip may be fully shaded with a black 50% capacity overlay.

A first type of user interaction (e.g., tapping) on the clip indicium within the set of clip indicia within the project element carousel 110 relocates (e.g., advances or retreats) and sets the current position of the playhead to a selected frame (e.g., the first frame) of the selected clip in a particular video editing project.

Performing a second type of user interaction (e.g., a long press) on a clip indicium transfers the clip tool user interface 602 into a reorder mode, which allows clips to be reordered within the project timeline. For example, a user can select a clip indicium and drag and drop that clip indicium to a different position within the project element carousel 110 in order to reorder the sequence of project elements in the project timeline.

The tool function bar 112, which is presented below the project element carousel 110, contains a number of tool function buttons associated with specific functions mentioned above, namely an add button 606, a trim button 608, a split button 610, a crop button 612, and a delete button 614.

User selection of the add button 606 invokes a media selection function (e.g., presented by the operating system of a user device on which the video editing application is executing), which allows for the selection of one or more content items as project elements. Any selected media items are then added as distinct clips, with associated clip indicium, to the project element carousel 110, following any existing clip indicium presented within the project element carousel 110.

The trim button 608 invokes a modal trimming user interface sequence for a currently selected an active clip. The trim modal user interface sequence contains a number of elements, including a full-screen preview canvas, a back navigation button, a commit button, and an abstract timeline that is caused to be displayed in conjunction with a double-ended range slider.

The preview canvas 104 provides the same playback functionality and scrubbing gestures as described above. Playback is also limited to a current clip, and playback is paused upon entering the trim modal user interface sequence.

The back navigation button discards any trimming changes that may have been made using the trim modal user interface sequence, while the commit button applies trim edits to a currently active clip in a non-destructive manner and creates a new history state for the relevant video editing project.

Figure 8:
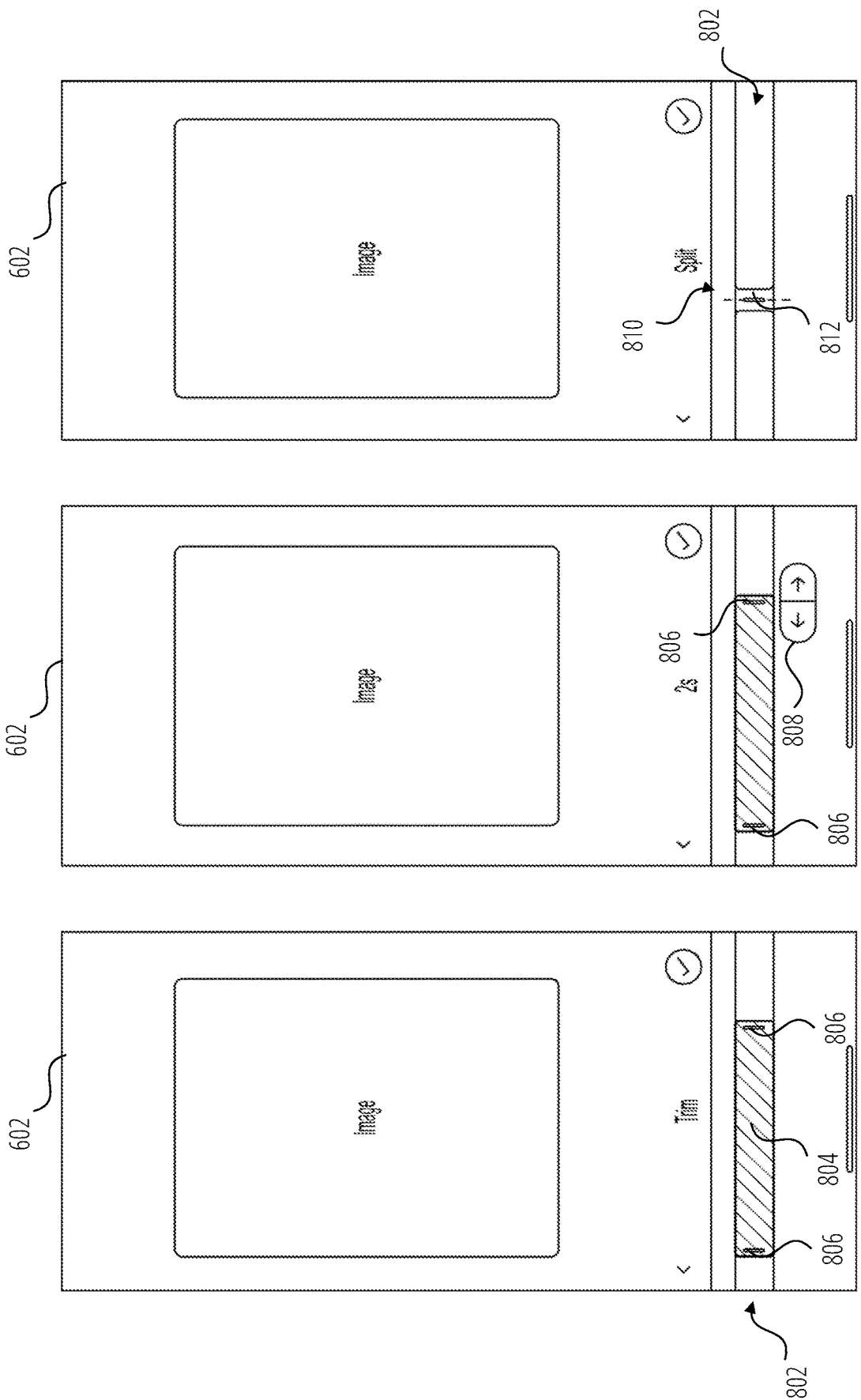
FIG. 8 is a user interface diagram illustrating an abstract timeline within the context of a clip tool user interface, according to some examples.

FIG. 8 is a user interface diagram illustrating an abstract timeline 802 within the context of a clip tool user interface 602, according to some examples. The abstract timeline 802 visualizes the full extent of a currently active clip and shows a currently selected portion of the active clip. The abstract timeline 802 depicts the selected portion with an overlaid and double-ended range slider 804, which is bounded by a pair of handles 806. For an active clip that has not been previously trimmed, the handles 806 span the full extent of the abstract timeline 802 by default.

The user is able to drag each of the handles 806 within the abstract timeline 802 to adjust the selected portion of the active clip. Dragging a handle 806 changes the current position of the playhead 120 to equal the position of the dragged handle 806. Dragging a handle 806 also pauses playback within the canvas.

Ending a drag, or tapping on a handle 806, triggers the generation and display of ephemeral frame step previous/next buttons 808. The frame step previous/next buttons 808 advantageously provide a greater and higher resolution degree of control or to a user with respect to the movement of a particular handle 806.

Further, within the clip tool user interface 602, if there is no active clip, the trim button is disabled. Further, if the active clip is an image, the trim modal user interfaces change such that the abstract timeline 802 displays the total duration of the image within the main timeline. A set default duration for an image may be used as an initial duration (e.g., 5 seconds), but the user may manipulate the handles 806 to update the duration, down to a certain minimum duration (e.g., one second) and up to a certain maximum duration (e.g., 60 seconds).

User selection of the split button 610 invokes a split modal user interface sequence for a currently selected, active clip. The split modal user interface sequence includes a full-screen preview canvas 104, a back navigation button, a commit button, and an abstract timeline 802 displayed beneath the single-ended range slider 810. The abstract timeline 802 visualizes the full extent of the clip, and a single handle 812 is centered within the abstract timeline 802 by default. Dragging the handle 812 changes the current position of the playhead 120 to correspond to the position of the handle 812. Starting a drag operation with respect to the handle 812 causes playback. Ending a drag operation of the handle 812, or tapping the handle 812, triggers generation display of a frame step previous/next buttons 808

As with the trim modal user interface sequence, if there is no active clip, the split button 610 is disabled. Also, if the active clip is an image, the split button 610 is likewise disabled.

Returning to FIG. 7, user selection of the crop button 612 invokes the crop tool and specifically a crop modal user interface sequence for a currently selected and active clip. As with the other tools, the crop modal user interface sequence includes a full-screen preview canvas 104, a back navigation button, and a commit button, and then further includes a mirror button 702, a rotate button 704, and a reset button 706.

The preview canvas 104 within the crop modal user interface sequence supports playback and scrubbing gestures as described above for other canvas instances. The preview canvas 104 additionally supports pinch-to-scale, twist-to-rotate, and drag-to-translate gestures that update the transform of the current clip with respect to a viewport.

The mirror button 702 and the rotate button 704 apply corresponding transforms, while the reset button 706 resets the transforms to origin. Again, if there is no active clip, the crop button 612 is disabled.

The delete button 614 removes a currently active clip from the video editing project after confirmation. If there is no active clip, the delete button 614 is similarly disabled and not displayed within the clip tool user interface 602.

Layer Tool 218

Figure 9:
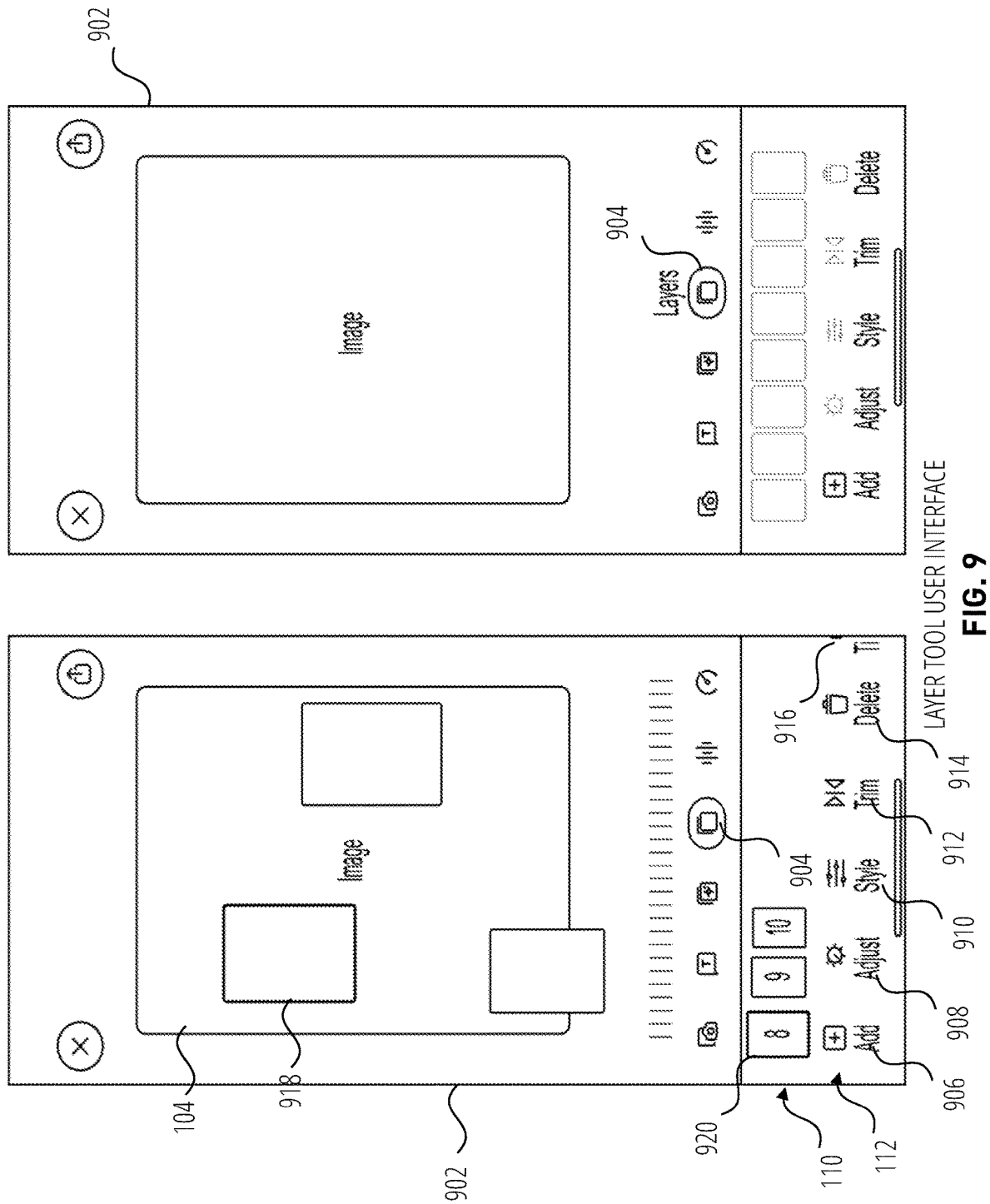
FIG. 9 is a user interface diagram illustrating a layer tool user interface, according to some examples.

FIG. 9 is a user interface diagram illustrating a layer tool user interface 902, according to some examples, presented by the video editing application 206 to allow use of the layer tool 218. User selection of a layers tool button 904 within the video editing user interface 502 activates the layer tool 218 and causes presentation of the layer tool user interface 902.

Layers may be sets of project elements (e.g., images or videos) that appear "on top" of a main timeline 402 (e.g., in the z-index) in a layer timeline 412. Unlike project elements of the main timeline 402, many layers may be visible at once within the canvas 104 of the layer tool user interface 902. The layers already in a video project 302 are visualized by a sequence of icons or indicia (e.g., thumbnails) within the project element carousel 110, and also as layer images 918 within the canvas 104. User-selection of a layer image 918 within the canvas 104 automatically selects a corresponding layer indicium 920 within the project element carousel 110, and vice versa. Within the canvas 104, an active layer image 918 is visually distinguished (e.g., by highlighting or a border color change) from non-active layer images. The active layer image 918 is further moved to the front of the z-index relative to other layer images.

Within the project element carousel 110, tapping a layer indicium 920 (e.g., a thumbnail) associated with a particular layer selects and activates the layer, and scrubs the playhead 506 to where that layer first appears chronologically in the video project 302.

As noted, the project element carousel 110 represents the layers present in the current project as a sorted list of layer indicia 920 that scrolls horizontally. Layer indicia 920 are sorted by the start time of the represented layer project element. For layer project elements that have the same start time, these are sorted internally by end time ascending, and then by the order in which the layer project elements were added to a video editing project. If there are layer indicia 920 in the carousel, then at most one is active. Whenever the layer tool 218 is opened, a first layer indicia 920 in the project element carousel 110 at the current playhead position is active. Otherwise, no edit is active.

The layer tool 218 includes a number of tool functions for which buttons are presented in a tool function bar 112 of the layer tool user interface 902, these buttons including:

An add button 906 opens a media picker that allows users to select one or more project elements (e.g., images or videos) from a device camera roll or remote storage, in which selected project elements are added as new layers. By default, new layers are visible for the same duration as the project element of the main timeline 402 currently visible in the preview video shown in the canvas 104.

An adjust button 908 invokes functionality similar to the described with respect to the trim tool 234.

A style button 910 invokes a style tool that allows for application of a preset or definable visual style to the active layer project element.

A trim button 912 allows the user to choose a later start point or earlier end point for the selected video layer. The trim buttons 912 invokes the trim tool 234, which operates as described elsewhere herein.

A timing button 916 allows the user to specify when a selected layer should be visible in a video editing projected. A timing control user interface, invoked by user-selection of the timing button 916, is described below.

A delete button 914 removes the selected layer from a video project 302.

Caption Tool 220

Figure 10:
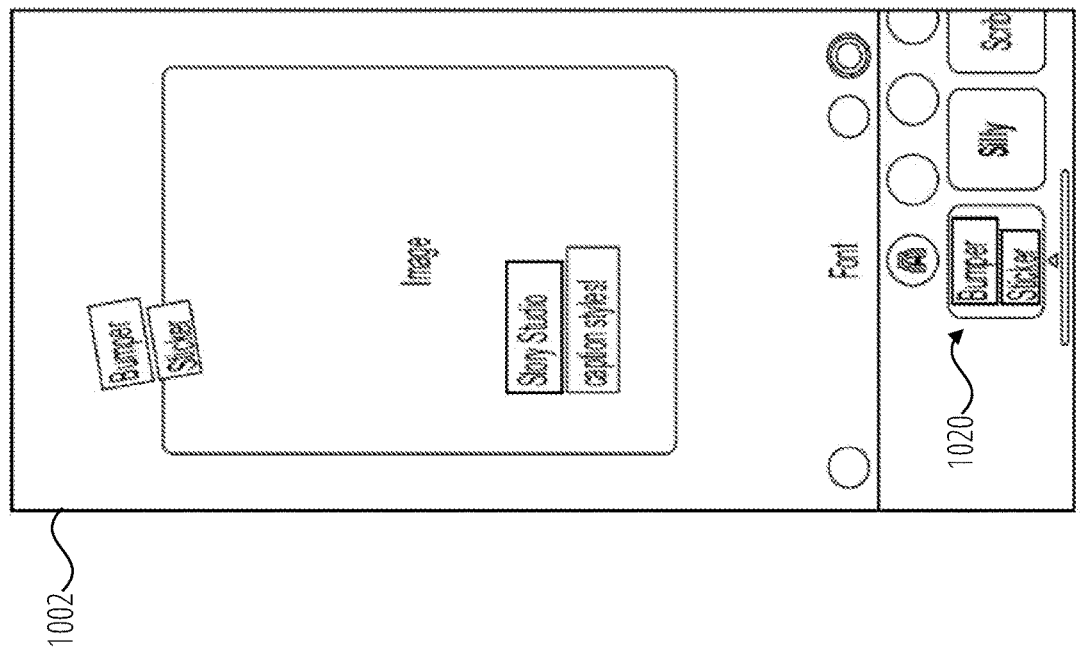
FIG. 10 is a user interface diagram showing a caption tool user interface, according to some examples.
Figure 10:
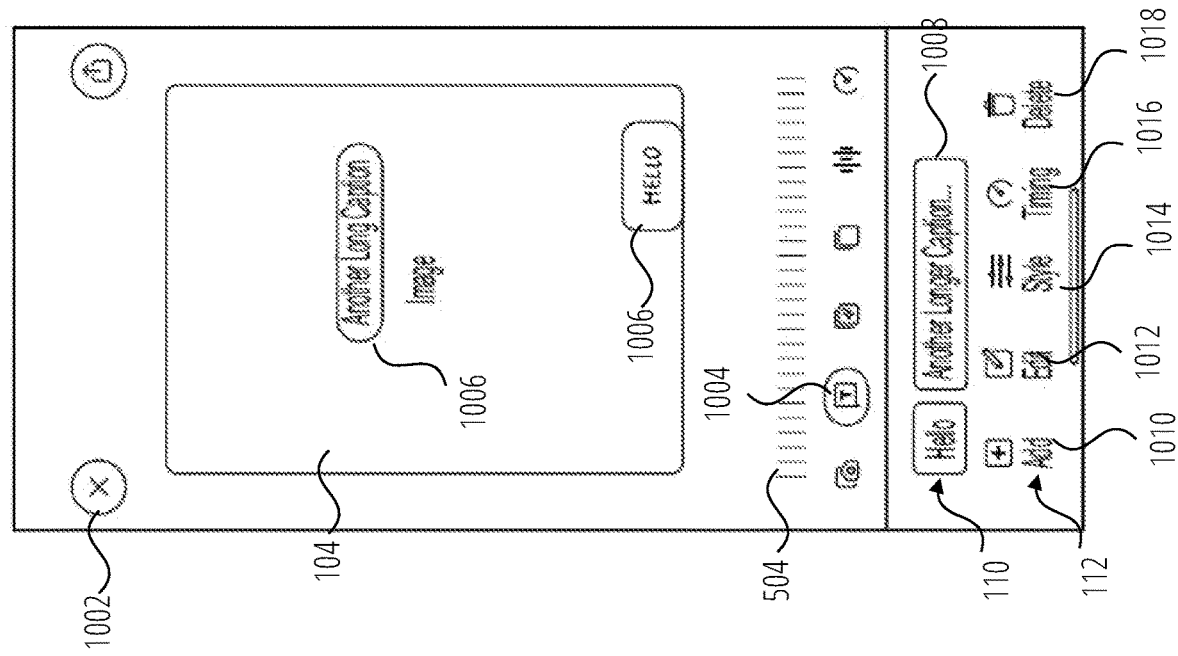

FIG. 10 is a user interface diagram showing a caption tool user interface 1002, according to some examples, presented by the video editing application 206 to allow use of the caption tool 220. User selection of a caption tool button 1004 within the video editing user interface 502 activates the caption tool 220 and causes generation and presentation of the caption tool user interface 1002 by the video editing application 206 of a display of a client system 106.

Captions, according to some examples, are created using the caption tool 220 and are styled text elements that appear on top of project elements (e.g., images and video elements) of a main timeline. As with the layer tool user interface 902, there can be many captions 1006 visible concurrently in the canvas 104.

Within the project element carousel 110, a sequence of graphic elements in the example form of caption indicia 1008 (e.g., thumbnails) representing project elements in the form of captions already in a video editing project are presented.

Tapping a caption indicium 1008 selects the associated caption and scrubs the playhead 120 in the preview video editing canvas 104 to where that caption first appears in a video editing project. Tapping a caption on the canvas 104 also selects the caption. The list of caption indicia 1008 scrolls horizontally and is sorted by the start time of the relevant caption. For captions that have the same start time, these are sorted internally by end time ascending, and then by the order in which the captions were added to the video editing project. If there are caption indicia 1008 in the project element carousel 110, then at most one is active. When the caption tool 220 is open, the first caption indicium 1008 in the project element carousel 110 at the current playhead position is active, if such an edit exists. Otherwise, no edit is active. Each caption indicium 1008 shows the initial segment of text from the corresponding caption, truncating it with an ellipsis if necessary.

A tool function bar 112 presented within the caption tool user interface 1002 includes the following function buttons:

An add button 1010 creates a new caption and opens the new caption in an edit mode. A user manipulates a software keyboard to edit the text in the caption. A caption style is selected by scrolling the horizontal style list 1020. A slider may be used to change the caption's font size. Tapping a color swatch opens a color picker, which enables a user to choose a new primary color for the caption. Tapping an alignment icon cycles between left, center, and right horizontal alignment options. Tapping a Done button saves the changes that a user has made to a caption. By default, new captions are visible for the same duration as the project element of the main timeline 402 currently visible in the canvas 104.

An edit button 1012 opens a selected caption in the edit mode, as described above.

A style button 1014 invokes a style tool that allows for application of a preset or definable visual style to the active caption project element.

A timing button 1016 allows a user to specify when the caption should be visible in a video editing project. The timing control is described elsewhere herein.

A timing button 1018 removes the selected caption from a video project 302.

Audio Tool 222

Figure 11:
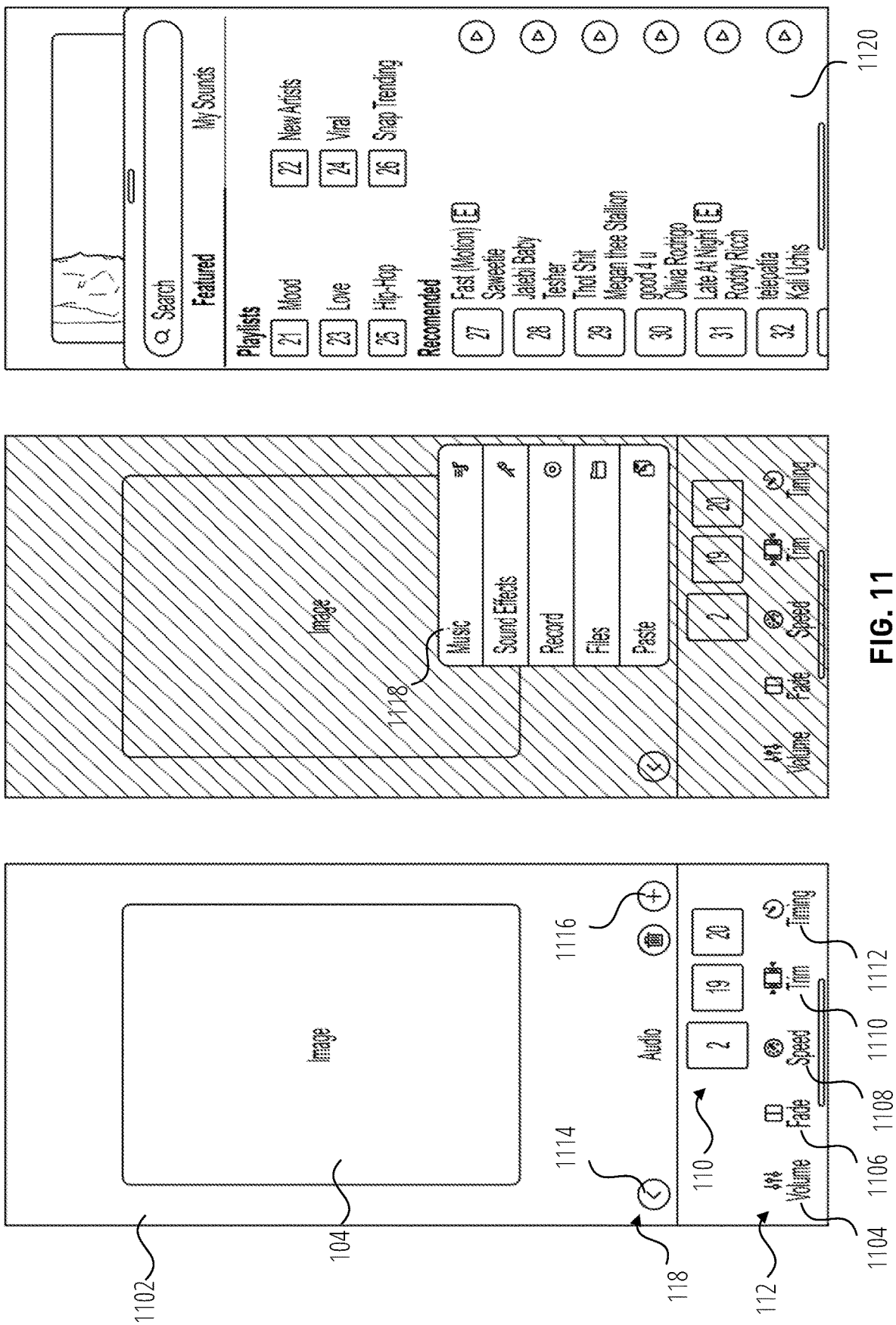
FIG. 11 depicts an audio add function that may, in some examples, be presented responsive to user selection of the add button.

FIG. 11 is a user interface diagram illustrating an audio tool user interface 1102, according to some examples, presented by the video editing application 206 to allow use of the audio tool 222. User selection of an audio tool button 512 within the video editing user interface 502 activates the audio tool 222 and causes presentation of the audio tool user interface 1102

The audio tool user interface 1102 includes a canvas 104, a tool navigation bar 118, a project element carousel 110, and a tool function bar 112.

The tool navigation bar 118 includes the following controls: a back control 1114 and commit control 1116. The back control 1114 exits the audio tool user interface 1102 and returns to the main video editing user interface 502. An undo button (not shown) reverses the most recent change made to the project in the current editing session from within the audio tool 222. If no changes have been made to the project with the audio tool 222 in the editing session then the undo button is disabled.

The project element carousel 110 below the canvas 104 and tool navigation bar 118 shows a horizontally scrollable list of project element indicia (e.g., thumbnails), each of which represents an audio project element (e.g., an audio track or clip). The audio tool 222 allows a user to add audio tracks to a video editing project that playback along with the media in a main timeline. Audio tracks already in a video editing project, including audio tracks from timeline videos and video layers, are visualized by the sequence of representative indicium or icons (e.g., thumbnail images). Tapping a project element indicia in the project element carousel 110 selects the audio track and scrubs the playhead 120 to where that audio track first appears in a video editing project.

Within the project element carousel 110, the project element indicia are sorted by the start time of the corresponding audio track. For audio tracks that have the same start time, corresponding project element indicia are sorted by end-time ascending, and then by the order in which the audio tracks were added. An audio track that may be associated with each video clip in the timeline, as well as each video layer, is considered an audio edit, and is visualized in the Edit Carousel along with additional audio edits that have been added.

When the audio tool user interface 1102 is open, the audio track associated with first project element indicium and at the current playhead position is active. For licensed music tracks, the associated album artwork is used as the thumbnail in a first aspect. For other sources, a second aspect may be used.

Figure 12:
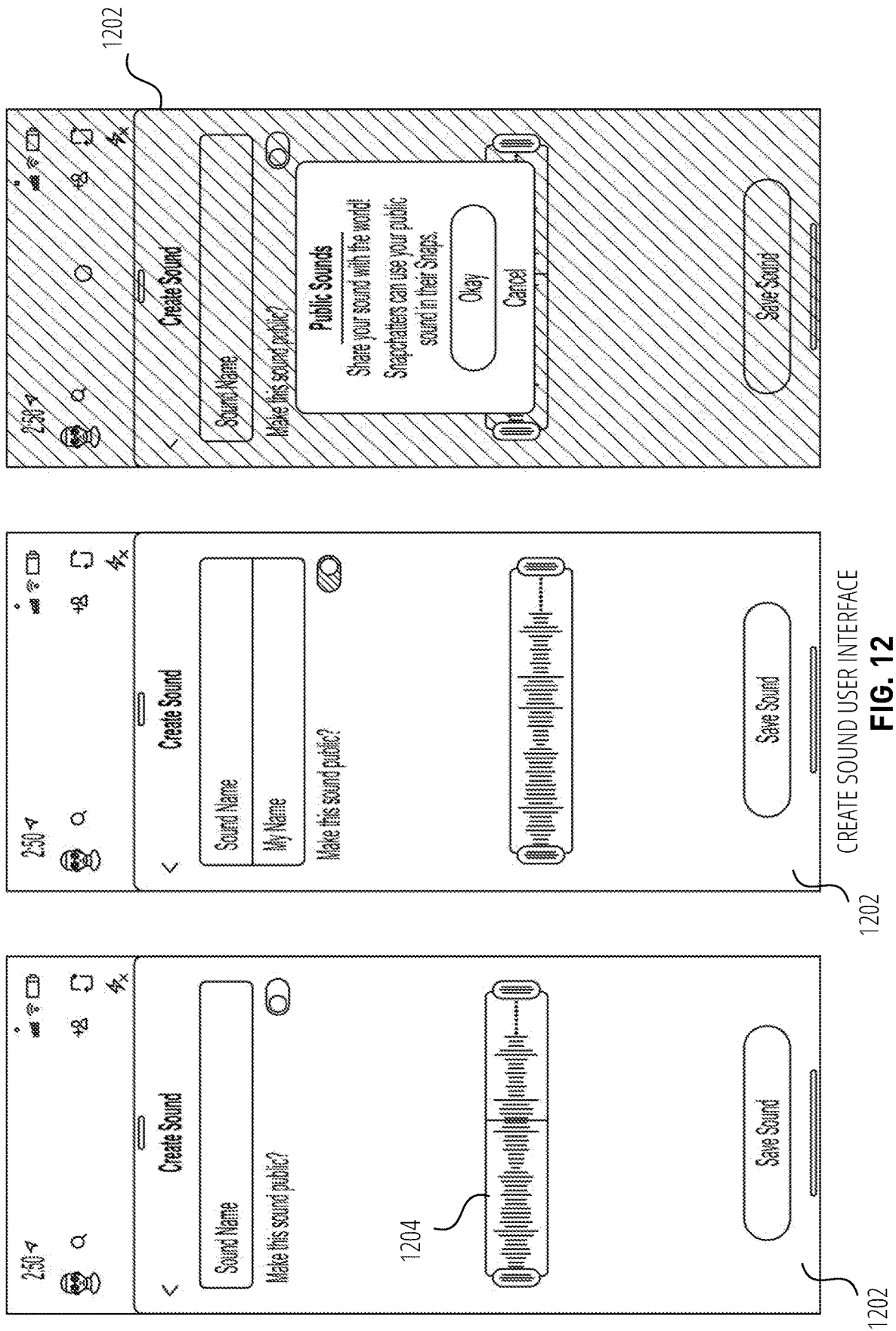
FIG. 12 is a user interface diagram for a create sound user interface, according to some examples.

The tool function bar 112 includes buttons associated with a number of tool functions of the audio tool 222, for example:

An add button (not shown) that invokes an audio add function.
FIG. 11 depicts an audio add function that may, in some examples, be presented responsive to user selection of the add button. Specifically, an audio source menu 1118 may be presented responsive to user selection of the add button, the audio source menu 1118 presenting a number of channels or mechanisms for addition of an audio track to the 110. The channels or mechanisms may include:
A music and sound effects selection that is presented within the context of the video editing application 206. For example, user selection of the music option within the audio source menu 1118 presents a music selection user interface 1120 that enables a user to perform a text search of music made available by the interaction system 2400. The music selection user interface 1120 also presents a selection of playlists and recommended music that the user can select for inclusion within the video editing project main timeline.
A recording or sound creation mechanism that may be presented to enable a user to create an audio track (see user interfaces shown in FIG. 12))
A file selection option, which invokes an operating system media picker that allows a user to select one or more audio files from a device or cloud storage.
paste option, using which a user can from another application or source.
FIG. 12 is a user interface diagram for a create sound user interface 1202, according to some examples, that may be presented responsive to user-selection of the record option in the audio source menu 1118.

Using the create sound user interface 1202, a user can record an audio track, name the audio track, and indicate whether the audio track is to be made publicly available by the interaction system 2400 and via the video editing application 206. The create sound user interface 1202 is shown to include an audio double-ended slider control 1204 allowing a user to clip the created audio track.

Figure 13:
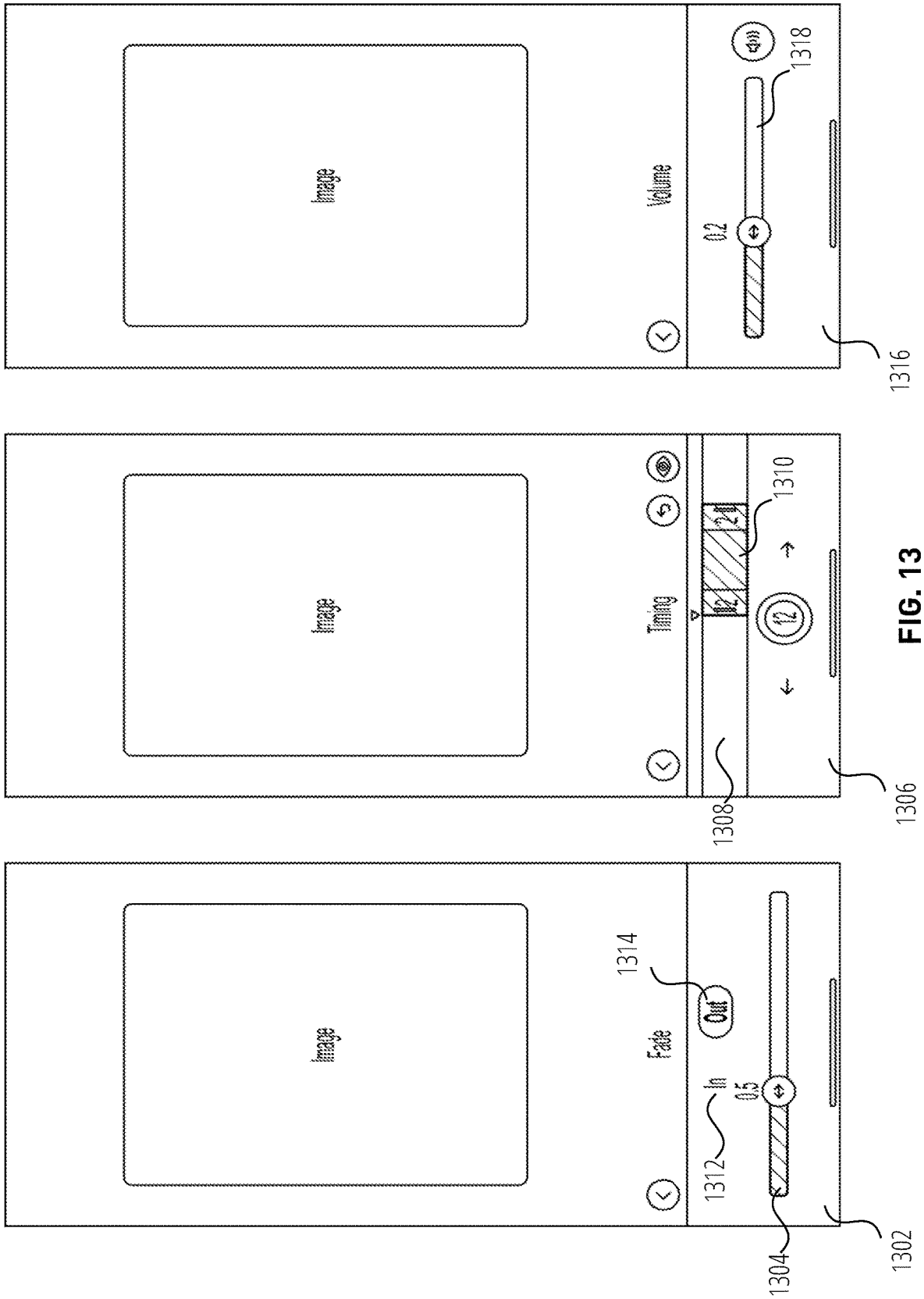
FIG. 13 depicts a fade user interface, according to some examples, with a fade control slider, that is generated and displayed responsive to user-selection of the fade button 1106.

A volume button 1104 allows a user to change the volume of the selected audio track. The relative volume of the audio edit may be represented by a number between 0 and 100, with 0 indicating that the audio track is fully attenuated (muted) and 100 that the audio track is not at all attenuated. A default value is 100. FIG. 13 illustrated a volume control user interface 1316, according to some examples, that include a volume slider 1318 that can be manipulated by a user to set the relative volume of the audio track.

A fade button 1106 allows a user to fade in and/or fade out the selected audio track over specified durations. FIG. 13 shows an example fade user interface 1302, with a fade control slider 1304, that is generated and displayed responsive to user-selection of the fade button 1106. The fade control slider 1304 allows a user to apply a particular timing to a fade in or fade out to an active audio track. A fade in selector 1312 and a fade out selector 1314 allow a user to selected either a fade in or out to which the timing is to be applied.

A speed button 1108 invokes the speed tool 228, as described elsewhere herein.

A trim button 1110 invokes the timing control 230, which allows a user to choose a later start point or earlier end point for the selected audio track.

A timing button 1112 invokes the timing control 230, which allows a user to specify when the audio track should be present in a video editing project. FIG. 13 shows an example timing control user interface 1306 that is generated responsive to responsive to user-selection of the timing button 1112 and that includes an abstract timeline 1308 and a double-ended range slider 1310. The double-ended range slider 1310 allows the user to set the start and stop times for the current audio track. In the context of the audio tool 222, a maximum duration (as reflected by the extent of the abstract timeline 1308) that can be specified is equal to the minimum of either the total asset duration, or a set maximum time (e.g., 45 s).

A delete button (not shown) removes the selected audio track from a video editing project.

A user can add sounds from external applications to video projects 302 using the audio tool 222. While editing the video editing application, a user taps an audio icon associated with the audio tool 222 in the tool navigation bar 118, then taps Add, and then tap Sounds.

From a sounds dialog, a user can browse songs, or search for songs by name, that are available in one or more external applications. The My Sounds tab shows sounds created previously in, for example, the video editing application 206.

Effect Tool 224

Figure 14:
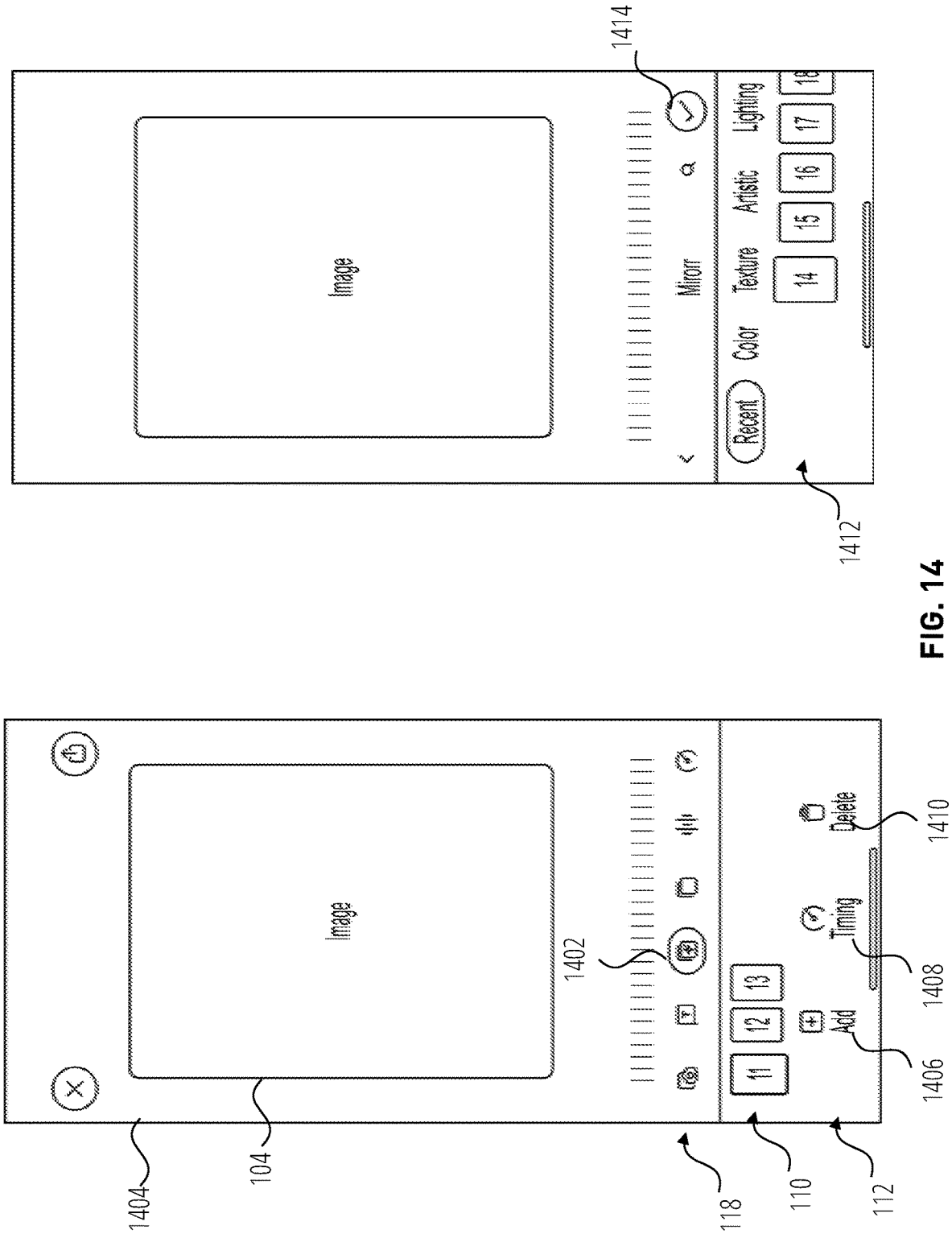
FIG. 14 is a user interface diagram illustrating an effect tool user interface 1404, according to some examples

FIG. 14 is a user interface diagram illustrating an effect tool user interface 1404, according to some examples, presented by the video editing application 206 to allow use of the effect tool 224. User selection of an effect tool button 1402 within the tool navigation bar 118 of the video editing user interface 502 activates the effect tool 224 and causes presentation of the effect tool user interface 1404.

An effect tool 224 allows a user to apply visual effects to project elements in the main timeline 402 or layer timelines 412 using media augmentation project elements (e.g., lenses or effects).

Effects already applied to a video editing project are visualized by a sequence of project element indicia (e.g., thumbnails) within the project element carousel 110. Tapping a thumbnail selects an effect and scrubs the playhead 120 to where that effect first appears in a video project 302. The list or sequence of thumbnails scrolls horizontally within the project element carousel 110. Effects are sorted by the start time of the effect. For effects that have the same start time, these are sorted internally by end-time ascending, and then by the order in which the edits were added. If there are effects in the project element carousel 110, then at most one is active. When the effect tool 224 is open, the first transition in the project element carousel 110 at the current playhead 120 position is active, if such an effect exists. Otherwise, no effect is active.

The tool function bar 112 of the effect tool user interface 1404 includes several function buttons, including for example:
- An add button 1406 that opens an effect selection interface 1412 that allows a user to browse and preview different effects (e.g., lenses). The available effects may change over time. Tapping a checkmark button 1414 applies an effect to a project element (e.g., image or video) currently visible in the preview canvas 104. If multiple lenses are applied simultaneously, the most recently applied lens will be visualized.
- A timing button 1408 that activates the timing control 230 and allows a user to specify when effects should be visible in a video editing project.
- A delete button 1410 removes a selected effect from a video editing project.

Transition Tool 226

Figure 15:
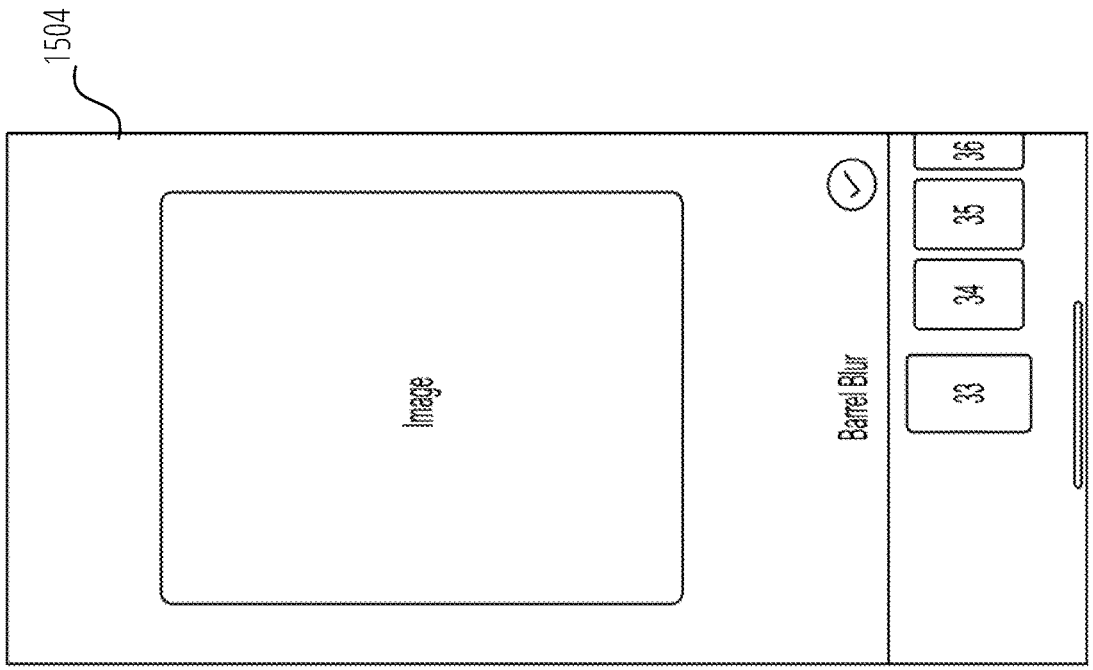
FIG. 15 is a user interface diagram illustrating a transition tool interface, according to some examples
Figure 15:
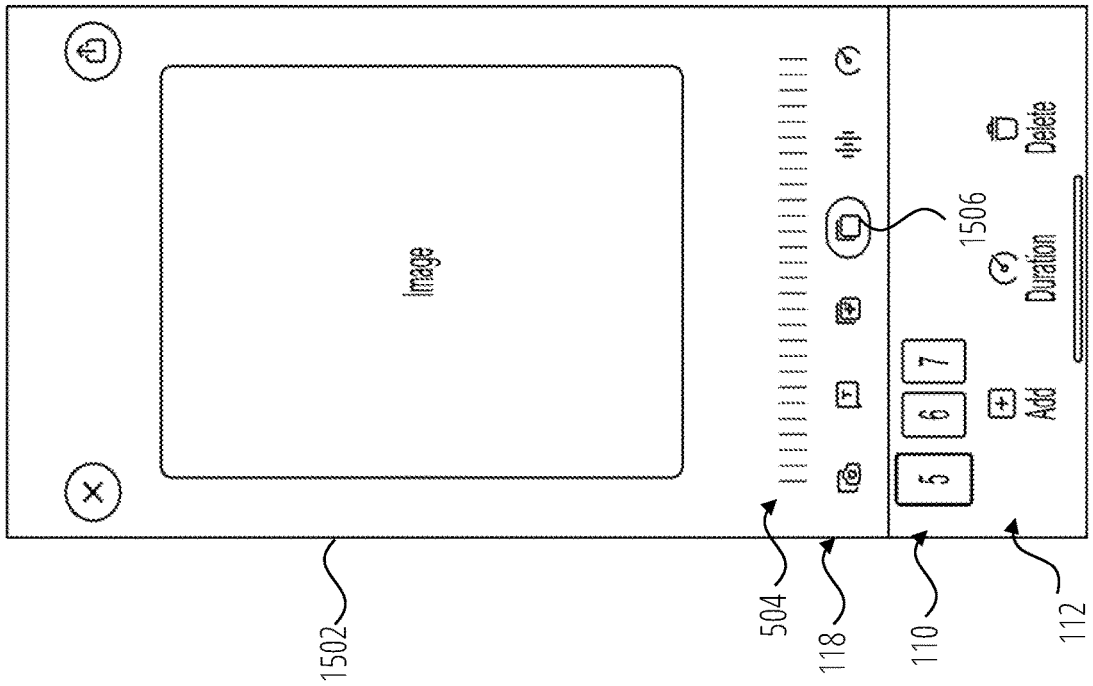

FIG. 15 is a user interface diagram illustrating a transition tool interface 1502, according to some examples, presented by the video editing application 206 to allow use of the transition tool 226. User selection of a transition tool button 1506 within the tool navigation bar 118 of the video editing user interface 502 activates the transition tool 226 and causes presentation of the transition tool interface 1502.

Transitions, according to some examples, are created using a transition tool 226, are visual effects that blend two adjacent timeline project elements together.

Transitions already applied to a video editing project are visualized by a sequence of thumbnails. Tapping a thumbnail selects the transition and scrubs the playhead to where that transition first appears in a video editing project. Transitions are applied in post-capture mode to timeline media. Transitions are applied to all visual project elements, including timeline media, layers, captions, and effects. Transitions mix together the audio tracks in the adjacent pair of clips while active. One transition can be applied to an adjacent pair of clips. One transition can be rendered at once. If two transitions overlap, the latter is rendered.

The tool function bar 112 provides buttons for a number of functions of the transition tool 226, including, for example:
1. An add button opens an interface that allows a user to browse and preview different transitions. The available transitions may change over time. Tapping a yellow checkmark applies a transition to the end of the timeline project element currently visible in the preview canvas 104. In some examples, one transition can be applied to a given project element. If a transition is already present on a project element visible in the canvas 104, the Add button is disabled.
2. A duration button allows a user to specify the duration of the transition, using a duration control or duration tool.
3. A delete button removes the selected transition from a video editing project.

Speed Tool 228

Figure 16:
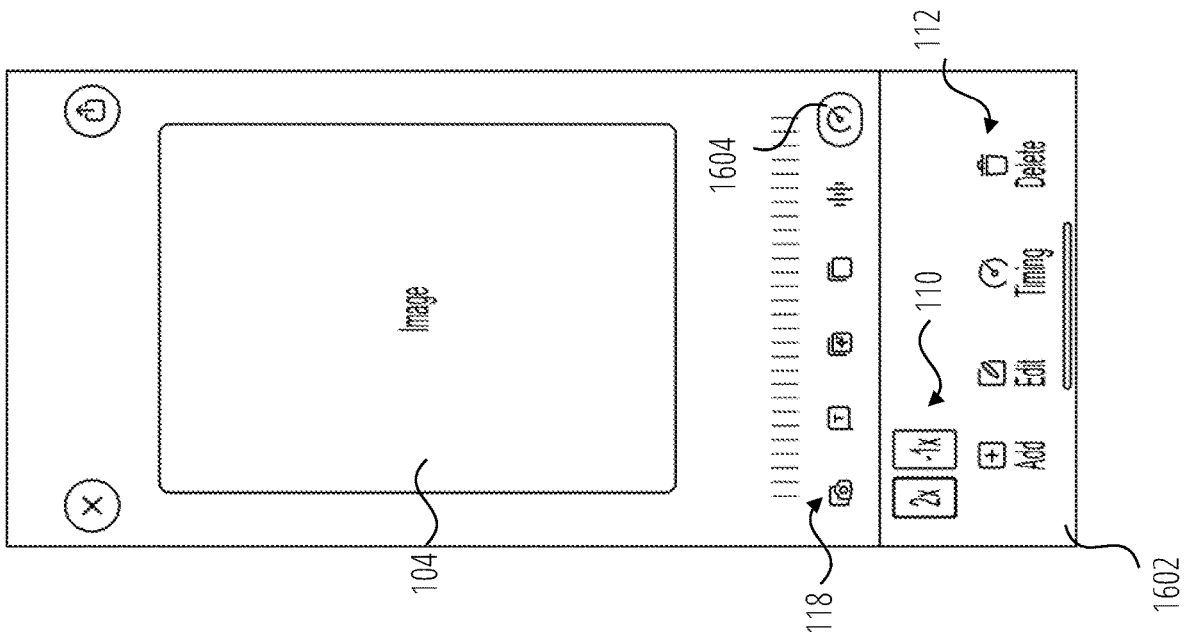
FIG. 16 is a user interface diagram illustrating a speed tool user interface, according to some examples
Figure 16:
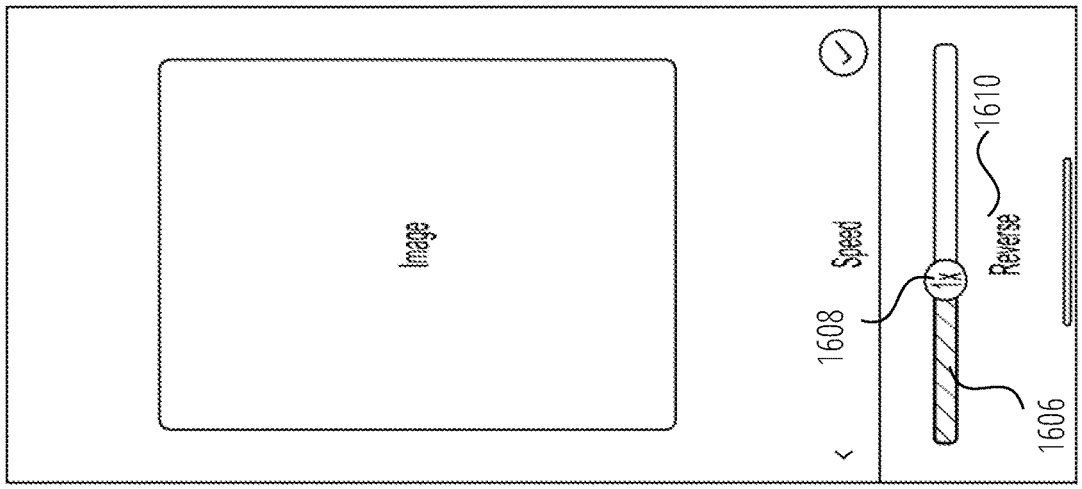
Figure 16:
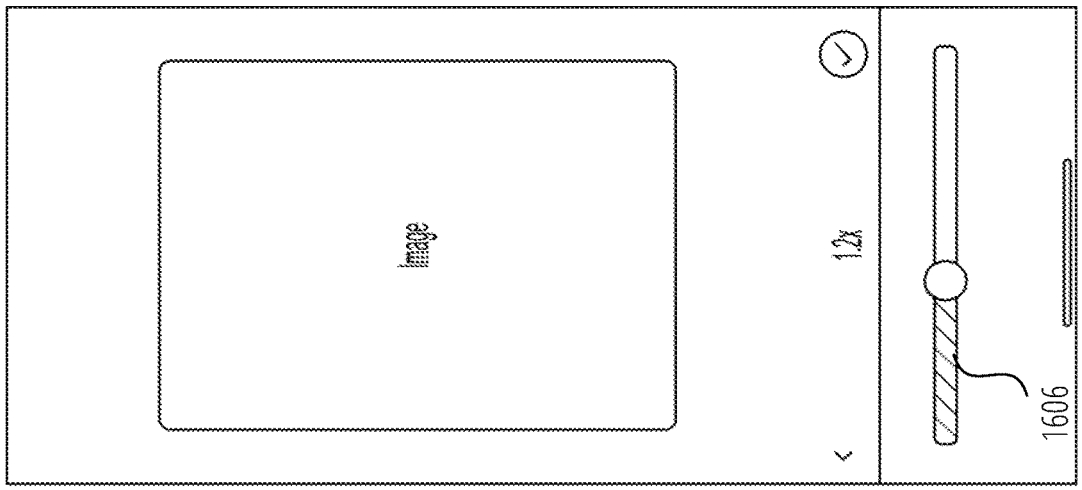

FIG. 16 is a user interface diagram illustrating a speed tool user interface 1602, according to some examples, presented by the video editing application 206 to allow use of the speed tool 228. User selection of a speed tool button 1604 within the tool navigation bar 118 of the video editing user interface 502 activates the speed tool 228 and causes presentation of the speed tool user interface 1602.

The speed tool 228 allows a user to speed up or slow the presentation, or change the direction of playback, of specific parts (e.g., project elements) of a video editing project timeline in the canvas 104. Speed changes already present in a video editing project are visualized by a sequence of project element indicia (e.g., thumbnails) in the project element carousel 110. Tapping a thumbnail selects the associated speed change and scrubs the playhead 120 to where the change first appears in a video editing project.

The tool function bar 112 includes buttons to active or apply several functions of the speed tool 228, these button including for example:
- An add button opens an interface that allows a user to choose a speed multiplier. Choosing a multiplier between 0 and 1 will slow the video down, and choosing a multiplier greater than 1 will speed the video up. Choosing a negative multiplier will cause the timeline to play in reverse. By default, new speed changes are present for the same duration as the timeline element currently visible in the preview canvas.
- An edit button allows a user to change the speed multiplier of the selected speed change. User selection of the edit button causes presentation of a speed multiplier range slider 1606. A current speed multiplier value is displayed in a drag button 1608 of the speed multiplier range slider 1606. After the speed multiplier range slider 1606 is changed and the drag operation using the drag button 1608 ends, a speed-change effect may be immediately (but not permanently) applied in the preview canvas 104. The currently visible clip is played back once, and then the playhead 120 is returned to its initial position. A reverse toggle button 1610, which is disabled by default, is also presented. When the reverse toggle button 1610 is enabled, the speed multiplier value displayed in the drag button 1608 is made negative.
- A timing button activates the timing control 230 and allows a user to specify when the speed change should be active in a video editing project.
- A delete button removes the selected speed change from a video editing project.

Timing Control 230

Figure 17:
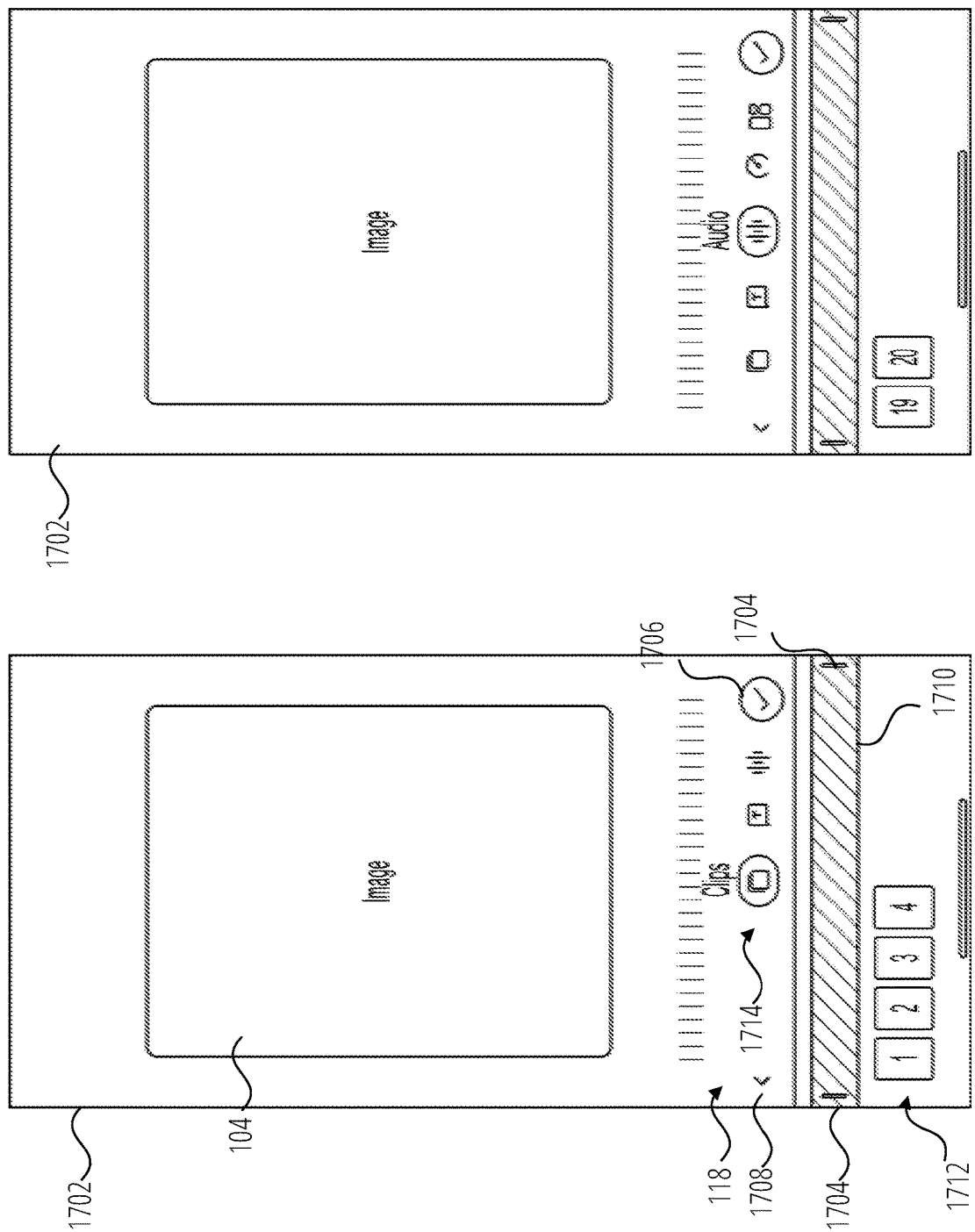
FIG. 17-FIG. 18 are user interface diagrams illustrating a timing tool user interface, according to some examples.
Figure 18:
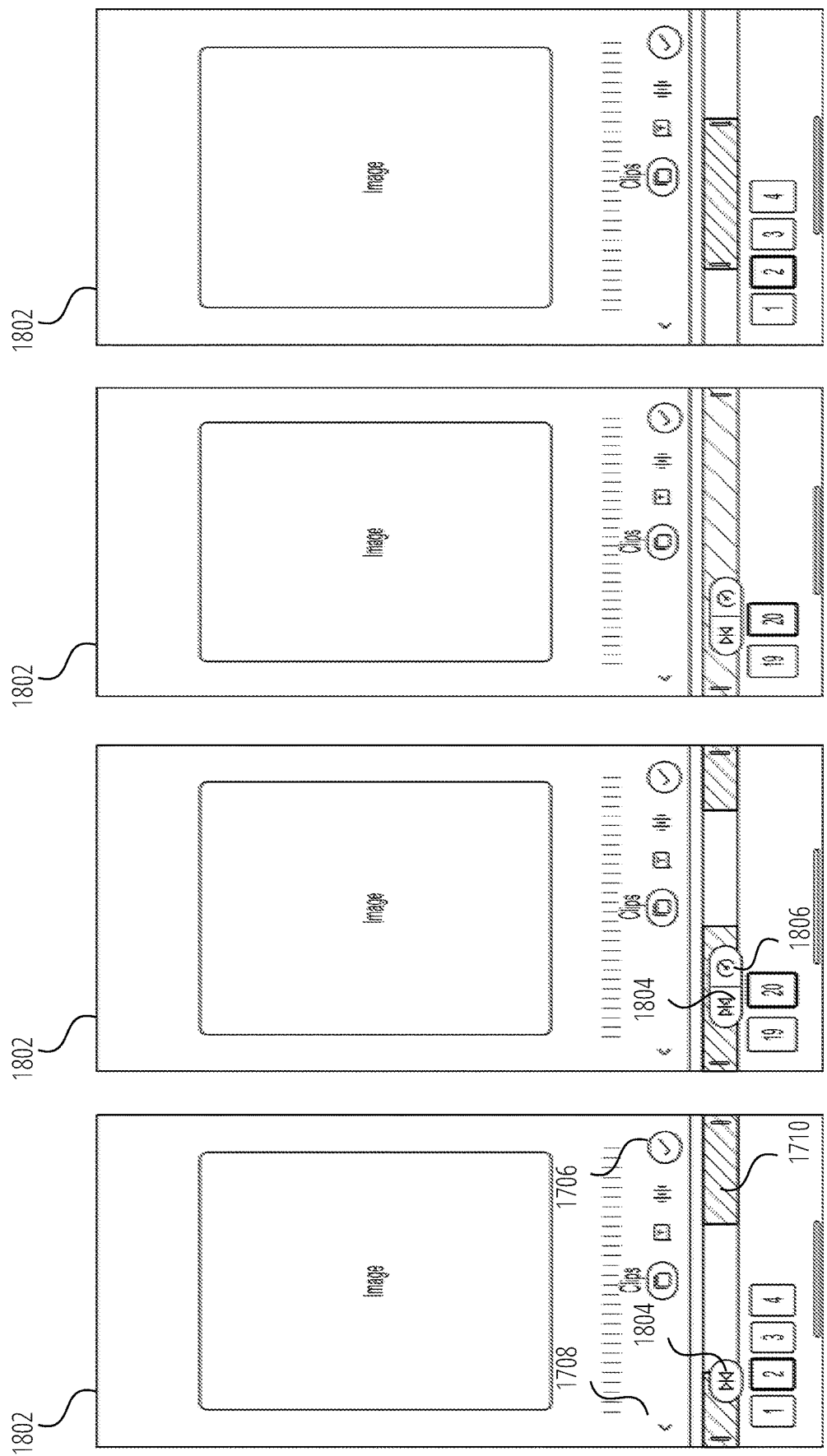

FIG. 17-FIG. 18 are user interface diagrams illustrating a timing tool user interface 1702, according to some examples, presented by the video editing application 206 to allow the use of the timing control 230.

The timing control 230 is available in the layer tool 218, caption tool 220, audio tool 222, effect tool 224, and speed tool 228, and allows a user to precisely specify when selected project elements are active or presented (either in a video preview in the canvas 104 or in a video generated and stored by the video editing application 206) within the overall timeline of a video editing project.

The timing tool user interface 1702 includes the following interface elements:

A preview canvas 104.
A back navigation button 1708.
A commit button 1706.
A list of auxiliary alignment object types.
An abstract timeline 1710 and active edit region.
An auxiliary object type filter list 1714.
An auxiliary object list 1712.

The preview canvas 104 is paused by default and shows the frame of the current timestamp from the main video editing user interface 502. The same play/pause and scrubbing affordances present in other canvas implementations are present here, too.

The back navigation button 1708 dismisses the timing control 230 and returns to the preview screen without committing any of the changes temporarily made to the timing of the active edit.

The commit button 1706 applies the current timing to the active edit, creating a new history state. The commit button 1706 is disabled until a model-state change has been made—e.g., until either of the handles 1704 of the abstract timeline 1710 has been moved.

The auxiliary object type filter list 1714 determines which project elements (e.g., clips or edits) are displayed in the auxiliary object list 1712 below the timeline. The type elements correspond to the tools of the video editing application 206: Clips, Captions, Layers, Audio, Speed, Effects, Transitions etc. The objects of the auxiliary object list 1712 scroll horizontally, and one is active at any time. Clips is selected by default.

The abstract timeline 802 is overlaid with an abstract timing control that consists of a pair of handles 1704 representing the start and stop time of an auxiliary project element, relative to the total project duration Moving the left handle to the right will cause the project element to start later in the project timeline, and moving the right handle to the left will cause the project element to stop earlier in the project timeline. Moving or tapping a handle also invokes a pair of ephemeral frame step buttons that allow the handle 1704 to be moved one frame at a time in either direction for precise placement. Tapping the frame-step buttons moves the handle's position in the timeline, one frame left or right. The frame-step buttons auto-dismiss 3 s after the last interaction—either the last tap of a frame-step button or after invocation if the frame-step buttons have not been tapped. Tapping anywhere in the timing tool user interface 1702 other than the frame-step buttons dismisses the frame-step buttons.

The space between the handle 1704 is visually distinguished (e.g., colored red), and the space around the handles 1704 is transparent. The stop handle (right) is to the right of the start handle (left). The media duration limits the distance between the two handles 1704 (e.g., the timing of a timing project element (or edit) cannot exceed the duration of the underlying project element (e.g., media such as an image, video clip or audio track).

Project element indicia in the auxiliary object list 1712 below the abstract timeline 1710 correspond to project elements or objects (e.g., clips or edits) already in a video editing project, and are used for alignment of the current edit. As noted above, the auxiliary object type filter list 1714 section determines which clips or edits are visualized below the abstract timeline 1710: if Clips is selected, then the project's clips are shown; if Captions is selected, then the project's captions are shown, etc.

Referring to FIG. 18, a tool list, presented by the timing control 230, allows a user to select a secondary or auxiliary project element to visualize alongside the handles 1704. This is useful if a user wants to align the timing of a selected, active project element (e.g., a primary project element) with respect to another project element (e.g., an auxiliary project element) in a video editing project. For example, where a user is adjusting or setting the timing of an audio track, the user can select a caption (as a secondary project element) to align the start of the audio track (as a primary project element) to the start of the caption. Project element indicia are ordered and visualized (i.e., as thumbnails) identically to the project elements or objects for the corresponding tool. Tapping a thumbnail corresponding to an auxiliary project element selects that project element. One auxiliary project element is active and selected at a time. The selected object is denoted with a red border around the thumbnail, for example.

By default, and after switching the filter project element, no project element is selected. When an auxiliary project element is selected, the timing of that auxiliary project element is visualized in the abstract timeline 1710 with a light red region. When moving the edit handles 1704, those handles 1704 snap to the left/right edges of the auxiliary object's start/stop time in the timeline. When an auxiliary project element is selected, in some examples, two ephemeral buttons appear above the auxiliary project element's thumbnail, namely an align to object control 1804 and a jump to object timing control 1806. The align to object control 1804 changes the active project elements' start/stop time to match the timing of the auxiliary project element. The jump to object timing control 1806 opens the timing control 230 for the selected auxiliary project element, making that the active project element. The align to object control 1804 and the jump to object timing control 1806 auto-dismiss 3 s after the last interaction.

Methods/Algorithms

Figure 19:
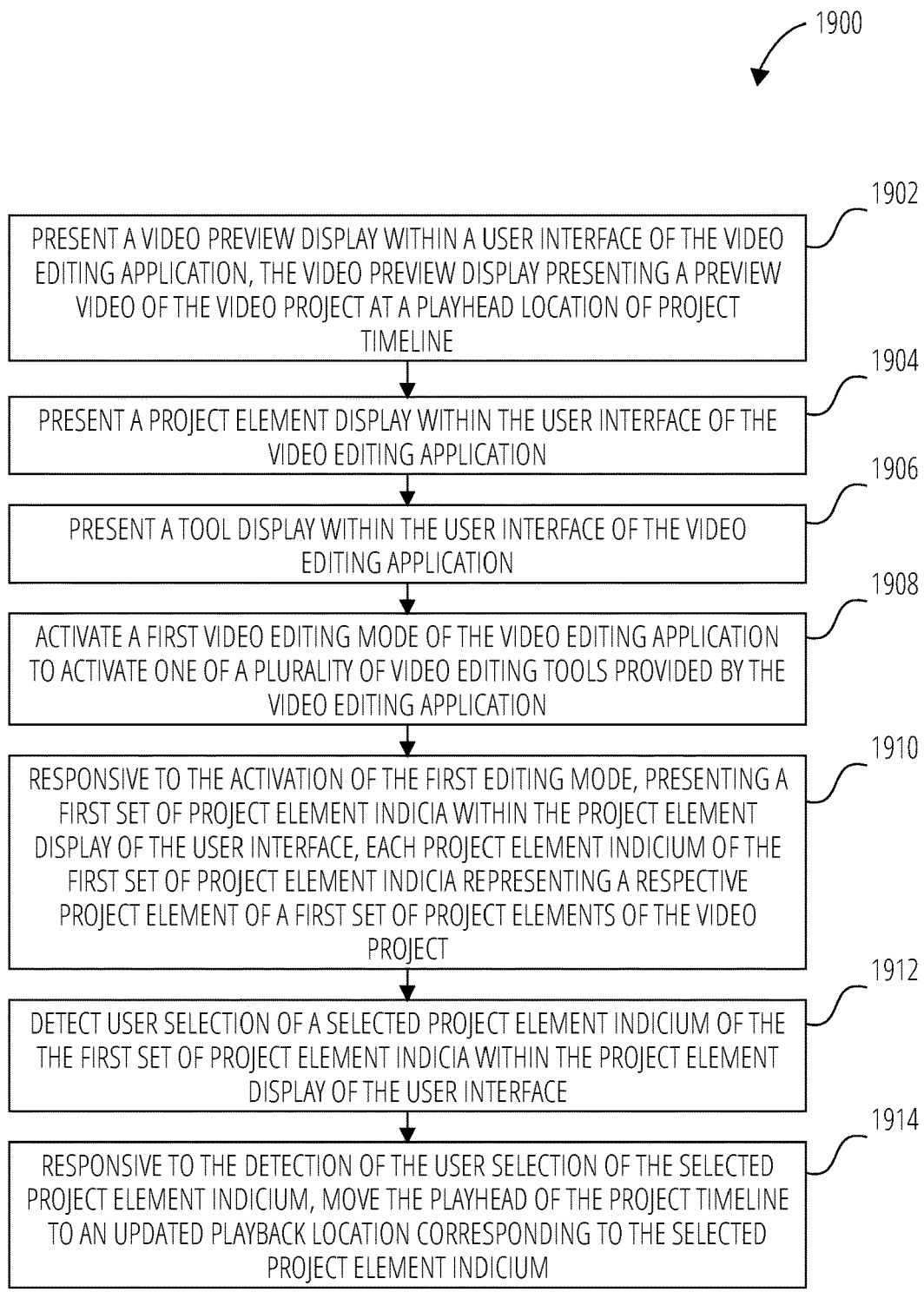
FIG. 19 is a flowchart illustrating a method to enable video editing of a video editing project within a video editing application, according to some examples.

FIG. 19 is a flowchart illustrating a method 1900 to enable video editing of a video project 302 within a video editing application 206, according to some examples. The various operations described above may be performed by components of the video editing application 206 described with reference to FIG. 2.

The method 1900 commences at block 1902 with the presentation on a display of the client system 106 of a video preview display of the video editing application 206. Specifically, the preview and playback system 210 of the project editor system 204 may generate and cause the presentation of the video preview display 102 and the canvas 104. Additionally, within the canvas 104, a preview video output (e.g., of an active project element) of the video project 302 is displayed, with a playhead location (e.g., determined by the playhead 120 of the playhead location tool 116) a specific temporal location of a project timeline (e.g., the main timeline 402).

The playhead location tool 116 may additionally, within the context of the canvas 104, present information (e.g., as time information), that indicates the playhead location within the context of the project timeline.

At block 1904, in addition to presenting the video preview display 102 within the larger video editing interface, the project element display 108 is also generated and displayed. The project element display 108 includes a project element carousel 110, which, as described above, is composed of a sequence of project elements that may be arranged according to various criteria and rules associated with a particular tool of the video editing application 206.

At block 1906, the video editing application 206 further generates and causes display of a tool display (e.g., the tool navigation bar 118 and/or the tool function bar 112) that presents tool indicia. The tool indica are user-selectable to enable and activate various tools of the video editing application 206, as well as various functions of these specific tools.

At block 1908, the video editing application 206 activates the first video editing mode of the video editing application 206, thereby activating one of a number of video editing tools 214 provided by the video editing application 206. The activation of the first editing mode may, in some examples, be responsive to user selection of one or more of the tools 214 and controls of the video editing application 206. For example, a user, using the tool display (e.g., the tool navigation bar 118) may select a specific tool (e.g., the clip tool 216), which then activates a corresponding editing mode as well as the clip tool 216.

At block 1910, and responsive to the activation of the first editing mode (e.g., a clip editing mode responsive to user selection of the clip tool 216), the preview and playback system 210 of the video editing application 206 presents the first set of project element indicia (e.g., a set of video clips) within the project element display 108, and more specifically within the project element carousel 110. Each project element indicium of this first set of project element indicia represents a corresponding associated project element (e.g., a video clip) of the project elements (e.g., media content items 304) of the video project 302. The project element indicium presented at block 1910 may be thumbnail images displayed sequentially within the project element carousel 110.

Moving on to block 1912, user selection of a project element indicium of the set of project element indicium displayed within the project element carousel 110 is detected. The user selection may include a click selection via the video editing interface.

At block 1914, responsive to the detection of the user selection of the selected project element indicium within the project element carousel 110, the playhead 120 of the project timeline (e.g., the main timeline 402) is moved by the timeline and playhead system 212. The updated playback location, within the context of the project timeline, corresponding to the selected project element indicium.

At block 1914, in addition to the advancement of the playhead 120 head to the updated playback location, the project element (e.g., a video clip) corresponding to the selected project element indicium is displayed within the canvas 104 of the video preview display 102.

The updated playback location, in some examples, may be a chronological position (e.g., at a specific time) on the project timeline where a project element (e.g., video clip) associated with the selected project element indicium (e.g., a video clip thumbnail) first appears on the project timeline.

This functionality, with automatic advancement of the public location to a chronological position within the context of the broader project timeline, provides a number of advantages and benefits to the user of the video editing application 206. Particularly, when considering that a display screen of the client system 106 may be small and present limited real estate, providing full contextual information for any project elements of a video project 302 is challenging. Similarly, enabling a user to conveniently navigate the project timeline, which is composed of multiple project elements, presents multiple challenges. The automatic advancement of the playhead 120 to a location of a selected project element, within the context of the particular video editing tool or editing mode, provides a convenient mechanism for such navigation of the project timeline, and thus seeks to address a number of technical challenges that arise with respect to presenting navigation paradigms, without providing full context and review of the project timeline.

Figure 20:
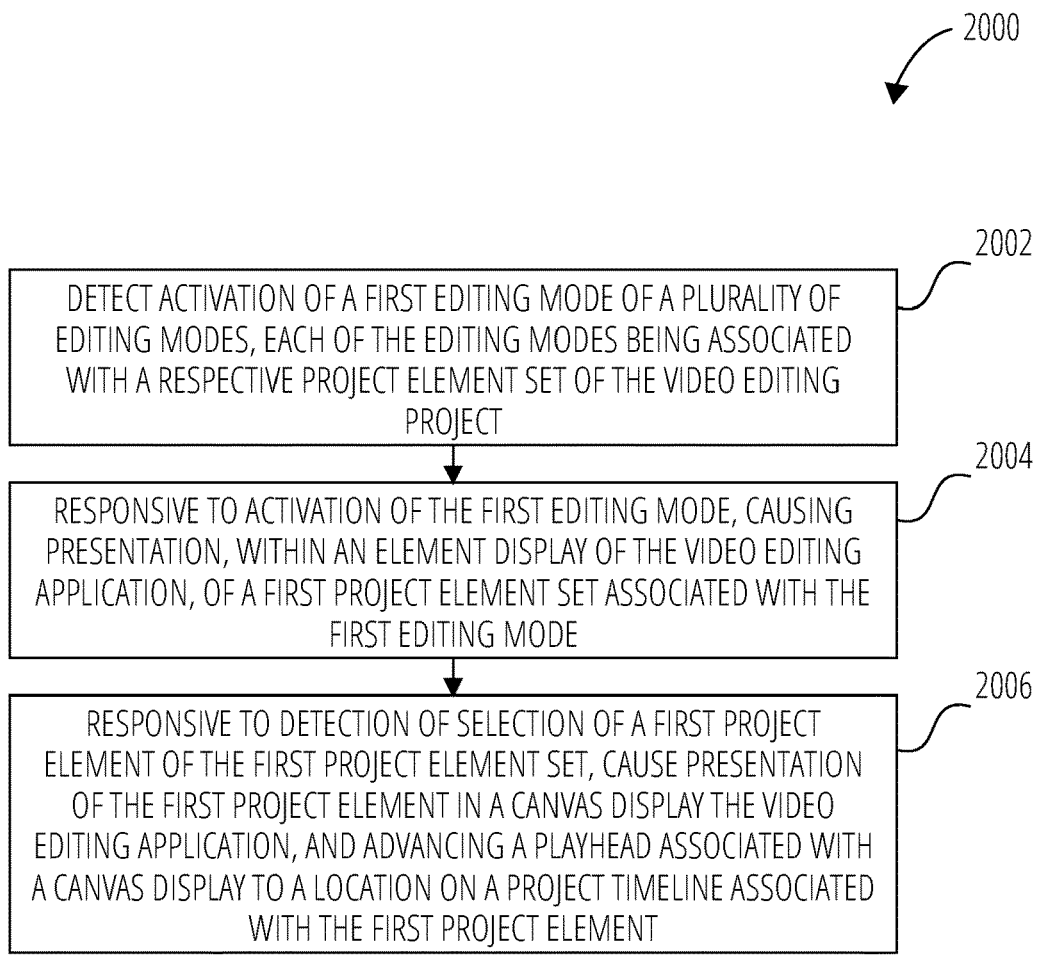
FIG. 20 illustrates a method, in accordance with some examples.

FIG. 20 is a flowchart illustrating a method 2000, according to some examples, to facilitate navigation of a video project (e.g., the video project 302) within the context of the video editing application 206. The various operations of the method 2000 may be performed by the components of the video editing application 206 illustrated in FIG. 2.

The method 2000 commences at block 2002, with the detection, by the video editing application 206, of the first editing mode of several editing modes supported by the video editing application 206. Each of the several editing modes may be associated with a respective project element set (e.g., the media content items 304, the media augmentation items 306, or the media layout items 308) of the video project 302. In some examples, each of the editing modes may be associated or include a set of tools (e.g., the tools 214 214) specific to the respective editing mode. Accordingly, responsive to detection of the selection of the particular editing mode, a toolset associated with that editing mode may also be activated and presented.

At block 2004, responsive to activation of the first editing mode, the video editing application 206 identifies and causes presentation, within a project element display (e.g., the canvas 104) of the video editing application 206, of the project element set associated with the first editing mode. For example, where the selected editing mode is the clip editing mode 310 shown in FIG. 3, project element indicia associated with the media content items 304 are presented within the project element carousel 110, responsive to detection of activation of the clip editing mode 310. Similarly, responsive to detecting activation of the layout editing mode 322, a set of project element indicia, associated and representative of the media layout items 308, may be identified and presented within the project element carousel 110.

It should also be noted that, at block 2004, the first project element set, as displayed within the project element carousel 110, may be displayed to the exclusion of project elements of other project element sets. For example, where the clip editing mode 310 is activated, project element indicium associated with the media content items 304 may be displayed to the exclusion of project element indicium associated with the media augmentation items 306 or the media layout items 308.

At block 2006, responsive to detection of selection of a first project element indicium of the first project element set, the video editing application 206 causes presentation of an associated first project element in the canvas 104, and advances a playhead associated with the canvas 104 (e.g., the play head 120), to a location on a project timeline (e.g., the main timeline 402) associated with the first project element.

Consider the example within which project element indicia associated with the media content items 304 are displayed within the project element carousel 110, after the video editing application 206 activates the clip editing mode 310. Responsive to detection of selection of a project element indicium associated with one of the media content items 304, presentation of the relevant media content item 304 within the canvas 104 results. Further, the playhead 120 is advanced to a specific location on the timeline. For example, where the selected media content item is a clip element 408, as displayed within the context of the main timeline 402, the playhead 120 is advanced to the location of a specific frame (e.g., the first frame) of the clip element 408 within the context of the main timeline 402. Further, the clip element 408 is, in this example, displayed within the canvas 104.

Similarly, selection of a second project element (e.g., the clip element 410) using the project element carousel 110, causes the presentation of the clip element 410 within the canvas 104, and advances the playhead 120 to a location, within the main timeline 402, of the first frame of the clip element 410.

When in a particular editing mode (e.g., the clip editing mode 310), a user may, by performing a selection of a tool 214 using the tool navigation bar 118, activated a second editing mode (e.g., the augmentation editing mode 316). In this case, responsive to activation of the augmentation editing mode 316, the video editing application 206 causes presentation within the project element carousel 110, of a further and second project element set (e.g., the project element indicium associated with the media augmentation items 306). Similarly, responsive to the detection of one of the project element indicia associated with the media augmentation items 306, the video editing project 206 causes the presentation of the media augmentation item 306 (e.g., an effect element 428) within the context of an effect tool user interface 1404.

Figure 21:
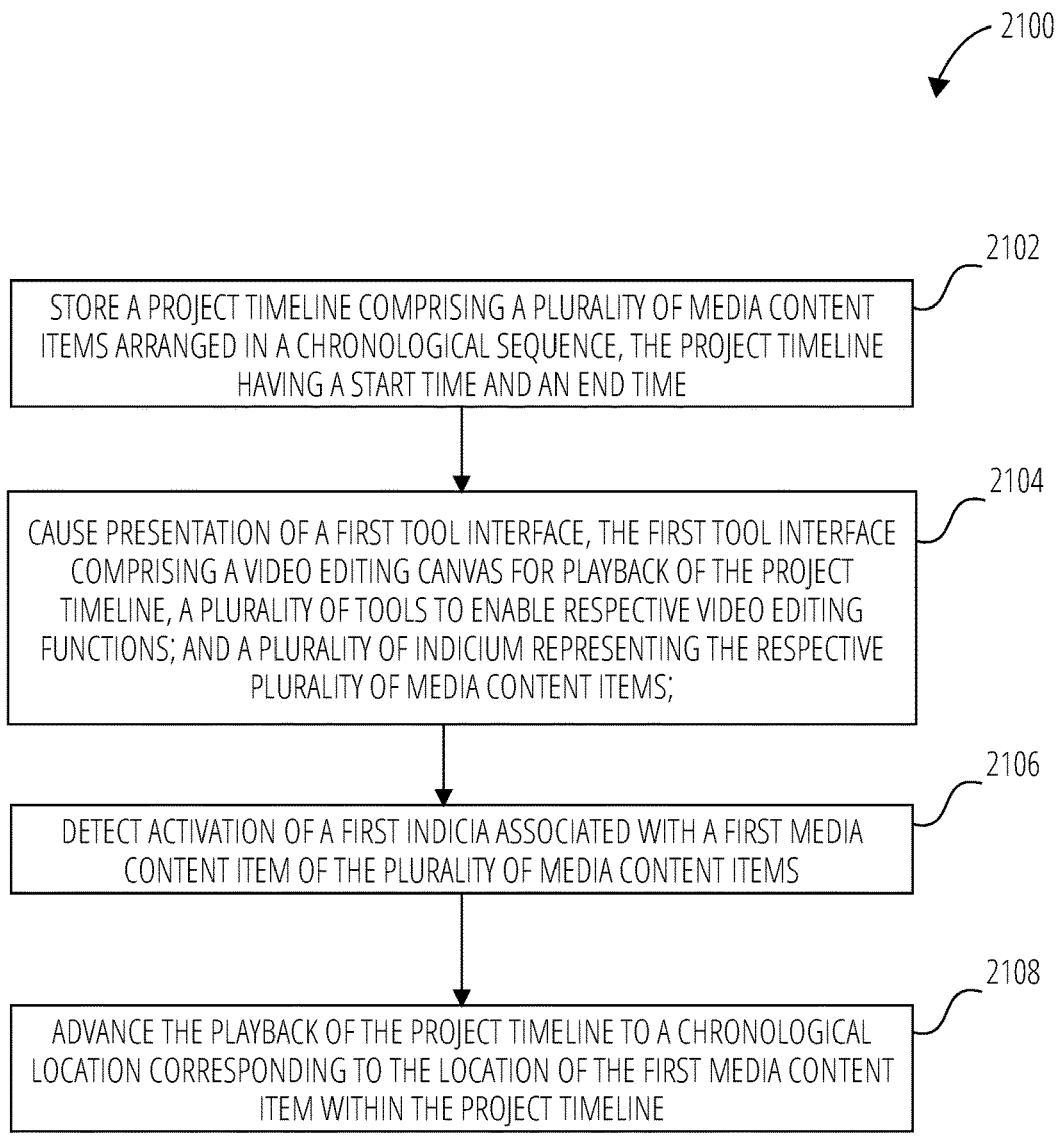
FIG. 21 illustrates a method in accordance with some examples.

FIG. 21 is a flowchart illustrating a method 2100, according to some examples, to navigate the video project 302 within the context of the video editing application 206.

The method 2100 commences at block 2102, with the storage of a project timeline (e.g., the main timeline 402, the layer timeline 412, the transition timeline 418, the effect timeline 426, the layout timeline 422, etc.). The stored project timeline includes a number of media content items (e.g., media content items 304, clip elements, transition elements, effect elements, layout elements, etc.). The media content items within the project timeline are arranged in a chronological sequence, in some examples, with the project timeline having a start time and an end time. The media content items may also, in some examples, be arranged in a non-chronological sequence and according to their different criteria.

At block 2104, the video editing application 206 generates and causes the presentation of a tool interface (e.g., video editing user interface 502, clip tool user interface 602, layer tool user interface 902, caption tool user interface 1002, audio tool user interface 1102, create sound user interface 1202, effect tool user interface 1404, transition tool interface 1502, speed tool user interface 1602, timing tool user interface 1702, etc.). The displayed tool interface is customized and specific to a particular tool 214 of the video editing application 206. While the presented to tool interface may be specific to a particular tool 214, elements of the interface may be common to interfaces for other tools, as will be appreciated from the preceding descriptions.

The presented tool interface, in some examples, includes a number of components or display portions of sections. For example, the tool interface may include a video editing canvas (e.g., the canvas 104) for playback of the project timeline or of project elements included within the project timeline. The tool interface also includes indicium or controls associated with a specific set of tools associated with a specific tool, these tools enabling respective video editing functions of the tool. For example, where the project timeline is the main timeline 402, the tool interface presented at block 2104 may be the clip tool user interface 602, within which the clip tool button 604 is active and selected to enable the clip tool 216. In this example, the tool function bar 112 displays a number of indicium (e.g., the add button 606, trim button 608, split button 610, crop button 612, delete button 614) associated with tools of the clip tool 216, each of these indicium being user-selectable to activate the relevant function of the clip tool 216.

In addition to displaying indicia for the tool functions to enable respective video editing functions, at block 2104, the video editing application 206 causes the presentation of a number of project element indicia that are each associated with a respective media content item. For example, user selection and activation of the highlighted project element indicium within the clip tool user interface 602, and specifically within the project element carousel 110, may be detected.

At block 2108, responsive to detecting of the activation of the first project element indicium associated with the first media content item, playback of the project timeline (e.g., the main timeline 402) may be advanced (or moved) to a chronological location corresponding to the first media content item within the main timeline 402.

As is apparent from FIG. 4, the video editing application 206 may store multiple timelines, each of which may include a specific set of media content or media supplementation items. For example, where a layer timeline 412 may be comprised of media content items, such as clip element 414 and clip element 416, the supplemental timeline in the example form of an effect timeline 426 may comprise media supplementation items or media augmentation items 306, such as an effect element 428. Accordingly, in addition to presenting a timeline of media content items, the method 2100 may also include causing presentation of a further tool interface, associated with the supplementation or augmentation tools, such as the effect tool 224 or the speed tool 228. In this case, a further, second tool interface may be presented, responsive to the activation of an associated tool (e.g., the effect tool 224). As described above, such a second tool interface, in the example form of the effect tool user interface 1404, may include a video editing canvas 104, and may also present project element indicia, within the project element carousel 110, that enable the selection of a particular project element, such as the effect elements 432.

In this example, the effect tool user interface 1404 also presents a number of indicia (e.g., buttons) for selection and activation tool functions specific to the effect tool 224 in the tool function bar 112, including the add button 1406, the timing button 1408 and the delete button 1410.

Figure 22:
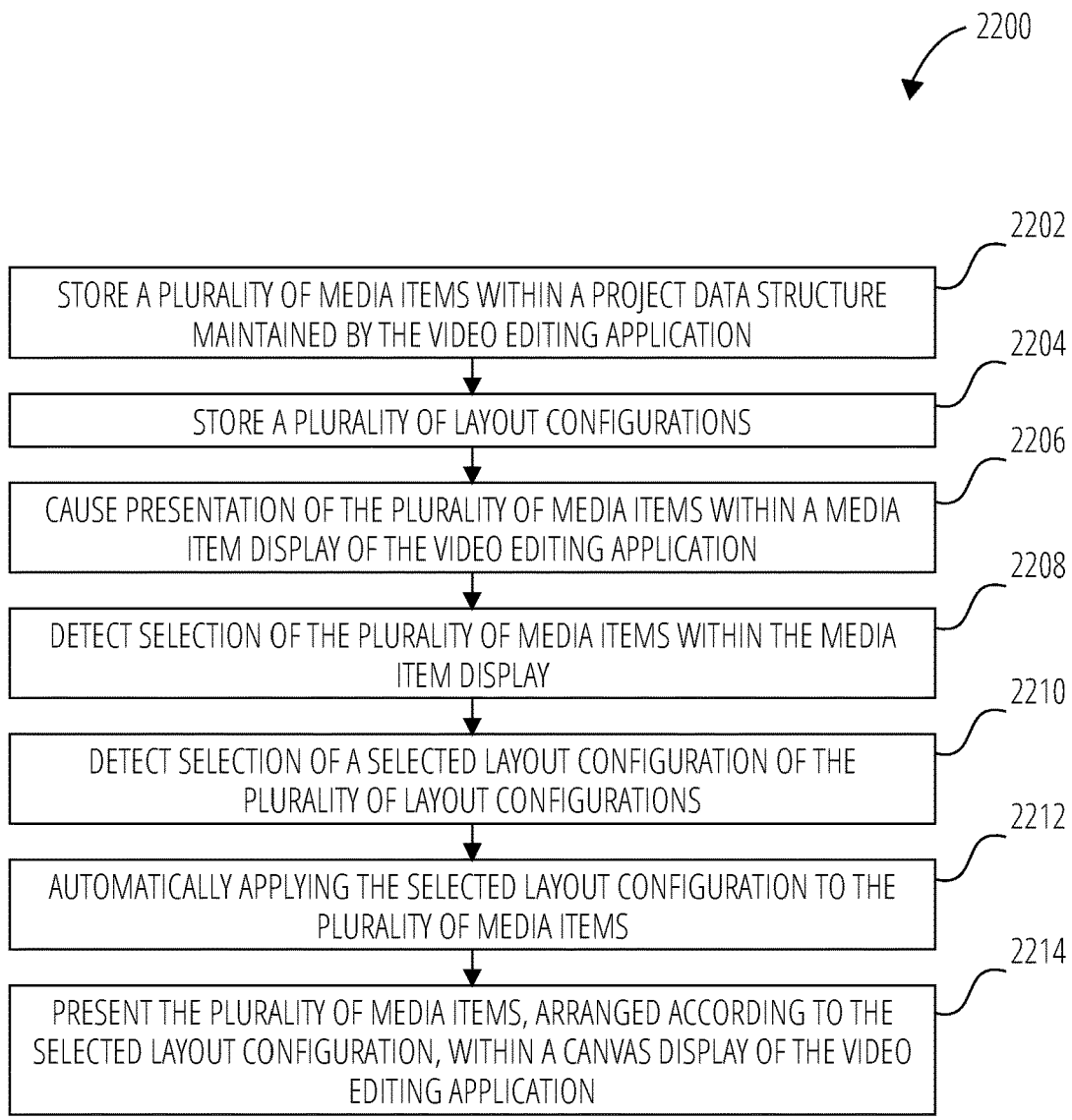
FIG. 22 illustrates a method in accordance with some examples.

FIG. 22 is a flowchart illustrating a method 2200, according to some examples, to apply a media item layout within the context of the video editing application 206. The various operations of the method 2200 may be performed by components of the video editing application 206 described with reference to FIG. 2.

At block 2202, the video editing application 206 stores multiple project elements, in the example form of media content items 304, within a project data structure (e.g., the video project 302) as maintained by the video editing application 206.

At block 2204, the video editing application 206 stores a number of layout configurations, in the example form of the media layout items 308.

At block 2206, the video editing application 206 generates and causes the presentation of the media content items 304 within the media item display (e.g., within the project element carousel 110 of the clip tool user interface 602, as shown in FIG. 6).

At block 2208, the video editing application 206 detects a user selection of one or more of the media content items 304. This selection may be a concurrent selection or a sequential series of selections over a period of time, with each selection of each media content item being a discrete selection.

At block 2210, the video editing application 206 detects the selection of a selected layout configuration from a number of layout configurations presented by the video editing application 206. This selection of the layout configuration may, in some examples, may include user selection of the layers tool button 904 using the tool navigation bar 118 as shown in FIG. 9.

Responsive to activation of the layout tool 238 using the layers tool button 904, a set of project element indicia associated with respective layout project elements are displayed within the project element carousel 110 of the layer tool user interface 902. The user is then able to select a particular layout project element from within the project element carousel 110 which is then, at block 2212, automatically applied to the media content items, for which indicium (e.g., layer image 918) are displayed within the canvas 104. Accordingly, at block 2214, the video editing application 206 presents the media content items, arranged according to the selected layout configuration, within the canvas 104 of the layer tool user interface 902 of the video editing application 206.

Each of the layout project elements (e.g., layout configurations) associated with indicia in the project element carousel 110 includes configuration data, specifying a start time and an end time for application of the layout project element. Accordingly, the automatic application of the selected configuration may be applied between the start time and the end time, with respect to a primary project timeline.

It will also be noted that, with reference to FIG. 9, a number of tool functions, specific to the layout tool 238, are presented within the tool function bar 112 of the layer tool user interface 902. Examples of layout configurations that may be represented by the layout project elements for which indicium are shown in the project element carousel 110 of the layer tool user interface 902 include a picture-picture layout, and a split-screen layout. Each of the layout configurations may also specify the location of the display of media content items 304, within the context of the canvas 104, relative to each other.

Of course, using the layout tool and the layer tool user interface 902, a user can apply multiple layout configurations to a common set of media content items 304 or discrete and different sets of media content items 304.

Figure 23:
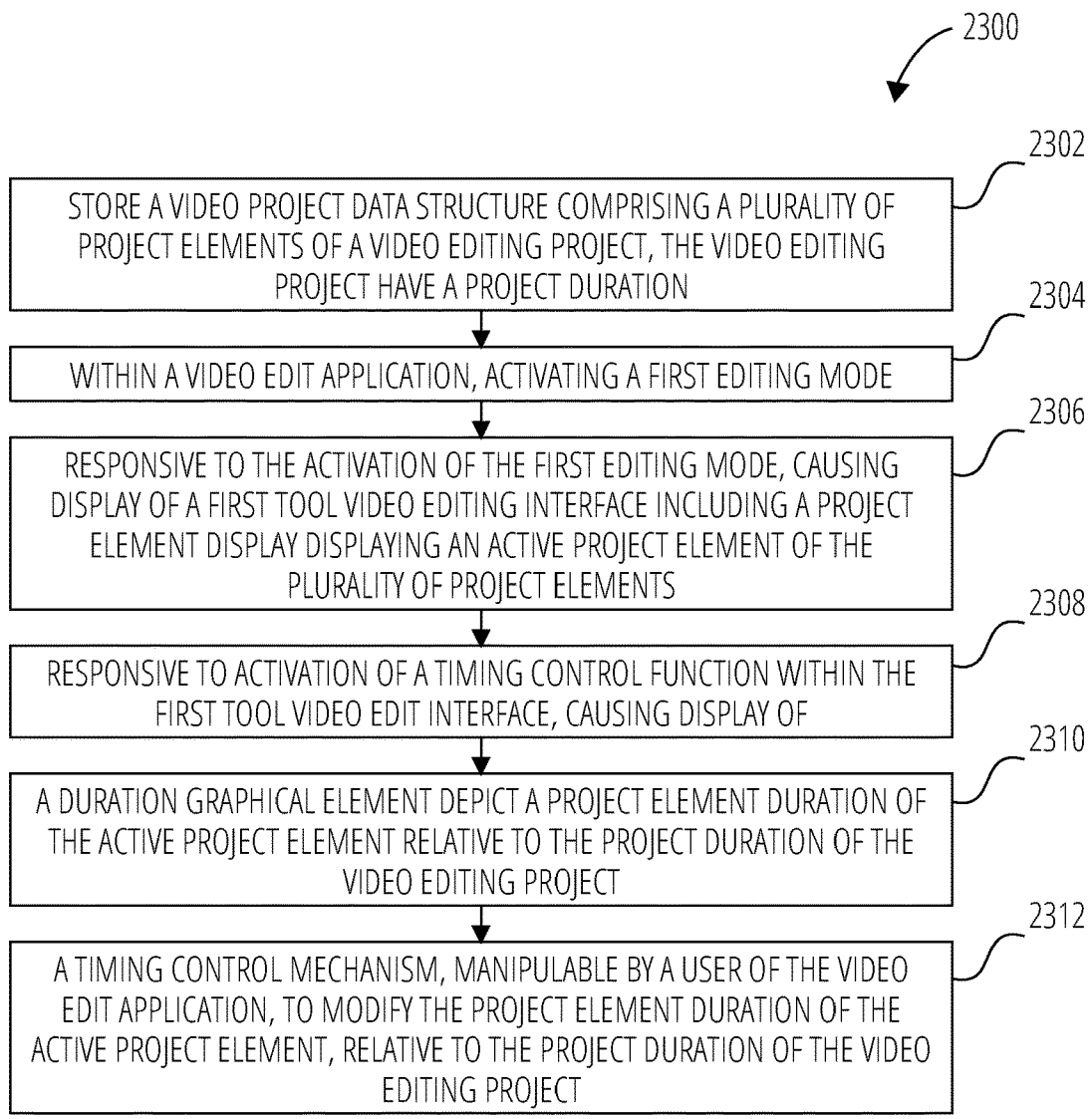
FIG. 23 illustrates a method in accordance with some examples.

FIG. 23 is a flowchart illustrating a method 2300, according to some examples, of enabling editing of a video project 302, the video project 302 having a project duration as reflected by the duration of the main timeline 402 shown in FIG. 4.

At block 2304, a first video editing mode (e.g., corresponding to one of the video editing tools 214) is activated responsive to user selection of a tool indicia from within the tool navigation bar 118.

At block 2306, and responsive to activation of the first video editing mode, the video editing application 206 generates and causes the display of a corresponding first video editing interface (e.g., such as anyone of video editing user interface 502, clip tool user interface 602, layer tool user interface 902, caption tool user interface 1002, audio tool user interface 1102, create sound user interface 1202, effect tool user interface 1404, transition tool interface 1502, speed tool user interface 1602, timing tool user interface 1702, etc.). The first video editing interface includes a project element display, in the form of the project element carousel 110, which displays and visually distinguishes the project element indicium for an active project element from within multiple project elements represented in the project element carousel 110.

At block 2308, activation of a timing control function (e.g., the timing control 230) is detected and, responsive to detecting activation of the timing control function, a number of graphical elements or control mechanisms are displayed within the context of the first tool editing interface.

Referring to the example interfaces are shown in FIG. 17-FIG. 18, the timing control 230 is made available within the context of the layer tool 218, the caption tool 220, the audio tool 222, the effect tool 224 and the speed tool 228, and the video editing interfaces associated with these tools. Activation of the timing tool user interface 1702 causes generation and display a presentation of, at block 2310, a graphical element in the form of an abstract timeline 1710 depicting a project element duration for an active project element within the context of the video project 302. In addition to the abstract timeline 1710, the timing tool user interface 1702 also displays a timing control mechanism in an active edit region associated with the abstract timeline 1710. The timing control mechanism is manipulable by a user of the video editing application 206 to modify a project element duration of an active project element, relative to the project duration of the video project 302, as represented by the abstract timeline 1710.

The timing control mechanism, in some examples, comprises a first start handle 1704 associated with the abstract timeline 1710 and represents a start time of the active project element within the context of the project duration of the video project 302. The timing control mechanism further comprises a stop handle 1704, also associated with the abstract timeline 802, and representing a stop time of the active project element within the project duration of the video project 302. The start handle 1704 and the stop handle 1704 are movable by a user to adjust the duration of the active project element, as displayed within the timing tool user interface 1702 and relative to the overall duration of the video project 302.

Networked Computing Environment

Figure 24:
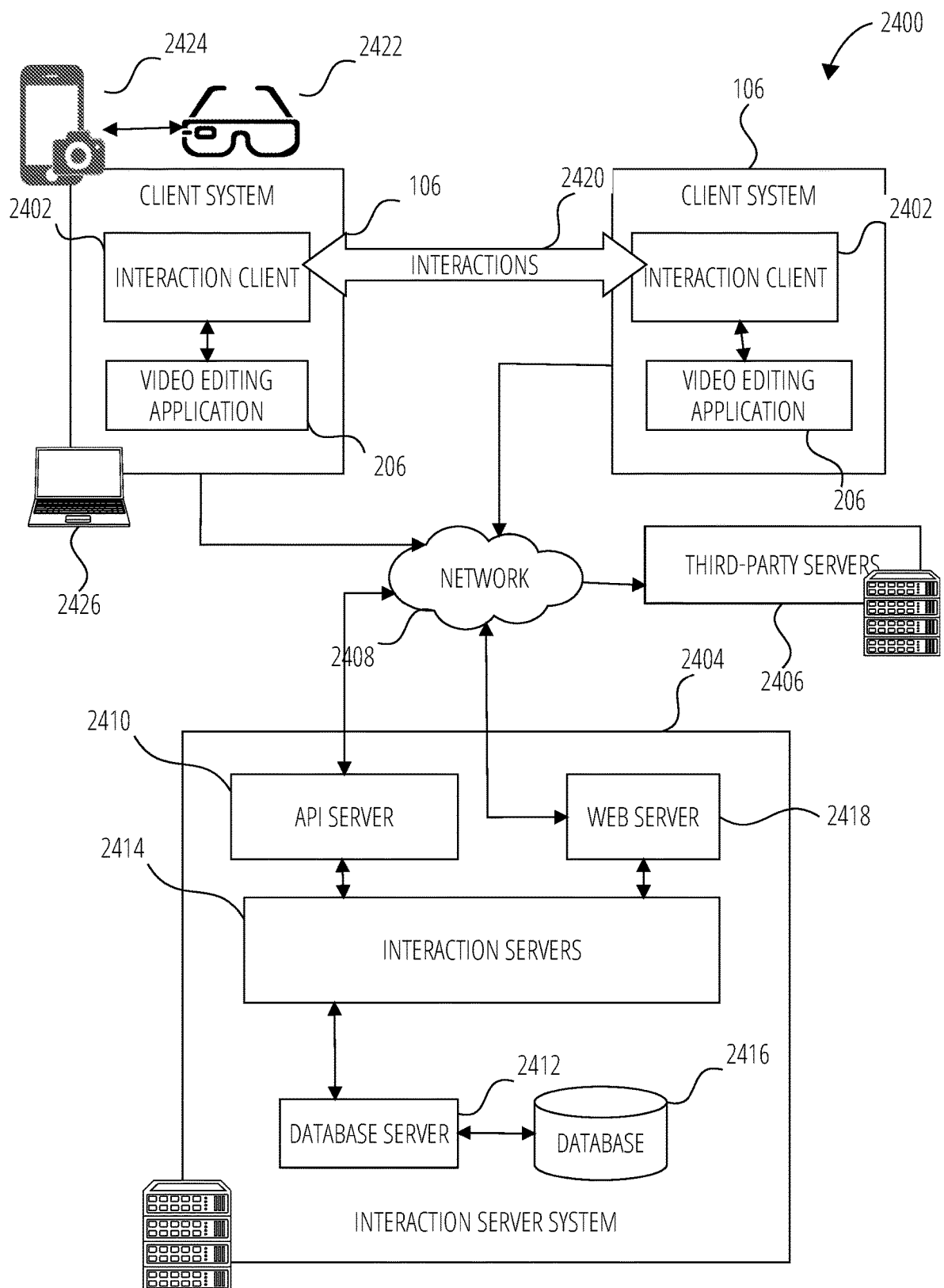
FIG. 24 is a diagrammatic representation of a networked environment in which the present disclosure may be deployed, according to some examples.

FIG. 24 is a block diagram showing an example interaction system 2400 for facilitating interactions (e.g., exchanging text messages and content (e.g., image, video, and audio content), conducting text audio and video calls, or playing games) over a network. The interaction system 2400 includes multiple client systems 106, each of which hosts multiple applications, including an interaction client 2402 and a video editing application 206. Each interaction client 2402 is communicatively coupled, via one or more communication networks including a network 2408 (e.g., the Internet), to other instances of the interaction client 2402 (e.g., hosted on respective other client devices 106), an interaction server system 2404 and third-party servers 2406). An interaction client 2402 can also communicate with locally-hosted video editing applications 206 using Applications Program Interfaces (APIs).

An interaction client 2402 interacts with other interaction clients 2402 and with the interaction server system 2404 via the network 2408. The data exchanged between the interaction clients 2402 (e.g., interactions 2420) and between the interaction clients 2402 and the interaction server system 2404 includes functions (e.g., commands to invoke functions) and payload data (e.g., text, audio, video, or other multimedia data).

The interaction server system 2404 provides server-side functionality via the network 2408 to the interaction clients 2402. While certain functions of the interaction system 2400 are described herein as being performed by either an interaction client 2402 or by the interaction server system 2404, the location of certain functionality either within the interaction client 2402 or the interaction server system 2404 may be a design choice. For example, it may be technically preferable to initially deploy a particular technology and functionality within the interaction server system 2404 but to later migrate this technology and functionality to the interaction client 2402 where a client system 106 has sufficient processing capacity.

The interaction server system 2404 supports various services and operations that are provided to the interaction clients 2402. Such operations include transmitting data to, receiving data from, and processing data generated by the interaction clients 2402. This data may include message content, client device information, geolocation information, media augmentation and overlays, message content persistence conditions, social network information, and live event information. Data exchanges within the interaction system 2400 are invoked and controlled through functions available via user interfaces (UIs) of the interaction clients 2402.

Turning now specifically to the interaction server system 2404, an Application Program Interface (API) server 2410 is coupled to and provides a programmatic interface to interaction servers 2414. The interaction servers 2414 are communicatively coupled to a database server 2412, facilitating access to a database 2416 that stores data associated with interactions processed by the interaction servers 2414. Similarly, a web server 2418 is coupled to the interaction servers 2414 and provides web-based interfaces to the interaction servers 2414. To this end, the web server 2418 processes incoming network requests over the Hypertext Transfer Protocol (HTTP) and several other related protocols.

The Application Program Interface (API) server 2410 receives and transmits interaction data (e.g., commands and message payloads) between the client system 106 and the interaction servers 2414. Specifically, the Application Program Interface (API) server 2410 provides a set of interfaces (e.g., routines and protocols) that can be called or queried by the interaction client 2402 to invoke the functionality of the interaction servers 2414. The Application Program Interface (API) server 2410 exposes various functions supported by the interaction servers 2414, including account registration, login functionality, the sending of interaction data via the interaction servers 2414, from a particular interaction client 2402 to another interaction client 2402, the communication of media files (e.g., images or video) from an interaction client 2402 to the interaction servers 2414, the settings of a collection of media data (e.g., a story), the retrieval of a list of friends of a user of a client system 106, the retrieval of messages and content, the addition and deletion of entities (e.g., friends) to an entity graph (e.g., a social graph), the location of friends within a social graph, and opening an application event (e.g., relating to the interaction client 2402).

Linked Applications

Returning to the interaction client 2402, features and functions of a linked application (e.g., a linked video editing application 206 or applet) may be made available to a user via an interface of the interaction client 2402. In this context, "external" refers to the fact that the video editing application 206 or applet is external to the interaction client 2402. The linked application may be provided by a third party but may also be provided by the creator or provider of the interaction client 2402. The interaction client 2402 receives a user selection of an option to launch or access features of such a linked application. The linked application may be the video editing application 206 installed on the client system 106 (e.g., as a "native app"), or a small-scale version of the application (e.g., as an "applet") that is hosted on the client system 106 or remote of the client system 106 (e.g., on third-party servers 2406). The small-scale version of the application includes a subset of features and functions of the application (e.g., the full-scale, native version of the application) and is implemented using a markup-language document. In one example, the small-scale version of the application (e.g., an "applet") is a web-based, markup-language version of the application and is embedded in the interaction client 2402. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the video editing application 206, the interaction client 2402 determines whether the selected linked application is a web-based linked application or is locally-installed. In some cases, video editing applications 206 that are locally installed on a client system 106 can be launched independently of and separately from the interaction client 2402, such as by selecting an icon, corresponding to the video editing application 206 on a home screen of the client system 106. The video editing application 206 can be launched or accessed via the interaction client 2402 and, in some examples, no or limited portions of the video editing application 206 can be accessed outside of the interaction client 2402. The video editing application 206 can be launched by the interaction client 2402 receiving from a third-party server 2406, for example, a markup-language document associated with the small-scale application and processing such a document.

In response to determining that the linked application is a locally-installed video editing application 206, the interaction client 2402 instructs the client system 106 to launch this resource by executing locally-stored code. In response to determining that the linked application is a web-based resource, the interaction client 2402 communicates with the third-party servers 2406 (for example) to obtain a markup-language document corresponding to the selected linked application. The interaction client 2402 then processes the obtained markup-language document to present the web-based linked application within a user interface of the interaction client 2402.

The interaction client 2402 can notify a user of the client system 106, or other users related to such a user (e.g., "friends"), of activity taking place in the video editing application 206. For example, the interaction client 2402 can provide participants in a conversation (e.g., a chat session) in the interaction client 2402 with notifications relating to the current or recent use of aa video editing application 206 by one or more members of a group of users. One or more users can be invited to join in an active linked application or to launch a recently-used but currently inactive (in the group of friends) linked application. The video editing application 206 can provide participants in a conversation, each using respective interaction clients 2402, with the ability to share an item, status, state, or location in the video editing application 206 with one or more members of a group of users into a chat session.

The interaction client 2402 can present a list of the available linked applications (e.g., video editing applications 206 or applets) to a user to launch or access a given linked application. This list can be presented in a context-sensitive menu. For example, the icons representing different ones of the video editing application 206 (or applets) can vary based on how the menu is launched by the user (e.g., from a conversation interface or from a non-conversation interface).

Machine Architecture

Figure 25:
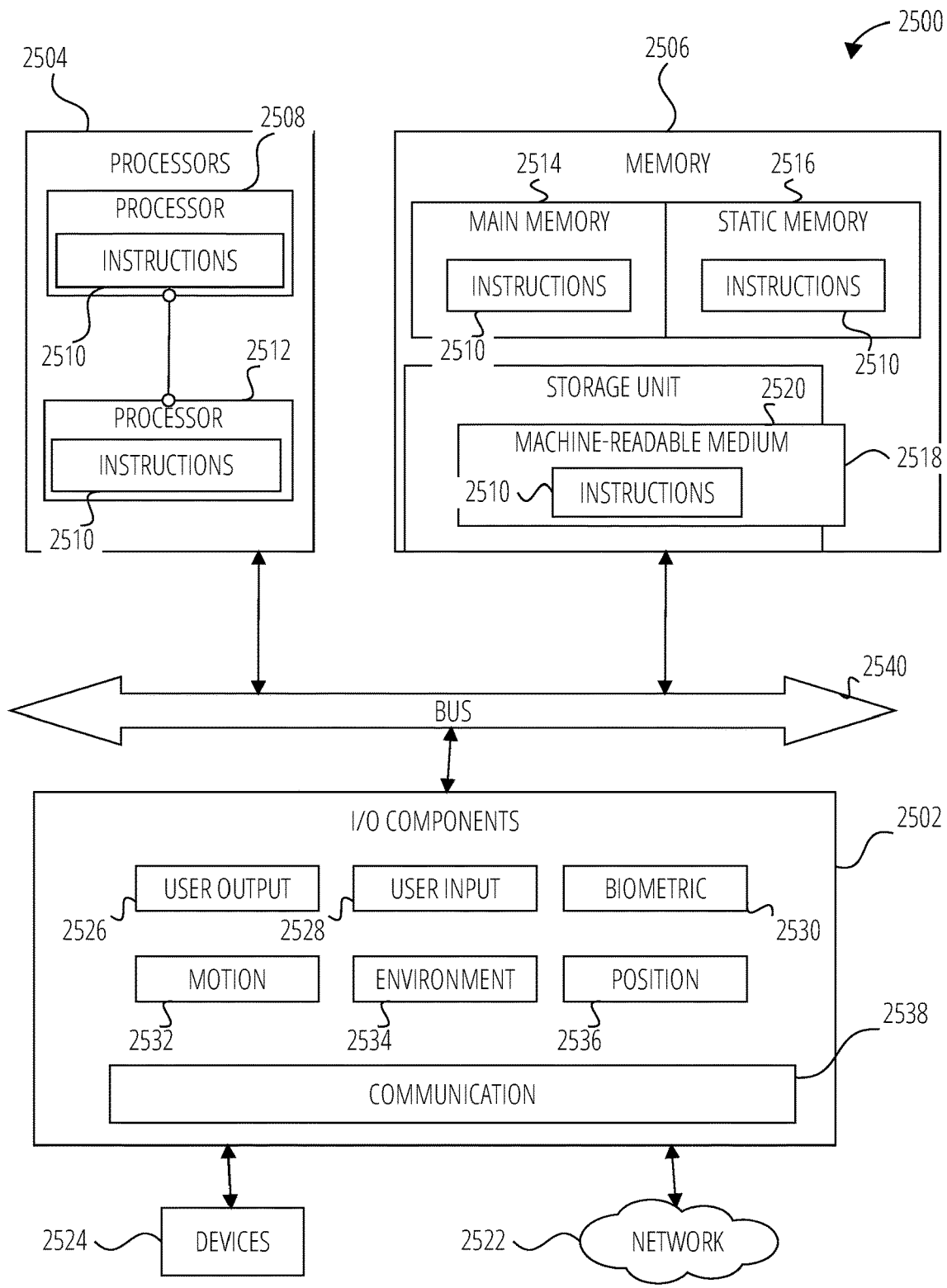
FIG. 25 is a diagrammatic representation of a machine in the form of a computer system within which a set of instructions may be executed for causing the machine to perform any one or more of the methodologies discussed herein, according to some examples.

FIG. 25 is a diagrammatic representation of the machine 2500 within which instructions 2510 (e.g., software, a program, an application, an applet, an app, or other executable code) for causing the machine 2500 to perform any one or more of the methodologies discussed herein may be executed. For example, the instructions 2510 may cause the machine 2500 to execute any one or more of the methods described herein. The instructions 2510 transform the general, non-programmed machine 2500 into a particular machine 2500 programmed to carry out the described and illustrated functions in the manner described. The machine 2500 may operate as a standalone device or may be coupled (e.g., networked) to other machines. In a networked deployment, the machine 2500 may operate in the capacity of a server machine or a client machine in a server-client network environment, or as a peer machine in a peer-to-peer (or distributed) network environment. The machine 2500 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 2510, sequentially or otherwise, that specify actions to be taken by the machine 2500. Further, while a single machine 2500 is illustrated, the term "machine" shall also be taken to include a collection of machines that individually or jointly execute the instructions 2510 to perform any one or more of the methodologies discussed herein. The machine 2500, for example, may comprise the client system 106 or any one of multiple server devices forming part of the interaction server system 2404. In some examples, the machine 2500 may also comprise both client and server systems, with certain operations of a particular method or algorithm being performed on the server-side and with certain operations of the particular method or algorithm being performed on the client-side.

The machine 2500 may include processors 2504, memory 2506, and input/output I/O components 2502, which may be configured to communicate with each other via a bus 2540. In an example, the processors 2504 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 2508 and a processor 2512 that execute the instructions 2510. The term "processor" is intended to include multi-core processors that may comprise two or more independent processors (sometimes referred to as "cores") that may execute instructions contemporaneously. Although FIG. 25 shows multiple processors 2504, the machine 2500 may include a single processor with a single-core, a single processor with multiple cores (e.g., a multi-core processor), multiple processors with a single core, multiple processors with multiples cores, or any combination thereof.

The memory 2506 includes a main memory 2514, a static memory 2516, and a storage unit 2518, both accessible to the processors 2504 via the bus 2540. The main memory 2506, the static memory 2516, and storage unit 2518 store the instructions 2510 embodying any one or more of the methodologies or functions described herein. The instructions 2510 may also reside, completely or partially, within the main memory 2514, within the static memory 2516, within machine-readable medium 2520 within the storage unit 2518, within at least one of the processors 2504 (e.g., within the Processor's cache memory), or any suitable combination thereof, during execution thereof by the machine 2500.

The I/O components 2502 may include a wide variety of components to receive input, provide output, produce output, transmit information, exchange information, capture measurements, and so on. The specific I/O components 2502 that are included in a particular machine will depend on the type of machine. For example, portable machines such as mobile phones may include a touch input device or other such input mechanisms, while a headless server machine will likely not include such a touch input device. It will be appreciated that the I/O components 2502 may include many other components that are not shown in FIG. 25. In various examples, the I/O components 2502 may include user output components 2526 and user input components 2528. The user output components 2526 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 2528 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 2502 may include biometric components 2530, motion components 2532, environmental components 2534, or position components 2536, among a wide array of other components. For example, the biometric components 2530 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 2532 include acceleration sensor components (e.g., accelerometer), gravitation sensor components, rotation sensor components (e.g., gyroscope).

The environmental components 2534 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client system 106 may have a camera system comprising, for example, front cameras on a front surface of the client system 106 and rear cameras on a rear surface of the client system 106. The front cameras may, for example, be used to capture still images and video of a user of the client system 106 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client system 106 may also include a 360° camera for capturing 360° photographs and videos.

Further, the camera system of the client system 106 may include dual rear cameras (e.g., a primary camera as well as a depth-sensing camera), or even triple, quad or penta rear camera configurations on the front and rear sides of the client system 106. These multiple cameras systems may include a wide camera, an ultra-wide camera, a telephoto camera, a macro camera, and a depth sensor, for example.

The position components 2536 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 2502 further include communication components 2538 operable to couple the machine 2500 to a network 2522 or devices 2524 via respective coupling or connections. For example, the communication components 2538 may include a network interface Component or another suitable device to interface with the network 2522. In further examples, the communication components 2538 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 2524 may be another machine or any of a wide variety of peripheral devices (e.g., a peripheral device coupled via a USB).

Moreover, the communication components 2538 may detect identifiers or include components operable to detect identifiers. For example, the communication components 2538 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 2538, such as location via Internet Protocol (IP) geolocation, location via Wi-Fi® signal triangulation, location via detecting an NFC beacon signal that may indicate a particular location, and so forth.

The various memories (e.g., main memory 2514, static memory 2516, and memory of the processors 2504) and storage unit 2518 may store one or more sets of instructions and data structures (e.g., software) embodying or used by any one or more of the methodologies or functions described herein. These instructions (e.g., the instructions 2510), when executed by processors 2504, cause various operations to implement the disclosed examples.

The instructions 2510 may be transmitted or received over the network 2522, using a transmission medium, via a network interface device (e.g., a network interface component included in the communication components 2538) and using any one of several well-known transfer protocols (e.g., hypertext transfer protocol (HTTP)). Similarly, the instructions 2510 may be transmitted or received using a transmission medium via a coupling (e.g., a peer-to-peer coupling) to the devices 2524.

Software Architecture

Figure 26:
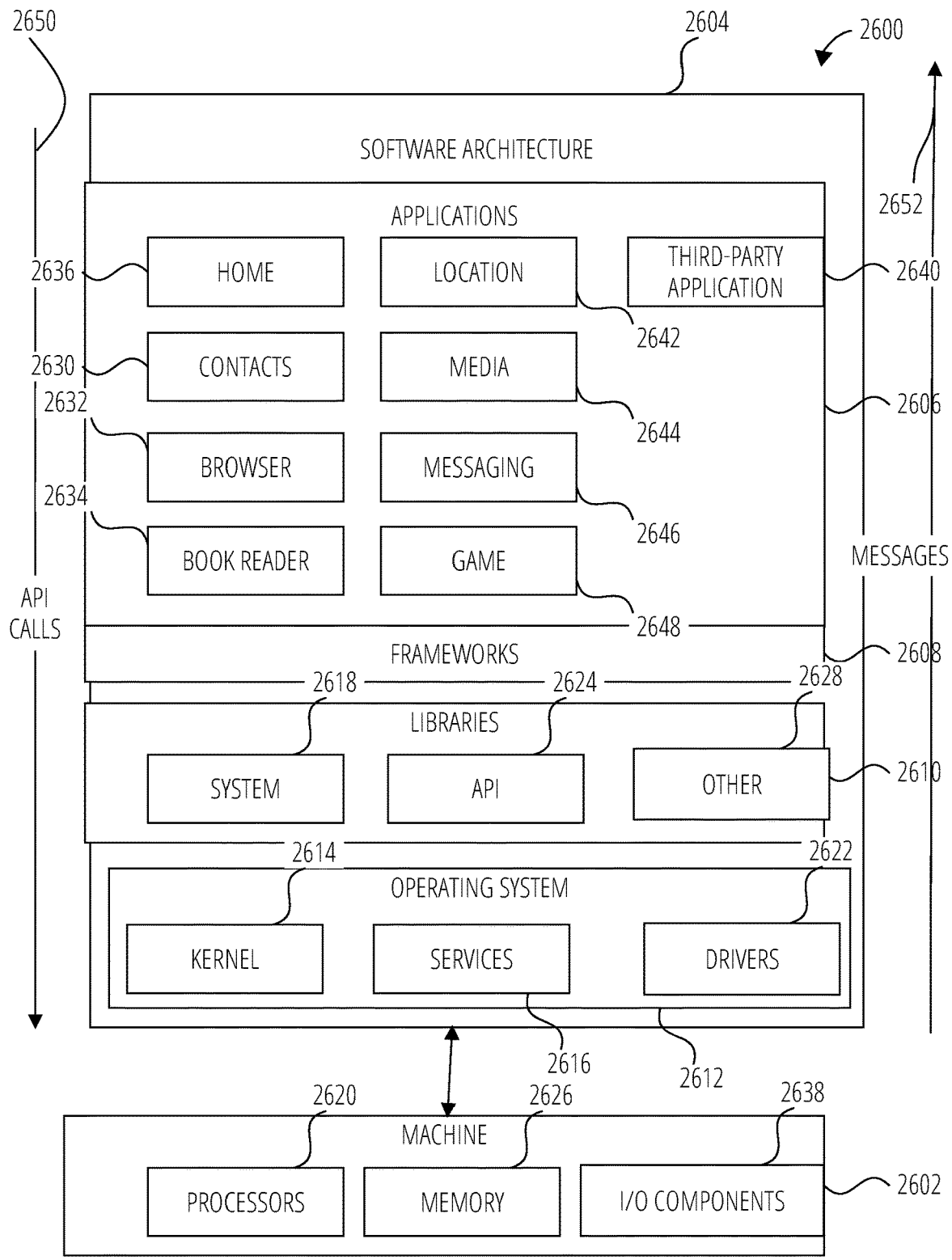
FIG. 26 is a block diagram showing a software architecture within which examples may be implemented.

FIG. 26 is a block diagram 2600 illustrating a software architecture 2604, which can be installed on any one or more of the devices described herein. The software architecture 2604 is supported by hardware such as a machine 2602 that includes processors 2620, memory 2626, and I/O components 2638. In this example, the software architecture 2604 can be conceptualized as a stack of layers, where each layer provides a particular functionality. The software architecture 2604 includes layers such as an operating system 2612, libraries 2610, frameworks 2608, and applications 2606. Operationally, the applications 2606 invoke API calls 2650 through the software stack and receive messages 2652 in response to the API calls 2650.

The operating system 2612 manages hardware resources and provides common services. The operating system 2612 includes, for example, a kernel 2614, services 2616, and drivers 2622. The kernel 2614 acts as an abstraction layer between the hardware and the other software layers. For example, the kernel 2614 provides memory management, processor management (e.g., scheduling), component management, networking, and security settings, among other functionalities. The services 2616 can provide other common services for the other software layers. The drivers 2622 are responsible for controlling or interfacing with the underlying hardware. For instance, the drivers 2622 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 2610 provide a common low-level infrastructure used by the applications 2606. The libraries 2610 can include system libraries 2618 (e.g., C standard library) that provide functions such as memory allocation functions, string manipulation functions, mathematic functions, and the like. In addition, the libraries 2610 can include API libraries 2624 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 2610 can also include a wide variety of other libraries 2628 to provide many other APIs to the applications 2606.

The frameworks 2608 provide a common high-level infrastructure that is used by the applications 2606. For example, the frameworks 2608 provide various graphical user interface (GUI) functions, high-level resource management, and high-level location services. The frameworks 2608 can provide a broad spectrum of other APIs that can be used by the applications 2606, some of which may be specific to a particular operating system or platform.

In an example, the applications 2606 may include a home application 2636, a contacts application 2630, a browser application 2632, a book reader application 2634, a location application 2642, a media application 2644, a messaging application 2646, a game application 2648, and a broad assortment of other applications such as a third-party application 2640. The applications 2606 are programs that execute functions defined in the programs. Various programming languages can be employed to create one or more of the applications 2606, structured in a variety of manners, such as object-oriented programming languages (e.g., Objective-C, Java, or C++) or procedural programming languages (e.g., C or assembly language). In a specific example, the third-party application 2640 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 2640 can invoke the API calls 2650 provided by the operating system 2612 to facilitate functionality described herein.

EXAMPLES

A method to enable video editing of a video project within a video editing application, the method comprising: presenting a video preview display within a user interface of the video editing application, the video preview display presenting a preview video of the video project at a playhead location of project timeline; presenting a project element display within the user interface of the video editing application; presenting a tool display within the user interface of the video editing application; activating a first video editing mode of the video editing application to activate one of a plurality of video editing tools provided by the video editing application; responsive to the activation of the first editing mode, presenting a first set of project element indicia within the project element display of the user interface, each project element indicium of the first set of project element indicia representing a respective project element of a first set of project elements of the video project; detecting user selection of a selected project element indicium of the first set of project element indicia within the project element display of the user interface; and responsive to the detection of the user selection of the selected project element indicium, moving the playhead of the project timeline to an updated playback location corresponding to the selected project element.

The method according to any one of the preceding examples, comprising, responsive to the detection of the user selection of the selected project element indicium, presenting a project element corresponding to the selected project element indicium within the video preview display of the user interface of the video editing application The method according to any one of the preceding examples, wherein the project element indicia comprise a plurality of thumbnail images, and the selected project element indicium comprises a selected thumbnail image.

The method according to any one of the preceding examples, wherein the updated playback location is a chronological position on the project timeline where the selected project element associated with the selected project element indicium first appears.

The method according to any one of the preceding examples, wherein the first set of project elements represent a subset of project elements of a video project. The method according to any one of the preceding examples, wherein the project elements of the video project comprise at least one of a video content item, an image content item, an audio content item, a caption content item, an effect content item, an augmentation content item, a layout content item, and a transition content item.

A method to navigate a video editing project within a video editing application, the method comprising: detecting activation of a first editing mode of a plurality of editing modes, each of the editing modes being associated with a respective project element set of the video editing project; responsive to activation of the first editing mode, causing presentation, within an element display of the video editing application, of a first project element set associated with the first editing mode; and responsive to detection of selection of a first project element of the first project element set, causing presentation of the first project element in a canvas display the video editing application, and advancing a playhead associated with a canvas display to a location on a project timeline associated with the first project element.

The method according to any one of the preceding examples, wherein the first project element set is caused to be displayed within the element display to the exclusion of project elements of other project element sets of the video editing project.

The method according to any one of the preceding examples, wherein each of the editing modes includes a set of tools specific to the respective video editing mode, and responsive to detecting selection of the first editing mode, causing presentation of a first tool set associated with the first editing mode.

The method according to any one of the preceding examples, responsive to detection of the selection of a second project element of the first project element set, causing presentation of the second project element in a canvas display the video editing application, and advancing the playhead to a second location on a project timeline associated with the second project element.

The method according to any one of the preceding examples, further comprising: detecting activation of a second editing mode of the plurality of editing modes; responsive to activation of the second editing mode, causing presentation, within the element display of the video editing application, of a second project element set associated with the second editing mode; and responsive to detection of a selection of a second project element of the second project element set, causing presentation of the second project element in a canvas display the video editing application, and advancing the playhead to a second location on the project timeline associated with the second project element.

A method to navigate a video editing project within a video editing application, the method comprising: storing a project timeline comprising a plurality of media content items arranged in a chronological sequence, the project timeline having a start time and an end time; causing presentation of a first tool interface, the first tool interface comprising: a video editing canvas for playback of the project timeline; a plurality of tools to enable respective video editing functions; and a plurality of indicia representing the respective plurality of media content items; detecting activation of a first indicium associated with a first media content item of the plurality of media content items; and advancing the playback of the project timeline to a chronological location corresponding to the location of the first media content item within the project timeline.

The method according to any one of the preceding examples, further comprising: storing a supplemental timeline comprising a plurality of media supplementation items, the plurality of media supplementation items supplementing the media content items of the project timeline; causing presentation of a second tool interface, the second tool interface comprising: the video editing canvas; a second plurality of tools to enable a second video editing function; a second plurality of second indicium representing the respective plurality of media supplementation items; detecting activation of a second indicium associated with an activated media supplementation item of the plurality of media supplementation items; responsive detecting the activation of the second indicium, advancing playback of the project timeline to a second chronological location corresponding to a location of the activated media supplementation item within the supplemental timeline.

The method according to any one of the preceding examples, wherein media content items comprising at least one of digital image content items and digital video content items.

The method according to any one of the preceding examples, wherein the plurality of media supplementation items comprise at least one of: supplemental digital image content items or digital video content items, and the supplemental timeline comprises a layer timeline that is overlaid on the project timeline; caption content items, and the supplemental timeline comprises a caption timeline that is overlaid on the project timeline; audio content items, and the supplemental timeline comprises an audio timeline that is overlaid on the project timeline; effect content items, and the supplemental timeline comprises an effect timeline that is overlaid on the project timeline; transition content items, and the supplemental timeline comprises a transition timeline that is overlaid on the project timeline; playback speed adjustment content items, and the supplemental timeline comprises a speed timeline that is overlaid on the project timeline; and a layout content item, and the supplemental timeline comprises a layout timeline that is overlaid on the project timeline.

A method of applying a media item layout within a video editing application, the method comprising: storing a plurality of media items within a project data structure maintained by the video editing application; storing a plurality of layout configurations; causing presentation of the plurality of media items within a media item display of the video editing application; detecting selection of the plurality of media items within the media item display; detecting selection of a selected layout configuration of the plurality of layout configurations; automatically applying the selected layout configuration to the plurality of media items; presenting the plurality of media items, arranged according to the selected layout configuration, within a canvas display of the video editing application.

The method according to any one of the preceding examples, wherein each layout of the plurality of layout configurations comprises configuration data specifying a start time and end time, and wherein the automatic application of the selected layout configuration to the plurality of media items comprises applying the selected configuration between a start time and end time with respect to a primary project timeline.

The method according to any one of the preceding examples, further comprising the automatic applying of the selected layout configuration to the plurality of media items after the end time specified by the configuration data of the selected layout configuration.

The method according to any one of the preceding examples, wherein the plurality of media items are stored within respective content layers within the project data structure maintained by the video editing application.

The method according to any one of the preceding examples, including presenting a plurality of tool functions in conjunction with the presentation of the plurality of media items, each of the plurality of tool functions being selectable to invoke a respective video editing tool to edit a media item of the plurality of media items.

The method according to any one of the preceding examples, wherein at least one layout configuration of the plurality of layout configurations comprises layout data specifying respective locations of the plurality of media items relative a plurality of primary content items included in a primary content timeline.

The method of according to any one of the preceding examples, wherein at least one of the plurality of layout configurations comprises layout data specifying a picture in picture layout, wherein the plurality of media items are displayed as respective pictures overlaid on a primary media content item.

The method of according to any one of the preceding examples, wherein at least one of the plurality of layout configurations comprises layout data specifying a split screen layout, wherein the plurality of media items is displayed in a split screen fashion with a primary media content item.

The method according to any one of the preceding examples, wherein each layout configuration of the plurality of layout configurations comprises layout data specifying respective locations of the plurality of primary content items relative to each other.

The method according to any one of the preceding examples comprising: detecting selection of a further selected layout configuration of the plurality of layout configurations; automatically the automatic applying of the selected layout configuration and applying the further selected layout configuration to the plurality of media items; and causing presentation of the plurality of media items, arranged according to the further selected layout configuration, within the canvas display of the video editing application.

The method according to any one of the preceding examples, wherein the plurality of tools functions include add, trim, split, timing, and delete functions.

A method comprising: storing a video project data structure comprising a plurality of project elements of a video editing project, the video editing project having a project duration; within a video editing application, activating a first editing mode; responsive to the activation of the first editing mode, causing display of a first tool video editing interface including a project element display displaying an active project element of the plurality of project elements; responsive to activation of a timing control function within the first tool video editing interface, causing display of: a duration graphical element depicting a project element duration of the active project element relative to the project duration of the video editing project, and a timing control mechanism, manipulable by a user of the video editing application, to modify the project element duration of the active project element, relative to the project duration of the video editing project.

The method according to any one of the preceding examples, wherein the duration graphical element comprise a duration bar, and the timing control mechanism comprises: a start handle of the duration bar representing a start time of the active project element within the project duration of the video editing project, a stop handle of the duration bar representing a stop time of the active project element within the project duration of the video editing project, the start handle and the stop handle being movable by the user to adjust the duration bar and the project element duration of the active project element displayed in the first tool video editing interface.

The method according to any one of the preceding examples, comprising: detecting an interaction by the user with a selected handle, the selected handle comprising at least one of the start handle and the stop handle within the first tool video editing interface; and responsive to the detecting of the interaction with the selected handle, causing display of a frame-step graphical element associated with the selected handle, the frame-step graphical element being manipulable by the user to move the selected handles a predetermined number of video image frames of the active project element.

The method according to any one of the preceding examples, comprising: detecting an interaction by the user with a selected handle, the selected handle comprising at least one of the start handle and the stop handle within the first tool video editing interface; and responsive to the detecting of the interaction with the selected handle, adjusting the display of the active project element within the project element display to a location with the active project element associated with the selected handle.

The method according to any one of the preceding examples, further comprising: responsive to the activation of the timing control function, causing the presentation of a set of project element indicia representing a set of project elements; detecting selection of a selected project element indicium of the set of project element indicia responsive to detecting selection of the selected project element indicium, causing a project element represented by the selected project element indicium to become a further active project element; causing display of a further duration graphical element depicting a further project element duration of the further active project element relative to the project duration of the video editing project.

The method according to any one of the preceding examples, wherein the further duration graphical element comprises a rectangular duration bar having a first edge representing a start time of the further active project element and a second edge representing a stop time of the further active project element, the method further comprising: detecting an interaction by the user with a selected handle, the selected handle comprising at least one of the start handle and the stop handle within the first tool video editing interface; and responsive to the detecting of the interaction with the selected handle, automatically aligning the selected handle at least one of the first edge and the second edge of the rectangular duration bar to align timing of the active project element and the further active project element.

The method according to any one of the preceding examples, wherein the display of the further duration graphical element comprising superimposing the further duration graphical element over the duration graphical element.

The method according to any one of the preceding examples, wherein the plurality of project elements are each categorized according to a plurality of project element categories, and the set of project elements are selected by application of a category filter to comprise project elements of a first category of the plurality of project element categories.

The method according to any one of the preceding examples, comprising visually indicating the selected project element indicium, within the set of project element indicia, as being associated with the further active project element.

A computing apparatus comprising: a processor; and a memory storing instructions that, when executed by the processor, configure the apparatus to: present a video preview display within a user interface of the video editing application, the video preview display presenting a preview video of the video project at a playhead location of project timeline; present a project element display within the user interface of the video editing application; present a tool display within the user interface of the video editing application; activate a first video editing mode of the video editing application to activate one of a plurality of video editing tools provided by the video editing application; responsive to the activation of the first editing mode, present a first set of project element indicia within the project element display of the user interface, each project element indicium of the first set of project element indicia representing a respective project element of a first set of project elements of the video project; detect user selection of a selected project element indicium of the first set of project element indicia within the project element display of the user interface; and responsive to the detection of the user selection of the selected project element indicium, move the playhead of the project timeline to an updated playback location corresponding to the selected project element.

The computing apparatus according to any one of the preceding examples, comprising, responsive to the detection of the user selection of the selected project element indicium, presenting a project element corresponding to the selected project element indicium within the video preview display of the user interface of the video editing application The computing apparatus according to any one of the preceding examples, wherein the project element indicia comprise a plurality of thumbnail images, and the selected project element indicium comprises a selected thumbnail image.

The computing apparatus according to any one of the preceding examples, wherein the updated playback location is a chronological position on the project timeline where the selected project element associated with the selected project element indicium first appears.

The computing apparatus according to any one of the preceding examples, wherein the first set of project elements represent a subset of project elements of a video project.

The computing apparatus according to any one of the preceding examples, wherein the project elements of the video project comprise at least one of a video content item, an image content item, an audio content item, a caption content item, an effect content item, an augmentation content item, a layout content item, and a transition content item.

A computing apparatus comprising: a processor; and a memory storing instructions that, when executed by the processor, configure the apparatus to: detect activation of a first editing mode of a plurality of editing modes, each of the editing modes being associated with a respective project element set of the video editing project; responsive to activation of the first editing mode, cause presentation, within an element display of the video editing application, of a first project element set associated with the first editing mode; and responsive to detection of selection of a first project element of the first project element set, cause presentation of the first project element in a canvas display the video editing application, and advance a playhead associated with a canvas display to a location on a project timeline associated with the first project element.

The computing apparatus according to any one of the preceding examples, wherein the first project element set is caused to be displayed within the element display to the exclusion of project elements of other project element sets of the video editing project.

The computing apparatus according to any one of the preceding examples, wherein each of the editing modes includes a set of tools specific to the respective video edit mode, and responsive to detecting selection of the first editing mode, causing presentation of a first tool set associated with the first editing mode.

The computing apparatus according to any one of the preceding examples, responsive to detection of the selection of a second project element of the first project element set, causing presentation of the second project element in a canvas display the video editing application, and advance the playhead to a second location on a project timeline associated with the second project element.

The computing apparatus according to any one of the preceding examples, wherein the instructions further configure the apparatus to: detect activation of a second editing mode of the plurality of editing modes; responsive to activation of the second editing mode, causing presentation, within the element display of the video editing application, of a second project element set associated with the second editing mode; and responsive to detection of a selection of a second project element of the second project element set, cause presentation of the second project element in a canvas display the video editing application, and advancing the playhead to a second location on the project timeline associated with the second project element.

A computing apparatus comprising: a processor; and a memory storing instructions that, when executed by the processor, configure the apparatus to: store a project timeline comprising a plurality of media content items arranged in a chronological sequence, the project timeline having a start time and an end time; cause presentation of a first tool interface, the first tool interface comprising: a video editing canvas for playback of the project timeline; a plurality of tools to enable respective video edit functions; and a plurality of indicia representing the respective plurality of media content items; detect activation of a first indicium associated with a first media content item of the plurality of media content items; and advance the playback of the project timeline to a chronological location corresponding to the location of the first media content item within the project timeline.

The computing apparatus according to any one of the preceding examples, wherein the instructions further configure the apparatus to: store a supplemental timeline comprising a plurality of media supplementation items, the plurality of media supplementation items supplementing the media content items of the project timeline; cause presentation of a second tool interface, the second tool interface comprising: the video editing canvas; a second plurality of tools to enable second respective video edit function; a second plurality of second indicium representing the respective plurality of media supplementation items; detect activation of a second indicium associated with an activated media supplementation item of the plurality of media supplementation items; responsive detect the activation of the second indicium, advancing playback of the project timeline to a second chronological location corresponding to a location of the activated media supplementation item within the supplemental timeline.

The computing apparatus according to any one of the preceding examples, wherein media content items comprising at least one of digital image content items and digital video content items.

The computing apparatus according to any one of the preceding examples, wherein the plurality of media supplementation items comprise at least one of: supplemental digital image content items or digital video content items, and the supplemental timeline comprises a layer timeline that is overlaid on the project timeline; caption content items, and the supplemental timeline comprises a caption timeline that is overlaid on the project timeline; audio content items, and the supplemental timeline comprises an audio timeline that is overlaid on the project timeline; effect content items, and the supplemental timeline comprises an effect timeline that is overlaid on the project timeline; transition content items, and the supplemental timeline comprises a transition timeline that is overlaid on the project timeline; playback speed adjustment content items, and the supplemental timeline comprises a speed timeline that is overlaid on the project timeline; and a layout content item, and the supplemental timeline comprises a layout timeline that is overlaid on the project timeline.

A computing apparatus comprising: a processor; and a memory storing instructions that, when executed by the processor, configure the apparatus to: store a plurality of media items within a project data structure maintained by the video editing application; store a plurality of layout configurations; cause presentation of the plurality of media items within a media item display of the video editing application; detect selection of the plurality of media items within the media item display; detect selection of a selected layout configuration of the plurality of layout configurations; automatically apply the selected layout configuration to the plurality of media items; present the plurality of media items, arranged according to the selected layout configuration, within a canvas display of the video editing application.

The computing apparatus according to any one of the preceding examples 51, wherein each layout of the plurality of layout configurations comprises configuration data specify a start time and end time, and wherein the automatic applying of the selected layout configuration to the plurality of media items comprises applying the selected configuration between a start time and end time with respect to a primary project timeline.

The computing apparatus according to any one of the preceding examples, wherein the instructions further configure the apparatus to the automatic applying of the selected layout configuration to the plurality of media items after the end time specified by the configuration data of the selected layout configuration.

The computing apparatus according to any one of the preceding examples, wherein the plurality of media items are stored within respective content layers within the project data structure maintained by the video editing application.

The computing apparatus according to any one of the preceding examples 51, including presenting a plurality of tool functions in conjunction with the presentation of the plurality of media items, each of the plurality of tool functions being selectable to invoke a respective video editing tool to edit a media item of the plurality of media items.

The computing apparatus according to any one of the preceding examples, wherein at least one layout configuration of the plurality of layout configurations comprises layout data specify respective locations of the plurality of media items relative a plurality of primary content items included in a primary content timeline.

The computing apparatus according to any one of the preceding examples, wherein at least one of the plurality of layout configurations comprises layout data specify a picture in picture layout, wherein the plurality of media items are displayed as respective pictures overlaid on a primary media content item.

The computing apparatus according to any one of the preceding examples, wherein at least one of the plurality of layout configurations comprises layout data specify a split screen layout, wherein the plurality of media items is displayed in a split screen fashion with a primary media content item.

The computing apparatus according to any one of the preceding examples, wherein each layout configuration of the plurality of layout configurations comprises layout data specify respective locations of the plurality of primary content items relative to each other.

The computing apparatus according to any one of the preceding examples, comprising: detect selection of a further selected layout configuration of the plurality of layout configurations; automatically apply the selected layout configuration and applying the further selected layout configuration to the plurality of media items; and cause presentation of the plurality of media items, arranged according to the further selected layout configuration, within the canvas display of the video editing application.

The computing apparatus according to any one of the preceding examples, wherein the plurality of tools functions include add, trim, split, time, and delete functions.

A computing apparatus comprising: a processor; and a memory storing instructions that, when executed by the processor, configure the apparatus to: store a video project data structure comprising a plurality of project elements of a video editing project, the video editing project having a project duration; within a video editing application, activating a first editing mode; responsive to the activation of the first editing mode, cause display of a first tool video editing interface include a project element display displaying an active project element of the plurality of project elements; responsive to activation of a timing control function within the first tool video editing interface, cause display of: a duration graphical element depicting a project element duration of the active project element relative to the project duration of the video editing project, and a timing control mechanism, manipulable by a user of the video editing application, to modify the project element duration of the active project element, relative to the project duration of the video editing project.

The computing apparatus according to any one of the preceding examples, wherein the duration graphical element comprise a duration bar, and the timing control mechanism comprises: a start handle of the duration bar representative of a start time of the active project element within the project duration of the video editing project, a stop handle of the duration bar representative of a stop time of the active project element within the project duration of the video editing project, the start handle and the stop handle being movable by the user to adjust the duration bar and the project element duration of the active project element displayed in the first tool video editing interface.

The computing apparatus according to any one of the preceding examples, comprising: detect an interaction by the user with a selected handle, the selected handle comprising at least one of the start handle and the stop handle within the first tool video editing interface; and responsive to the detecting of the interaction with the selected handle, cause display of a frame-step graphical element associated with the selected handle, the frame-step graphical element being manipulable by the user to move the selected handles a predetermined number of video image frames of the active project element.

The computing apparatus according to any one of the preceding examples, comprising: detect an interaction by the user with a selected handle, the selected handle comprising at least one of the start handle and the stop handle within the first tool video editing interface; and responsive to the detecting of the interaction with the selected handle, adjust the display of the active project element within the project element display to a location with the active project element associated with the selected handle.

The computing apparatus according to any one of the preceding examples, wherein the instructions further configure the apparatus to: responsive to the activation of the timing control function, causing the presentation of a set of project element indicia representing a set of project elements; detect selection of a selected project element indicium of the set of project element indicia responsive to detecting selection of the selected project element indicium, cause a project element represented by the selected project element indicium to become a further active project element; cause display of a further duration graphical element depicting a further project element duration of the further active project element relative to the project duration of the video editing project.

The computing apparatus according to any one of the preceding examples, wherein the further duration graphical element comprises a rectangular duration bar having a first edge representing a start time of the further active project element and a second edge representing a stop time of the further active project element, the method wherein the instructions further configure the apparatus to: detect an interaction by the user with a selected handle, the selected handle comprising at least one of the start handle and the stop handle within the first tool video editing interface; and responsive to the detecting of the interaction with the selected handle, automatically align the selected handle at least one of the first edge and the second edge of the rectangular duration bar to align timing of the active project element and the further active project element.

The computing apparatus according to any one of the preceding examples, wherein the display of the further duration graphical element comprising superimpose the further duration graphical element over the duration graphical element.

The computing apparatus according to any one of the preceding examples, wherein the plurality of project elements are each categorized according to a plurality of project element categories, and the set of project elements are selected by application of a category filter to comprise project elements of a first category of the plurality of project element categories.

The computing apparatus according to any one of the preceding examples, comprising visually indicate the selected project element indicium, within the set of project element indicia, as being associated with the further active project element.

A non-transitory computer-readable storage medium, the computer-readable storage medium including instructions that when executed by a computer, cause the computer to: present a video preview display within a user interface of the video editing application, the video preview display presenting a preview video of the video project at a playhead location of project timeline; present a project element display within the user interface of the video editing application; present a tool display within the user interface of the video editing application; activate a first video editing mode of the video editing application to activate one of a plurality of video editing tools provided by the video editing application; responsive to the activation of the first editing mode, presenting a first set of project element indicia within the project element display of the user interface, each project element indicium of the first set of project element indicia representing a respective project element of a first set of project elements of the video project; detect user selection of a selected project element indicium of the first set of project element indicia within the project element display of the user interface; and responsive to the detection of the user selection of the selected project element indicium, moving the playhead of the project timeline to an updated playback location corresponding to the selected project element.

A non-transitory computer-readable storage medium, the computer-readable storage medium including instructions that when executed by a computer, cause the computer to: detect activation of a first editing mode of a plurality of editing modes, each of the editing modes being associated with a respective project element set of the video editing project; responsive to activation of the first editing mode, causing presentation, within an element display of the video editing application, of a first project element set associated with the first editing mode; and responsive to detection of selection of a first project element of the first project element set, causing presentation of the first project element in a canvas display the video editing application, and advance a playhead associated with a canvas display to a location on a project timeline associated with the first project element.

A non-transitory computer-readable storage medium, the computer-readable storage medium including instructions that when executed by a computer, cause the computer to: store a project timeline comprising a plurality of media content items arranged in a chronological sequence, the project timeline having a start time and an end time; cause presentation of a first tool interface, the first tool interface comprising: a video editing canvas for playback of the project timeline; a plurality of tools to enable respective video edit functions; and a plurality of indicia representing the respective plurality of media content items; detect activation of a first indicium associated with a first media content item of the plurality of media content items; and advance the playback of the project timeline to a chronological location corresponding to the location of the first media content item within the project timeline.

A non-transitory computer-readable storage medium, the computer-readable storage medium including instructions that when executed by a computer, cause the computer to: store a plurality of media items within a project data structure maintained by the video editing application; store a plurality of layout configurations; cause presentation of the plurality of media items within a media item display of the video editing application; detect selection of the plurality of media items within the media item display; detect selection of a selected layout configuration of the plurality of layout configurations; automatically applying the selected layout configuration to the plurality of media items; present the plurality of media items, arranged according to the selected layout configuration, within a canvas display of the video editing application.

A non-transitory computer-readable storage medium, the computer-readable storage medium including instructions that when executed by a computer, cause the computer to: store a video project data structure comprising a plurality of project elements of a video editing project, the video editing project having a project duration; within a video editing application, activating a first editing mode; responsive to the activation of the first editing mode, causing display of a first tool video editing interface include a project element display displaying an active project element of the plurality of project elements; responsive to activation of a timing control function within the first tool video editing interface, cause display of: a duration graphical element depicting a project element duration of the active project element relative to the project duration of the video editing project, and a timing control mechanism, manipulable by a user of the video editing application, to modify the project element duration of the active project element, relative to the project duration of the video editing project.

Glossary

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1004 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

What is claimed is:

1. A method to enable video editing of a video project within a video editing application, the method comprising:
   presenting a video preview display within a user interface of the video editing application, the video preview display presenting a preview video of the video project at a playhead location of a project timeline;

presenting a content augmentation display within the user interface, the content augmentation display presenting a content augmentation of the video project at the playhead location of the projected timeline, the content augmentation changing the appearance of the video preview display by adding one or more digital media content items on objects identified in the preview video starting from a time associated with the playhead location of the project timeline, the content augmentation display displaying an effect element starting from a first period of time in the project timeline spanning from the time associated with the playhead location;

presenting a project element display within the user interface of the video editing application;

presenting a tool display within the user interface of the video editing application;

activating a first video editing mode of the video editing application to activate one of a plurality of video editing tools provided by the video editing application;

responsive to the activation of the first video editing mode, presenting a first set of project element indicia within the project element display of the user interface, each project element indicium of the first set of project element indicia representing a respective project element of a first set of project elements of the video project;

detecting user selection of a selected project element indicium of the first set of project element indicia within the project element display of the user interface, the user selection including moving the effect element to a different period of time in the project timeline; and responsive to the detection of the user selection of the selected project element indicium:
   moving a playhead of the project timeline to an updated playhead location corresponding to a selected project element corresponding to the selected project element indicium such that the effect element starts from a second period of time in the project timeline spanning from the time associated with the updated playhead location;
   removing the one or more digital media content items on objects identified in the preview video starting from the first period of time; and
   adding the one or more digital media content items on the objects identified in the preview video starting from the second period of time.

2. The method of claim 1, comprising, responsive to the detection of the user selection of the selected project element indicium, presenting the selected project element corresponding to the selected project element indicium within the video preview display of the user interface of the video editing application.

3. The method of claim 1, wherein the first set of project element indicia comprises a plurality of thumbnail images, and the selected project element indicium comprises a selected thumbnail image.

4. The method of claim 1, wherein the updated playhead location is a chronological position on the project timeline where the selected project element associated with the selected project element indicium first appears.

5. The method of claim 1, wherein the first set of project elements represents a subset of project elements of the video project.

6. The method of claim 1, wherein the project elements of the video project comprise at least one of a video content item, an image content item, an audio content item, a caption content item, an effect content item, an augmentation content item, a layout content item, and a transition content item.

7. A computing apparatus comprising:
at least one processor; and
a memory storing instructions that, when executed by the at least one processor, configure the computing apparatus to perform operations comprising:
presenting a video preview display within a user interface of a video editing application, the video preview display presenting a preview video of a video project at a playhead location of a project timeline;
presenting a content augmentation display within the user interface, the content augmentation display presenting a content augmentation of the video project at the playhead location of the projected timeline, the content augmentation changing the appearance of the video preview display by adding one or more digital media content items on objects identified in the preview video starting from a time associated with the playhead location of the project timeline, the content augmentation display displaying an effect element starting from a first period of time in the project timeline spanning from the time associated with the playhead location;
presenting a project element display within the user interface of the video editing application;
presenting a tool display within the user interface of the video editing application;
activating a first video editing mode of the video editing application to activate one of a plurality of video editing tools provided by the video editing application;
responsive to the activation of the first video editing mode, presenting a first set of project element indicia within the project element display of the user interface, each project element indicium of the first set of project element indicia representing a respective project element of a first set of project elements of the video project;
detecting user selection of a selected project element indicium of the first set of project element indicia within the project element display of the user interface, the user selection including moving the effect element to a different period of time in the project timeline; and
responsive to the detection of the user selection of the selected project element indicium:
   moving a playhead of the project timeline to an updated playhead location corresponding to a selected project element corresponding to the selected project element indicium such that the effect element starts from a second period of time in the project timeline spanning from the time associated with the updated playhead location;
   removing the one or more digital media content items on objects identified in the preview video starting from the first period of time; and
   adding the one or more digital media content items on the objects identified in the preview video starting from the second period of time.

8. The computing apparatus of claim 7, wherein the instructions, when executed by the processor, configure the apparatus to, responsive to the detection of the user selection of the selected project element indicium, present the selected project element corresponding to the selected project element indicium within the video preview display of the user interface of the video editing application.

9. The computing apparatus of claim 7, wherein the first set of project element indicia comprises a plurality of thumbnail images, and the selected project element indicium comprises a selected thumbnail image.

10. The computing apparatus of claim 7, wherein the updated playhead location is a chronological position on the project timeline where the selected project element associated with the selected project element indicium first appears.

11. The computing apparatus of claim 7, wherein the first set of project elements represents a subset of project elements of a video project.

12. The computing apparatus of claim 7, wherein the project elements of the video project comprise at least one of a video content item, an image content item, an audio content item, a caption content item, an effect content item, an augmentation content item, a layout content item, and a transition content item.

13. A non-transitory computer-readable storage medium, the computer-readable storage medium including instructions that when executed by a computer, cause the computer to perform operations comprising:
presenting a video preview display within a user interface of a video editing application, the video preview display presenting a preview video of a video project at a playhead location of a project timeline;
presenting a content augmentation display within the user interface, the content augmentation display presenting a content augmentation of the video project at the playhead location of the projected timeline, the content augmentation changing the appearance of the video preview display by adding one or more digital media content items on objects identified in the preview video starting from a time associated with the playhead location of the project timeline, the content augmentation display displaying an effect element starting from a first period of time in the project timeline spanning from the time associated with the playhead location;
presenting a project element display within the user interface of the video editing application;
presenting a tool display within the user interface of the video editing application;
activating a first video editing mode of the video editing application to activate one of a plurality of video editing tools provided by the video editing application;
responsive to the activation of the first video editing mode, presenting a first set of project element indicia within the project element display of the user interface, each project element indicium of the first set of project element indicia representing a respective project element of a first set of project elements of the video project;
detecting user selection of a selected project element indicium of the first set of project element indicia within the project element display of the user interface, the user selection including moving the effect element to a different period of time in the project timeline; and
responsive to the detection of the user selection of the selected project element indicium:
moving a playhead of the project timeline to an updated playhead location corresponding to a selected project element corresponding to the selected project element indicium such that the effect element starts from a second period of time in the project timeline spanning from the time associated with the updated playhead location;
removing the one or more digital media content items on objects identified in the preview video starting from the first period of time; and
adding the one or more digital media content items on the objects identified in the preview video starting from the second period of time.

14. The non-transitory computer-readable storage medium of claim 13, wherein the instructions, when executed by the processor, configure the apparatus to, responsive to the detection of the user selection of the selected project element indicium, present the selected project element corresponding to the selected project element indicium within the video preview display of the user interface of the video editing application.

15. The non-transitory computer-readable storage medium of claim 13, wherein the first set of project element indicia comprises a plurality of thumbnail images, and the selected project element indicium comprises a selected thumbnail image.

16. The non-transitory computer-readable storage medium of claim 13, wherein the updated playhead location is a chronological position on the project timeline where the selected project element associated with the selected project element indicium first appears.

17. The non-transitory computer-readable storage medium of claim 13, wherein the first set of project elements represents a subset of project elements of a video project.

18. The non-transitory computer-readable storage medium of claim 13, wherein the project elements of the video project comprise at least one of a video content item, an image content item, an audio content item, a caption content item, an effect content item, an augmentation content item, a layout content item, and a transition content item.

* * * * *

UNITED STATES PATENT AND TRADEMARK OFFICE
CERTIFICATE OF CORRECTION

PATENT NO. : 12,026,362 B2
APPLICATION NO. : 17/748496
DATED : July 2, 2024
INVENTOR(S) : Wehrman et al.

Page 1 of 1

It is certified that error appears in the above-identified patent and that said Letters Patent is hereby corrected as shown below:

In the Claims

In Column 45, Line 6, in Claim 1, delete "projected" and insert --project-- therefor In Column 46, Line 18, in Claim 7, delete "projected" and insert --project-- therefor In Column 47, Line 29, in Claim 13, delete "projected" and insert --project-- therefor Signed and Sealed this
Twelfth Day of August, 2025

Coke Morgan Stewart
*Acting Director of the United States Patent and Trademark Office*